(12) United States Patent
Tyan et al.

(10) Patent No.: US 10,704,638 B2
(45) Date of Patent: Jul. 7, 2020

(54) CELLULAR STRUCTURES WITH TWELVE-CORNERED CELLS

(71) Applicant: FORD GLOBAL TECHNOLOGIES, LLC, Dearborn, MI (US)

(72) Inventors: Tau Tyan, Northville, MI (US); Yu-Kan Hu, Ypsilanti, MI (US); Leonard Anthony Shaner, New Baltimore, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 157 days.

(21) Appl. No.: 15/138,465

(22) Filed: Apr. 26, 2016

(65) Prior Publication Data

US 2017/0307137 A1   Oct. 26, 2017

(51) Int. Cl.
*F16S 1/02*   (2006.01)
*F16F 7/12*   (2006.01)
(Continued)

(52) U.S. Cl.
CPC ............... *F16F 7/121* (2013.01); *B32B 5/18* (2013.01); *B32B 5/245* (2013.01); *B32B 5/26* (2013.01); *B32B 7/08* (2013.01); *B32B 7/12* (2013.01); *B32B 15/046* (2013.01); *B32B 15/06* (2013.01); *B32B 15/08* (2013.01); *B32B 15/10* (2013.01); *B32B 15/12* (2013.01); *B32B 15/14* (2013.01); *B32B 15/18* (2013.01); *B32B 15/20* (2013.01);
(Continued)

(58) Field of Classification Search
None
See application file for complete search history.

(56) References Cited

U.S. PATENT DOCUMENTS 2,205,893 A   6/1840   Unger
1,951,292 A   3/1934   Cahill
(Continued)

FOREIGN PATENT DOCUMENTS

CN   104443039 A   3/2015
CN   104763772 A   7/2015
(Continued)

OTHER PUBLICATIONS

Machine translation for JP08-337183.
(Continued)

*Primary Examiner* — John J Figueroa
(74) *Attorney, Agent, or Firm* — David Coppiellie; Hanley, Flight & Zimmerman, LLC

(57) ABSTRACT

A cellular structure may include a plurality of cells each having a twelve-cornered cross section. The twelve-cornered cross section may include twelve sides and twelve corners creating eight internal angles and four external angles. Each cell may include a plurality of longitudinal walls extending between a top and a bottom of the cell, the longitudinal walls intersecting to create corners of the cell. A structural component may include at least one wall surrounding a component interior space with a cellular structure having at least two cells being positioned within the interior space. A sandwich structure may include first and second substantially planar structures, and a cellular structure with at least two cells positioned between the first and second substantially planar structures.

36 Claims, 35 Drawing Sheets

(51) Int. Cl.

| | | |
|---|---|---|
| *E04C 2/36* | (2006.01) | |
| *B32B 3/12* | (2006.01) | |
| *B32B 5/18* | (2006.01) | |
| *B32B 29/00* | (2006.01) | |
| *B32B 5/26* | (2006.01) | |
| *B32B 15/06* | (2006.01) | |
| *B32B 15/14* | (2006.01) | |
| *B32B 21/08* | (2006.01) | |
| *B32B 21/04* | (2006.01) | |
| *B32B 29/02* | (2006.01) | |
| *B32B 25/06* | (2006.01) | |
| *B32B 15/20* | (2006.01) | |
| *B32B 15/18* | (2006.01) | |
| *B32B 15/08* | (2006.01) | |
| *B32B 5/24* | (2006.01) | |
| *B32B 25/10* | (2006.01) | |
| *B32B 27/08* | (2006.01) | |
| *B32B 27/12* | (2006.01) | |
| *B32B 25/08* | (2006.01) | |
| *B32B 7/08* | (2019.01) | |
| *B32B 7/12* | (2006.01) | |
| *B32B 15/04* | (2006.01) | |
| *B32B 15/10* | (2006.01) | |
| *B32B 15/12* | (2006.01) | |
| *B32B 21/10* | (2006.01) | |
| *B32B 27/10* | (2006.01) | |
| *B32B 21/13* | (2006.01) | |
| *B32B 27/34* | (2006.01) | |
| *B62D 25/00* | (2006.01) | |
| *B60R 21/04* | (2006.01) | |
| *B60R 19/34* | (2006.01) | |
| *B62D 21/02* | (2006.01) | |

(52) U.S. Cl.
CPC .......... *B32B 21/045* (2013.01); *B32B 21/047* (2013.01); *B32B 21/08* (2013.01); *B32B 21/10* (2013.01); *B32B 21/13* (2013.01); *B32B 25/06* (2013.01); *B32B 25/08* (2013.01); *B32B 25/10* (2013.01); *B32B 27/08* (2013.01); *B32B 27/10* (2013.01); *B32B 27/12* (2013.01); *B32B 27/34* (2013.01); *B32B 29/005* (2013.01); *B32B 29/007* (2013.01); *B32B 29/02* (2013.01); *E04C 2/36* (2013.01); *B32B 3/12* (2013.01); *B32B 2250/40* (2013.01); *B32B 2262/101* (2013.01); *B32B 2262/106* (2013.01); *B32B 2307/102* (2013.01); *B32B 2307/206* (2013.01); *B32B 2307/41* (2013.01); *B32B 2307/412* (2013.01); *B32B 2307/414* (2013.01); *B32B 2307/50* (2013.01); *B32B 2307/546* (2013.01); *B32B 2307/56* (2013.01); *B32B 2307/718* (2013.01); *B32B 2307/732* (2013.01); *B32B 2419/04* (2013.01); *B32B 2419/06* (2013.01); *B32B 2437/02* (2013.01); *B32B 2479/00* (2013.01); *B32B 2553/00* (2013.01); *B32B 2553/02* (2013.01); *B32B 2603/00* (2013.01); *B32B 2605/08* (2013.01); *B32B 2605/10* (2013.01); *B32B 2605/12* (2013.01); *B60R 19/34* (2013.01); *B60R 2021/0421* (2013.01); *B62D 21/02* (2013.01); *B62D 25/00* (2013.01)

(56) References Cited

U.S. PATENT DOCUMENTS

| | | |
|---|---|---|
| 2,340,003 A | 1/1944 | McDermot |
| 2,837,347 A | 6/1958 | Barenyi |
| 2,856,226 A | 10/1958 | Purdy |
| 3,092,222 A | 6/1963 | Heinle |
| 3,209,432 A | 10/1965 | Cape |
| 3,366,530 A | 1/1968 | Kodich |
| 3,412,628 A | 11/1968 | De Gain |
| 3,640,798 A | 2/1972 | Deeds |
| 3,930,658 A | 1/1976 | Howe et al. |
| 3,964,527 A | 6/1976 | Zwart |
| 3,991,245 A | 11/1976 | Jackson |
| 4,018,055 A | 4/1977 | Clercq |
| 4,021,983 A | 5/1977 | Kirk, Jr. |
| 4,029,350 A | 6/1977 | Goupy et al. |
| 4,056,878 A | 11/1977 | Woodley |
| 4,135,018 A | 1/1979 | Bonin et al. |
| 4,227,593 A | 10/1980 | Bricmont et al. |
| 4,249,976 A | 2/1981 | Hudson |
| 4,352,484 A | 10/1982 | Gertz et al. |
| 4,364,216 A | 12/1982 | Koller |
| 4,667,530 A | 5/1987 | Mettler et al. |
| 4,702,515 A | 10/1987 | Kato et al. |
| 5,069,318 A | 12/1991 | Kulesha et al. |
| 5,100,730 A | 3/1992 | Lambers |
| 5,242,735 A | 9/1993 | Blankenburg et al. |
| 5,271,204 A | 12/1993 | Wolf et al. |
| 5,431,445 A | 7/1995 | Wheatley |
| 5,431,980 A | 7/1995 | McCarthy |
| 5,480,189 A | 2/1996 | Schechter |
| 5,618,633 A | 4/1997 | Swanson et al. |
| 5,729,463 A | 3/1998 | Koenig et al. |
| 5,913,565 A | 6/1999 | Watanabe |
| 6,068,330 A | 5/2000 | Kasuga et al. |
| 6,179,355 B1 | 1/2001 | Chou et al. |
| 6,371,540 B1 | 4/2002 | Campanella et al. |
| 6,523,576 B2 | 2/2003 | Imaeda et al. |
| 6,588,830 B1 | 7/2003 | Schmidt et al. |
| 6,635,202 B1 | 10/2003 | Bugg et al. |
| 6,705,653 B2 | 3/2004 | Gotanda et al. |
| 6,752,451 B2 | 6/2004 | Sakamoto et al. |
| 6,799,794 B2 | 10/2004 | Mochidome et al. |
| 6,893,065 B2 | 3/2005 | Seksaria et al. |
| 6,959,894 B2 | 11/2005 | Hayashi |
| 7,044,515 B2 | 5/2006 | Mooijman et al. |
| 7,160,621 B2 | 1/2007 | Chaudhari et al. |
| 7,252,314 B2 | 8/2007 | Tamura et al. |
| 7,264,274 B2 | 9/2007 | Ridgway |
| 7,303,219 B2 | 12/2007 | Trabant et al. |
| 7,350,851 B2 | 4/2008 | Barvosa-Carter et al. |
| 7,357,445 B2 | 4/2008 | Gross et al. |
| 7,407,219 B2 | 8/2008 | Glasgow et al. |
| 7,445,097 B2 | 11/2008 | Tamura et al. |
| 7,678,440 B1 | 3/2010 | McKnight et al. |
| 7,896,411 B2 | 3/2011 | Kano et al. |
| 7,926,160 B2 | 4/2011 | Zifferer et al. |
| 7,926,865 B2 | 4/2011 | Terada et al. |
| 7,988,809 B2 | 8/2011 | Smith et al. |
| 8,336,933 B2 | 12/2012 | Nagwanshi et al. |
| 8,354,175 B2 | 1/2013 | Impero |
| 8,438,808 B2 | 5/2013 | Carlson et al. |
| 8,459,726 B2 | 6/2013 | Tyan et al. |
| 8,469,416 B2 | 6/2013 | Haneda et al. |
| 8,539,737 B2 | 9/2013 | Tyan et al. |
| 8,573,571 B2 | 11/2013 | Langhorst et al. |
| 8,641,129 B2 | 2/2014 | Tyan et al. |
| 8,659,659 B2 | 2/2014 | Bradai et al. |
| 8,863,634 B1 | 10/2014 | Lou |
| 9,073,582 B2 | 7/2015 | Tyan et al. |
| 9,174,678 B2 | 11/2015 | Tyan et al. |
| 9,187,127 B2 | 11/2015 | Tyan et al. |
| 9,327,664 B2 | 5/2016 | Ishitobi et al. |
| 9,365,245 B2 | 6/2016 | Donabedian et al. |
| 9,533,710 B2 | 1/2017 | Cheng et al. |
| 9,789,906 B1 | 10/2017 | Tyan |
| 9,840,281 B2 | 12/2017 | Tyan et al. |
| 9,845,112 B2 | 12/2017 | Tyan et al. |
| 9,889,887 B2 | 2/2018 | Tyan et al. |
| 9,944,323 B2 | 4/2018 | Tyan et al. |
| 10,220,881 B2 | 3/2019 | Tyan et al. |
| 10,279,842 B2 | 5/2019 | Tyan et al. |
| 10,300,947 B2 | 5/2019 | Tyan |

(56) References Cited

U.S. PATENT DOCUMENTS

| | | |
|---|---|---|
| 10,315,698 B2 | 6/2019 | Tyan et al. |
| 10,393,315 B2 | 8/2019 | Tyan |
| 2002/0059087 A1 | 5/2002 | Wahlbin et al. |
| 2002/0153719 A1 | 10/2002 | Taguchi |
| 2003/0085592 A1 | 5/2003 | Seksaria et al. |
| 2005/0028710 A1 | 2/2005 | Carpenter et al. |
| 2006/0033363 A1 | 2/2006 | Hillekes et al. |
| 2006/0181072 A1 | 8/2006 | Tamura et al. |
| 2006/0202493 A1 | 9/2006 | Tamura et al. |
| 2006/0202511 A1 | 9/2006 | Tamura et al. |
| 2006/0249342 A1 | 9/2006 | Canot et al. |
| 2006/0237976 A1 | 10/2006 | Glasgow et al. |
| 2007/0056819 A1 | 3/2007 | Kano et al. |
| 2007/0114804 A1 | 5/2007 | Gross et al. |
| 2008/0012386 A1 | 1/2008 | Kano et al. |
| 2008/0014809 A1 | 1/2008 | Brown et al. |
| 2008/0030031 A1 | 2/2008 | Nilsson et al. |
| 2008/0036242 A1 | 2/2008 | Glance et al. |
| 2008/0098601 A1 | 5/2008 | Heinz et al. |
| 2008/0106107 A1 | 5/2008 | Tan et al. |
| 2008/0164864 A1 | 7/2008 | Bjorn |
| 2008/0185852 A1 | 9/2008 | Suzuki et al. |
| 2008/0217935 A1 | 9/2008 | Braunbeck et al. |
| 2009/0026777 A1 | 1/2009 | Schmid et al. |
| 2009/0085362 A1 | 4/2009 | Terada et al. |
| 2009/0092820 A1 | 4/2009 | Lambers |
| 2009/0102234 A1 | 4/2009 | Heatherington et al. |
| 2009/0174219 A1 | 7/2009 | Foreman |
| 2009/0236166 A1 | 9/2009 | Kowaki et al. |
| 2010/0064946 A1 | 3/2010 | Watson |
| 2010/0066124 A1 | 3/2010 | Terada et al. |
| 2010/0072788 A1 | 3/2010 | Tyan et al. |
| 2010/0102592 A1 | 4/2010 | Tyan et al. |
| 2010/0164238 A1 | 7/2010 | Nakanishi et al. |
| 2011/0012389 A1 | 1/2011 | Kanaya et al. |
| 2011/0015902 A1* | 1/2011 | Cheng ............... B62D 21/152 703/1 |
| 2011/0024250 A1 | 2/2011 | Kitashiba et al. |
| 2011/0102592 A1 | 5/2011 | Bradai et al. |
| 2011/0187135 A1 | 8/2011 | Kano et al. |
| 2011/0223372 A1 | 9/2011 | Metz et al. |
| 2011/0226312 A1 | 9/2011 | Bohm et al. |
| 2012/0205927 A1 | 8/2012 | Asakawa et al. |
| 2012/0261949 A1 | 10/2012 | Tyan et al. |
| 2013/0140850 A1 | 6/2013 | Tyan et al. |
| 2013/0193699 A1 | 8/2013 | Zannier |
| 2013/0221692 A1 | 8/2013 | Wang et al. |
| 2013/0264757 A1 | 10/2013 | Rajasekaran et al. |
| 2013/0292968 A1 | 11/2013 | Tyan et al. |
| 2013/0300138 A1* | 11/2013 | Banasiak ............... B60R 19/34 293/133 |
| 2013/0341115 A1 | 12/2013 | Tyan et al. |
| 2014/0021709 A1 | 1/2014 | Hirose et al. |
| 2014/0127454 A1 | 5/2014 | Kuppers |
| 2014/0203577 A1 | 7/2014 | Nagwanshi et al. |
| 2014/0261949 A1 | 9/2014 | Marella et al. |
| 2014/0353990 A1 | 12/2014 | Ishitobi et al. |
| 2015/0001866 A1 | 1/2015 | Noyori |
| 2015/0084374 A1 | 3/2015 | Tyan et al. |
| 2015/0197206 A1 | 7/2015 | Tamura et al. |
| 2015/0247298 A1 | 9/2015 | Li et al. |
| 2015/0314743 A1 | 11/2015 | Matsushiro |
| 2016/0001725 A1 | 1/2016 | Nakanishi et al. |
| 2016/0001726 A1 | 1/2016 | Keller et al. |
| 2016/0052557 A1 | 2/2016 | Tyan et al. |
| 2016/0068194 A1 | 3/2016 | Tyan et al. |
| 2016/0129866 A1 | 5/2016 | Kamiya |
| 2016/0221521 A1 | 8/2016 | Nishimura et al. |
| 2016/0264083 A1 | 9/2016 | Ishitsuka |
| 2016/0332410 A1 | 11/2016 | Brun |
| 2016/0375935 A1 | 12/2016 | Tyan et al. |
| 2017/0106915 A1 | 4/2017 | Tyan et al. |
| 2017/0113724 A1 | 4/2017 | Tyan et al. |
| 2017/0203790 A1 | 7/2017 | Tyan et al. |
| 2017/0274933 A1 | 9/2017 | Tyan |
| 2017/0282484 A1 | 10/2017 | Dietz et al. |
| 2017/0307138 A1 | 10/2017 | Tyan |
| 2018/0057058 A1 | 3/2018 | Tyan |
| 2018/0057060 A1 | 3/2018 | Tyan et al. |
| 2018/0057063 A1 | 3/2018 | Tyan et al. |
| 2018/0058530 A1 | 3/2018 | Tyan |
| 2018/0099475 A1 | 4/2018 | Tyan et al. |
| 2018/0099696 A1 | 4/2018 | Tyan et al. |
| 2018/0100621 A1 | 4/2018 | Tyan et al. |

FOREIGN PATENT DOCUMENTS

| | | |
|---|---|---|
| CN | 104890308 A | 9/2015 |
| CN | 105235616 A | 1/2016 |
| DE | 102005037055 A1 | 2/2007 |
| DE | 102009035782 A1 | 3/2010 |
| EP | 0856681 A1 | 8/1998 |
| FR | 2375496 A2 | 7/1978 |
| GB | 1123337 A | 8/1968 |
| JP | 08-337183 | 12/1996 |
| JP | 3897542 B2 | 1/2007 |
| JP | 2007-023661 A | 2/2007 |
| JP | 2008168745 A | 7/2008 |
| JP | 2008261493 A | 10/2008 |
| JP | 2009184417 A | 8/2009 |
| JP | 04-371059 | 11/2009 |
| JP | 2011051581 A | 3/2011 |
| JP | 2012107660 A | 6/2012 |
| JP | 5348910 B2 | 8/2013 |
| JP | 2013159132 A | 8/2013 |
| JP | 2014004973 A | 1/2014 |
| JP | 2015124784 A | 7/2015 |
| RU | 2246646 C2 | 10/2004 |
| WO | 92009766 A1 | 6/1992 |
| WO | 20144177132 A1 | 11/2014 |

OTHER PUBLICATIONS

Yoshiaka Nakazawa et al., "Development of Crash-Box for Passenger Car With High Capability for Energy Absorption", VIII International Conference on Computation Plasticity (COMPLAS VIII), Barcelona, 2005.

Ali Najafi et al., "Mechanics of Axial Plastic Collapse in Multi-Cell, Multi-Corner Crush Tubes," sciencedirect.com, Sep. 1, 2010.

Xiong Zhang et al., "Crushing Analysis of Polygonal Columns and Angle Elements," sciencedirect.com, Jun. 27, 2009.

Sivakumar Palanivelua et al., "Comparison of the Crushing Performance of Hollow and Foam-Filled Small-Scale Composite Tubes With Different Geometrical Shapes for Use in Sacrificial Structures," sciencedirect.com, Jun. 1, 2010.

Fyllingen et al., "Simulations of a Top-Hat Section Subjected to Axial Crushing Taking Into Account Material and Geometry Variations," sciencedirect.com, Jul. 31, 2008.

Minoru Yamashita et al., "Quasi-Static and Dynamic Axial Crushing of Various Polygonal Tubes," sciencedirect.com, Jun. 2007.

Comparison of Energy Absorption of Various Section Steel Tubes under Axial Compression and Bending Loading, The 21st Conference of Mechanical Engineering network of Thailand, Oct. 19, 2007. p. 590-593. (See IDS of Sep. 23, 2014 for U.S. Appl. No. 12/891,801).

Mar. 17, 2016 PABR in Response to NFOA dated Dec. 17, 2015 from U.S. Appl. No. 12/891,801.

Office Action dated Aug. 17, 2012 from U.S. Appl. No. 13/087,663.

Nov. 16, 2012 Response to Office Action dated Aug. 17, 2012 from U.S. Appl. No. 13/087,663.

Office Action dated Mar. 2, 2015 from U.S. Appl. No. 14/010,115.

Office Action dated Mar. 16, 2015 from U.S. Appl. No. 14/010,115.

Office Action dated Sep. 15, 2014 from U.S. Appl. No. 13/902,116.

Dec. 12, 2014 Response to Office Action dated Sep. 15, 2014 from U.S. Appl. No. 13/902,116.

Office Action dated Aug. 19, 2011 from U.S. Appl. No. 12/233,808.

Nov. 15, 2011 Response to Office Action dated Aug. 19, 2011 from U.S. Appl. No. 12/233,808.

Office Action dated Mar. 7, 2012 from U.S. Appl. No. 12/233,808.

(56) References Cited

OTHER PUBLICATIONS

Jun. 6, 2012 Response to Office Action dated Mar. 7, 2012 from U.S. Appl. No. 12/233,808.
Office Action dated Jul. 31, 2012 from U.S. Appl. No. 12/233,808.
Oct. 31, 2012 Response to Office Action dated Jul. 31, 2012 from U.S. Appl. No. 12/233,808.
Office Action dated Feb. 27, 2013 from U.S. Appl. No. 12/233,808.
Apr. 29, 2013 Response to Office Action dated Feb. 27, 2013 from U.S. Appl. No. 12/233,808.
Office Action dated Jul. 20, 2012 from U.S. Appl. No. 12/651,614.
Oct. 22, 2012 Response to Office Action dated Jul. 20, 2012 from U.S. Appl. No. 12/651,614.
Office Action dated Feb. 21, 2013 from co-pending U.S. Appl. No. 12/651,614.
Apr. 22, 2013 Response to Office Action dated Feb. 21, 2013 from U.S. Appl. No. 12/651,614.
Advisory Action dated May 6, 2013 from co-pending U.S. Appl. No. 12/651,614.
Office Action dated Jun. 6, 2013 from U.S. Appl. No. 12/651,614.
Sep. 5, 2013 Response to Office Action dated Jun. 6, 2013 from U.S. Appl. No. 12/651,614.
Office Action dated Jun. 28, 2013 from U.S. Appl. No. 12/891,801.
Sep. 27, 2013 Response to Office Action dated Jun. 28, 2013 from U.S. Appl. No. 12/891,801.
Office Action dated Jan. 16, 2014 from U.S. Appl. No. 12/891,801.
Mar. 18, 2014 Response to Office Action dated Jan. 16, 2014 from U.S. Appl. No. 12/891,801.
Office Action dated Apr. 25, 2014 from U.S. Appl. No. 12/891,801.
Jul. 23, 2014 Response to Office Action dated Apr. 25, 2014 from U.S. Appl. No. 12/891,801.
Office Action dated Nov. 6, 2014 from U.S. Appl. No. 12/891,801.
May 21, 2013 Response to Office Action dated Feb. 21, 2013 from U.S. Appl. No. 12/651,614.
Office Action dated Jul. 18, 2014 from U.S. Appl. No. 14/010,115.
Oct. 20, 2014 Response to Office Action dated Jul. 18, 2014 from U.S. Appl. No. 14/010,115.
Office Action dated Jan. 3, 2014 from U.S. Appl. No. 14/010,115.
Apr. 3, 2014 Response to Office Action dated Jan. 3, 2014 from U.S. Appl. No. 14/010,115.
Office Action dated Dec. 17, 2015 from U.S. Appl. No. 12/891,801.
Final Office Action dated Jul. 10, 2017 from U.S. Appl. No. 14/749,426.
Notice of Allowance dated Aug. 4, 2017 from U.S. Appl. No. 14/942,385.
Final Office Action dated Aug. 25, 2017 from U.S. Appl. No. 14/923,802.
Notice of Allowance dated Aug. 10, 2017 from U.S. Appl. No. 14/930,299.
Notice of Allowance dated Oct. 4, 2017 from U.S. Appl. No. 15/001,668.
Final Office Action dated Dec. 12, 2017 from U.S. Appl. No. 14/749,426.
Non-Final Office Action dated Nov. 30, 2017 from U.S. Appl. No. 15/248,136.
Notice of Allowance dated Dec. 4, 2017 from U.S. Appl. No. 14/923,802.
Non-Final Office Action dated Feb. 12, 2018 from U.S. Appl. No. 15/395,524.
Non-Final Office Action dated Mar. 27, 2018 from U.S. Appl. No. 14/749,426.
Extended European Search Report for Application No. 15195185.2, dated May 19, 2016.
Non-Final Office Action dated Feb. 22, 2017 from U.S. Appl. No. 15/078,517.
Notice of Allowance dated Jun. 5, 2017 from U.S. Appl. No. 15/078,517.
Non-Final Office Action dated Mar. 17, 2017 from U.S. Appl. No. 14/749,426.
Non-Final Office Action dated Feb. 7, 2017 from U.S. Appl. No. 14/923,802.
Non-Final Office Action dated Mar. 20, 2017 from U.S. Appl. No. 15/001,668.
Non-Final Office Action dated Nov. 1, 2016 from U.S. Appl. No. 14/930,299.
Final Office Action dated May 16, 2017 from U.S. Appl. No. 14/930,299.
Non-Final Office Action dated Jan. 23, 2017 from U.S. Appl. No. 14/942,385.
Final Office Action dated May 15, 2017 from U.S. Appl. No. 14/942,385.
Final Office Action dated Nov. 15, 2018 from U.S. Appl. No. 15/244,450.
Non-Final Office Action dated Nov. 28, 2018 from U.S. Appl. No. 15/395,524.
Notice of Allowance dated Jan. 14, 2019, from U.S. Appl. No. 15/251,099.
Non-Final Office Action dated Jan. 18, 2019, from U.S. Appl. No. 15/291,486.
Notice of Allowance dated Jan. 24, 2019, from U.S. Appl. No. 14/749,426.
Notice of Allowance dated Oct. 11, 2018 from U.S. Appl. No. 15/248,136.
Final Office Action dated Nov. 7, 2018 from U.S. Appl. No. 14/749,426.
Notice of Allowance dated Nov. 16, 2018 from U.S. Appl. No. 15/251,029.
Notice of Allowance dated Dec. 20, 2018 from U.S. Appl. No. 15/138,466.
Non-Final Office Action dated Dec. 21, 2018 from U.S. Appl. No. 15/291,465.
Non-Final Office Action dated Jun. 12, 2018 from U.S. Appl. No. 15/251,099.
Non-Final Office Action dated Jun. 22, 2018 from U.S. Appl. No. 15/244,450.
Notice of Allowance dated Jun. 22, 2018 from U.S. Appl. No. 15/248,136.
Non-Final Office Action dated Jul. 24, 2018, from U.S. Appl. No. 15/138,466.
Non-Final Office Action dated Jul. 27, 2018, from U.S. Appl. No. 14/749,426.
Final Office Action dated Aug. 31, 2018, from U.S. Appl. No. 15/395,524.
Notice of Allowance dated Apr. 9, 2019 from U.S. Appl. No. 15/138,466.
Non-Final Office Action dated Mar. 4, 2019. from U.S. Appl. No. 15/838,148.
Final Office Action dated May 9, 2019, from U.S. Appl. No. 15/395,524.
Notice of Allowance dated May 23, 2019 from U.S. Appl. No. 15/291,465.
Final Office Action dated May 28, 2019, from U.S. Appl. No. 15/291,486.
Notification of First Office Action in CN Application No. 201510812399.8 dated Jan. 2, 2019.
Notice of Allowance dated Jul. 5, 2019, from U.S. Appl. No. 15/244,450.
Final Office Action dated Sep. 19, 2019, from U.S. Appl. No. 15/838,148.
Non-Final Office Action dated Sep. 27, 2019, from U.S. Appl. No. 16/391,652.
Notice of Allowance dated Sep. 5, 2019, from U.S. Appl. No. 16/279,377.

* cited by examiner

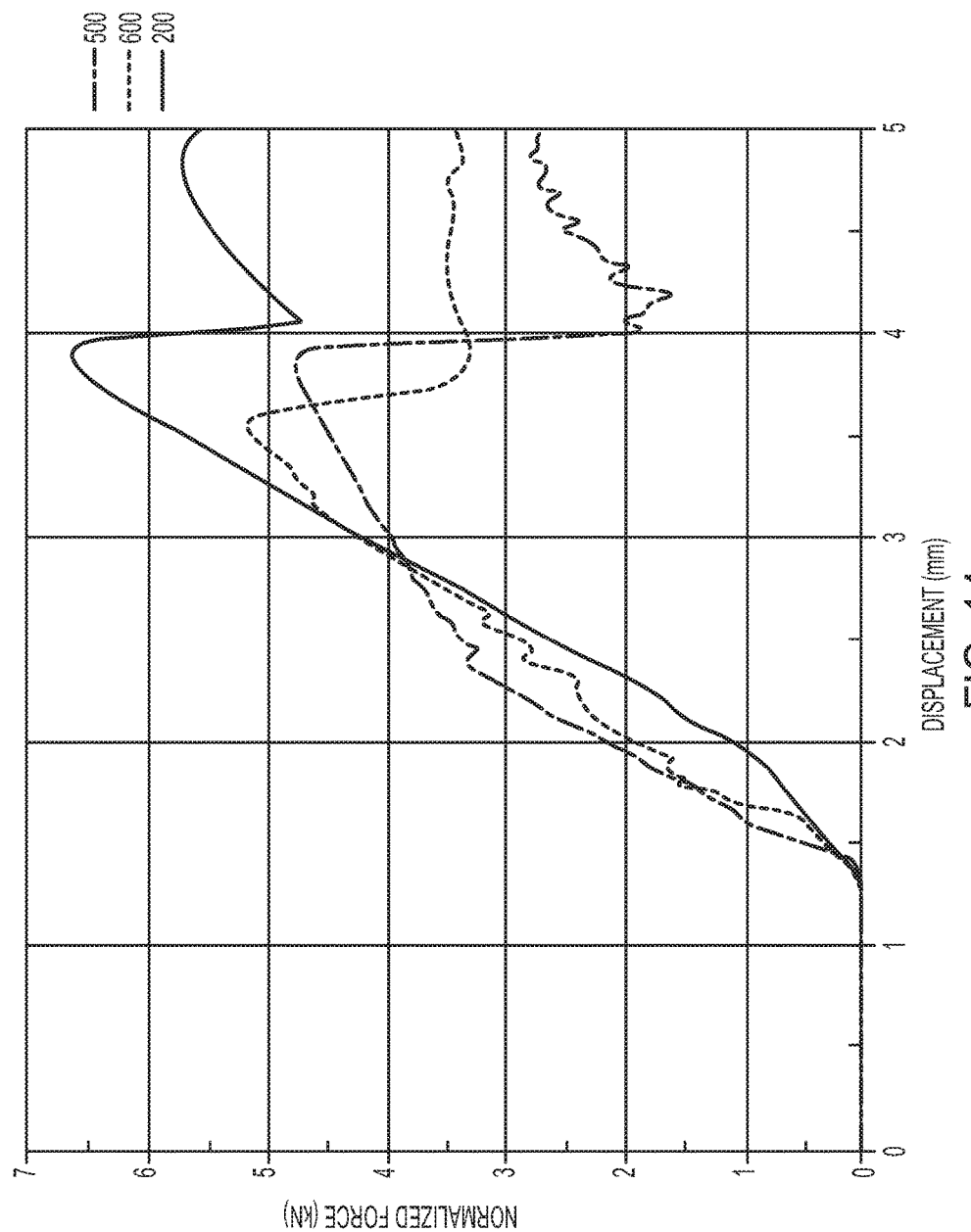

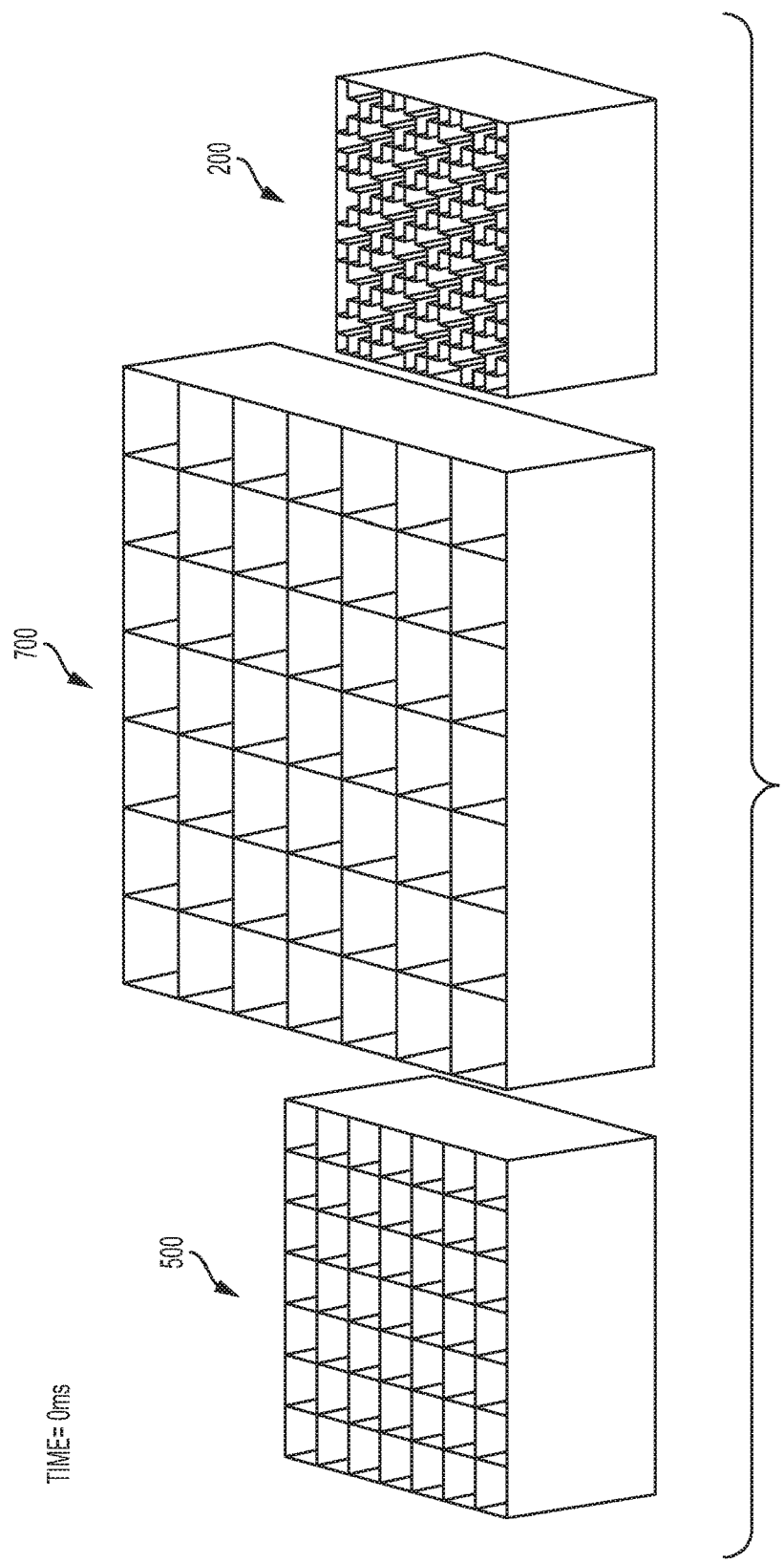

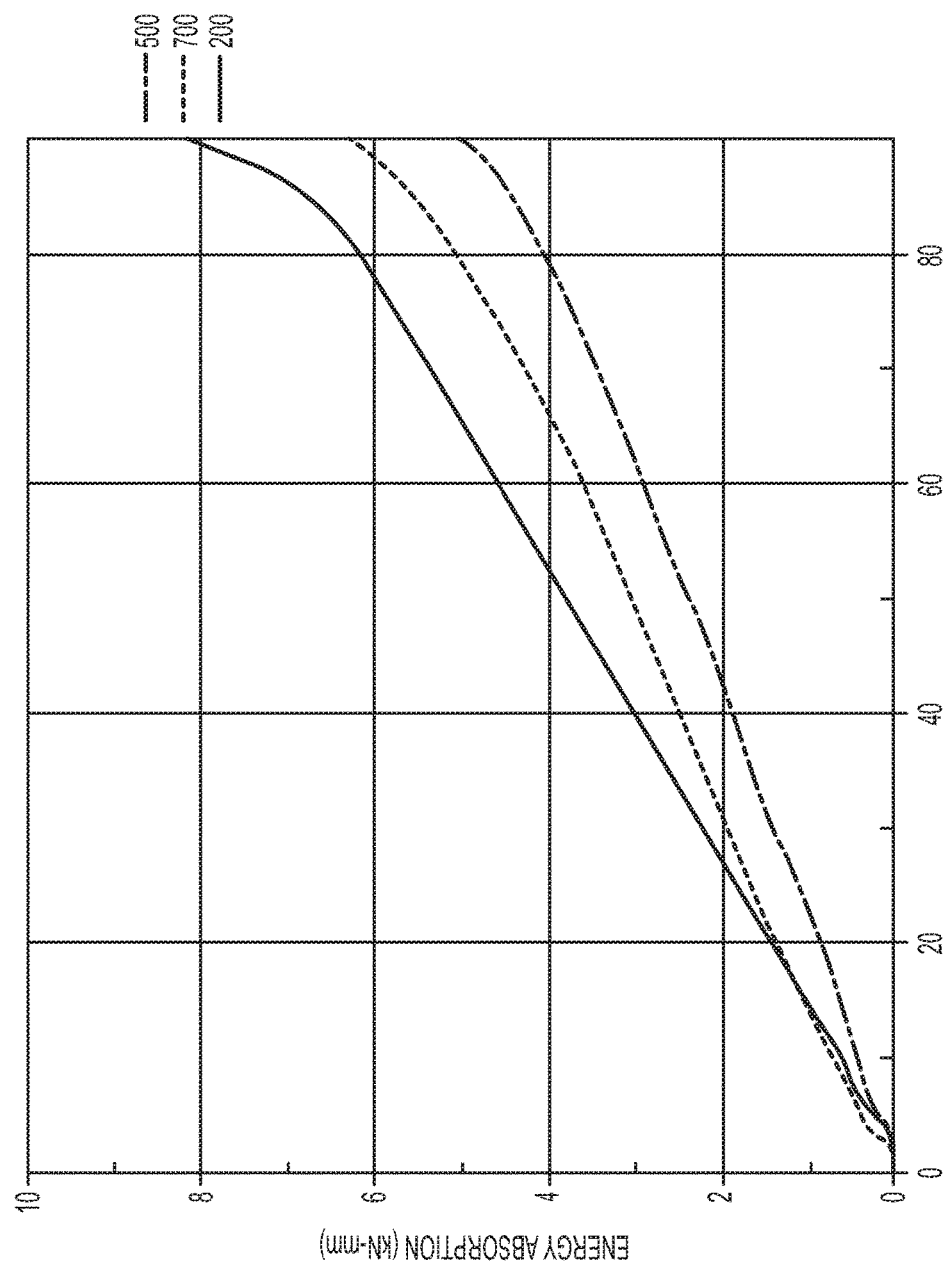

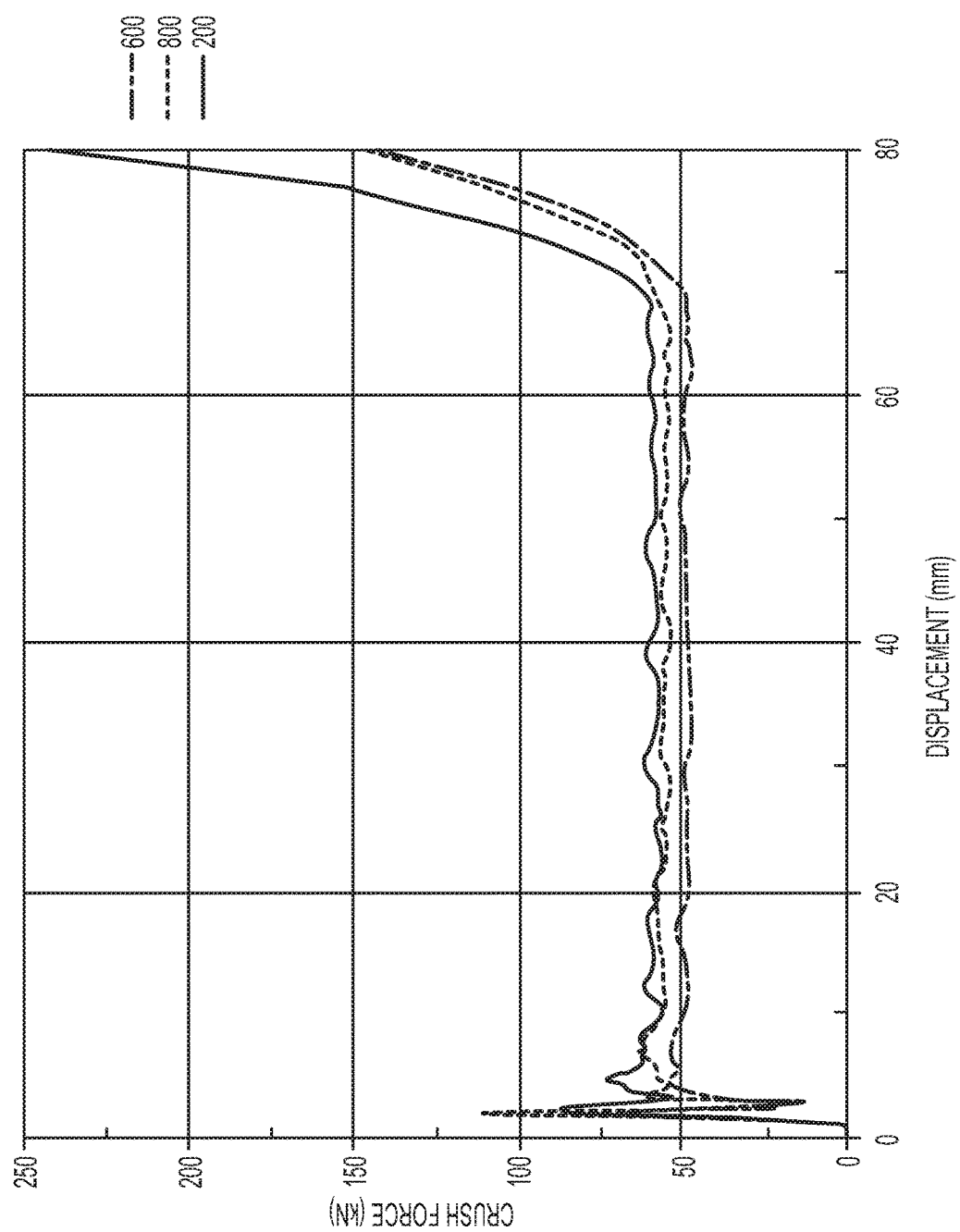

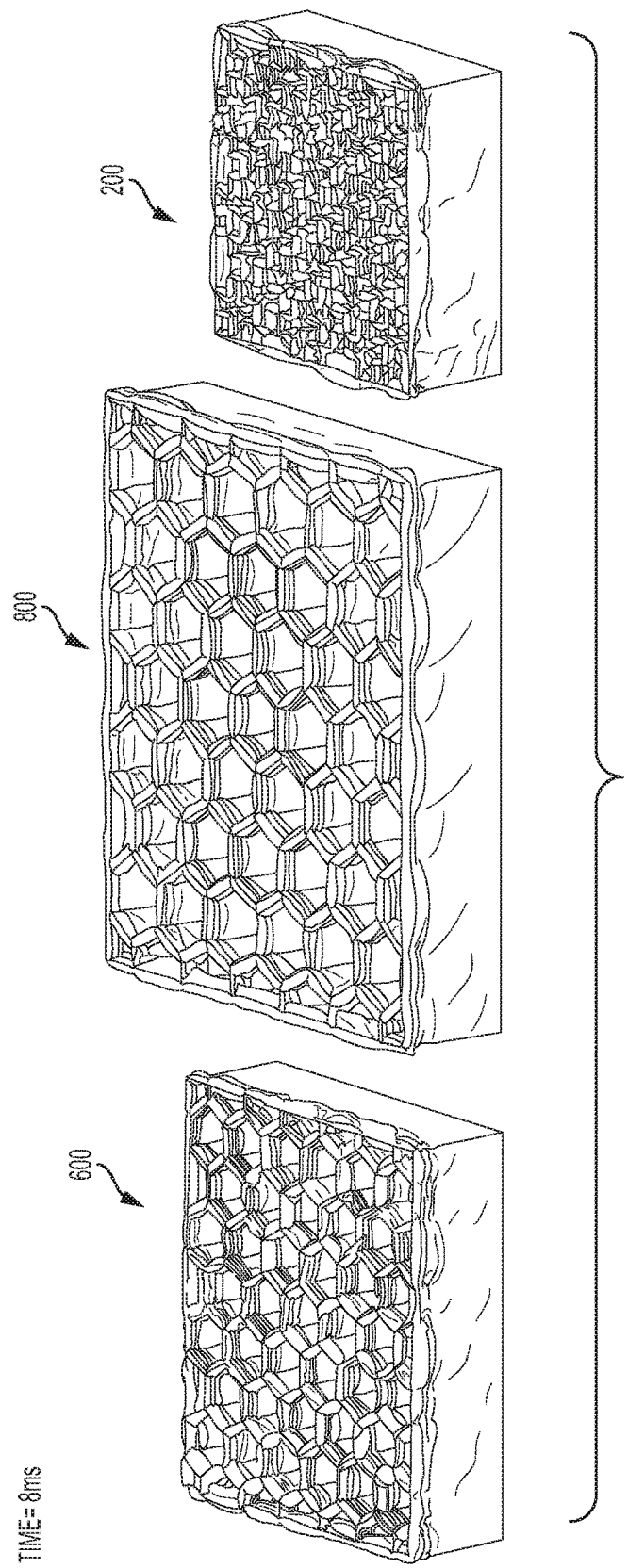

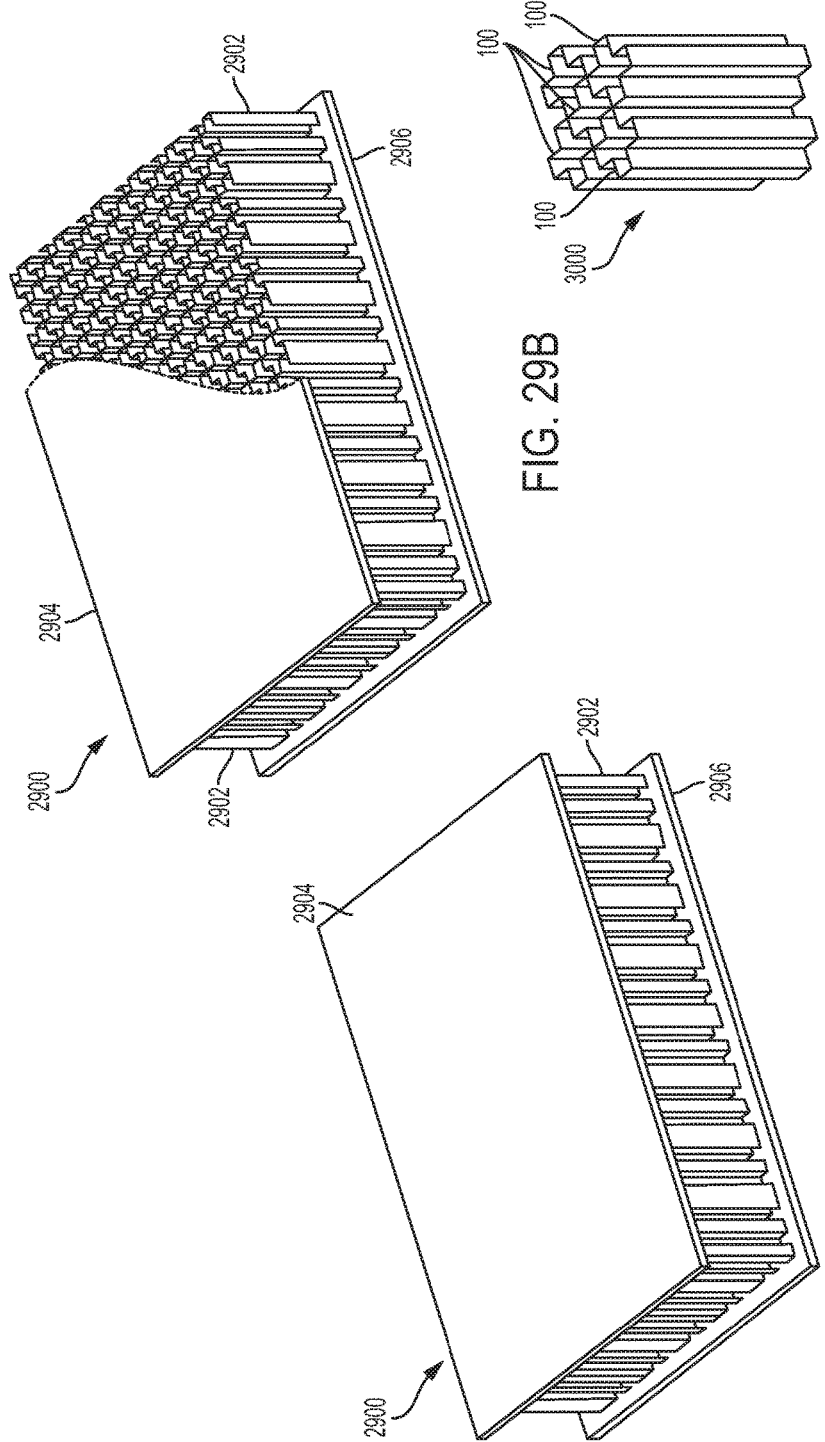

CELLULAR STRUCTURES WITH TWELVE-CORNERED CELLS

This application is related to U.S. patent application Ser. No. 15/138,466, entitled "CELLULAR STRUCTURES WITH TWELVE-CORNERED CELLS," and filed on Apr. 26, 2016; to U.S. Design patent application Ser. No. 29/562,441, entitled "CELLULAR STRUCTURE," and filed on Apr. 26, 2016; to U.S. Design patent application Ser. No. 29/562,443, entitled "CELLULAR STRUCTURE," and filed on Apr. 26, 2016; to U.S. Design patent application Ser. No. 29/562,442, entitled "REPEATING CELLULAR PATTERN," and filed on Apr. 26, 2016; and to U.S. Design patent application Ser. No. 29/562,439, entitled "REPEATING CELLULAR PATTERN," and filed on Apr. 26, 2016, the entire contents of each of which are incorporated by reference herein.

TECHNICAL FIELD

The present disclosure relates generally to a cellular structure for a structural component. The present disclosure relates more specifically to a cellular structure having a plurality of cells, each cell having a cross section formed by twelve sides and twelve corners.

BACKGROUND

It is desirable for a structural component to maximize impact energy absorption and bending resistance while minimizing mass per unit length of the structural component. When a compressive force is exerted on a structural component (e.g., a force from a collision, explosion, projectile, etc.), the structural component can crush and/or bend in a dimensional direction (e.g., longitudinal direction or lateral direction) to absorb the energy of the force. Compressive force energy absorption may be maximized, for example, by assuring that the structural component compacts substantially along a dimensional axis (e.g., longitudinal axis or lateral axis) of the structural component upon experiencing an impact along this axis. Such compaction may be referred to as a stable axial crush of the structural component.

Conventional structural components rely on interior cellular structures with multiple cells that each have a cross section with a basic polygonal shape to improve compressive energy absorption and crush stability. Most often cells having a cross section with a hexagonal shape are used such that the interior cellular structure mimics that of a honeycomb. However, while a cellular structure having such cells with a basic polygonal cross section can provide compressive energy absorption and crush stability for the structural component, such a cellular structure increases the weight of the structural component. It may be desirable to provide a strengthening assembly configured to achieve the same or similar strength increase as provided by the cellular structure made up of cells having a cross section with a basic polygonal shape (e.g., triangular, rectangular, pentagonal, hexagonal, heptagonal, or octagonal), while minimizing mass per unit length of the structural component, and maintaining a high manufacturing feasibility.

It may further be desirable to provide a structural component that can achieve increased energy absorption and a more stable axial collapse when forces such as front and side impact forces are exerted on the structural component, while also conserving mass to minimize the total weight of a structure. Where the structure that the structural component is a part of is a vehicle, such mass conservation can aid in meeting vehicle fuel efficiency and emission requirements. Also, it may be desirable to provide a structural component that can achieve improved energy absorption and bend when a bending force is exerted on the structural component. In addition, it may be desirable, to provide a tunable cross section for cells within the cellular structure that is configured to achieve strength increases (i.e., load carrying and compression energy absorption) over basic polygonal designs, while also allowing flexibility in design to meet a range of applications specific to the structure that the structural component is a part of.

SUMMARY

In accordance with various exemplary embodiments of the present disclosure, a cellular structure is provided. The cellular structure includes a plurality of cells each having a twelve-cornered cross section. The twelve-cornered cross section includes twelve sides and twelve corners.

In accordance with another aspect of the present disclosure, a structural component is provided. The structural component includes at least one wall surrounding a component interior space and a cellular structure positioned within the interior space. The cellular structure includes a plurality of cells each having a twelve-cornered cross section. The twelve-cornered cross section includes twelve sides and twelve corners creating eight internal angles and four external angles.

In accordance with another aspect of the present disclosure, a cellular structure including at least two cells is provided. Each cell includes a plurality of longitudinal walls extending between a top and a bottom of the cell, the longitudinal walls intersecting to create corners of the cell, wherein a transverse cross section of the cell comprises twelve corners.

In accordance with another aspect of the present disclosure, a sandwich structure is provided. The sandwich structure includes first and second planar structures, and a cellular structure positioned between the first and second planar structures. The cellular structure includes at least two cells. Each cell includes a plurality of longitudinal walls extending between a top and a bottom of the cell, the longitudinal walls intersecting to create corners of the cell, wherein a transverse cross section of the cell comprises twelve corners.

Additional objects and advantages will be set forth in part in the description which follows, and in part will be obvious from the description, or may be learned by practice of the present teachings. The objects and advantages of the present disclosure will be realized and attained by means of the elements and combinations particularly pointed out in the appended claims.

It is to be understood that both the foregoing general description and the following detailed description are exemplary and explanatory only and are not restrictive of the claimed subject matter. The accompanying drawings, which are incorporated in and constitute part of this specification, illustrate exemplary embodiments of the present disclosure and together with the description, serve to explain principles of the present disclosure.

BRIEF DESCRIPTION OF THE DRAWINGS

At least some features and advantages of the present teachings will be apparent from the following detailed description of exemplary embodiments consistent therewith, which description should be considered with reference to the accompanying drawings, wherein:

FIG. 14 is a graph of normalized quasi-static crush force and associated crush displacement for modeled polymer versions of the structural components shown in FIGS. 6A-6C;

FIGS. 18A and 18B illustrate modeled polymer versions of various structural components with either a square-celled or twelve-corner-celled cellular structure, at time intervals of 0 milliseconds and 8 milliseconds during an exemplary dynamic crush, respectively;

FIG. 20 is a graph of dynamic axial crush energy absorbed and associated axial crush displacement for the exemplary modeled polymer versions of the structural components shown in FIG. 18A;

FIG. 22 is a graph of dynamic crush force and associated crush displacement for modeled aluminum versions of the structural components shown in FIG. 21A;

FIGS. 24A and 24B illustrate modeled polymer versions of various structural components with either a hexagon-celled or twelve-corner-celled cellular structure, at time intervals of 0 milliseconds and 8 milliseconds during an exemplary dynamic crush, respectively;

FIG. 29A illustrates a perspective view of an exemplary embodiment of a sandwich structure having a cellular structure with a plurality cells, each full cell having an exemplary twelve-cornered cross section in accordance with the present teachings;

FIG. 29B illustrates a perspective cutaway view of the exemplary embodiment of a sandwich structure shown in FIG. 29A; and FIG. 30 illustrates a detailed perspective view a third exemplary embodiment of a structural component having a cellular structure with a plurality of cells, each full cell having the exemplary twelve-cornered cross section, as shown in FIG. 1.

Figure 1A:
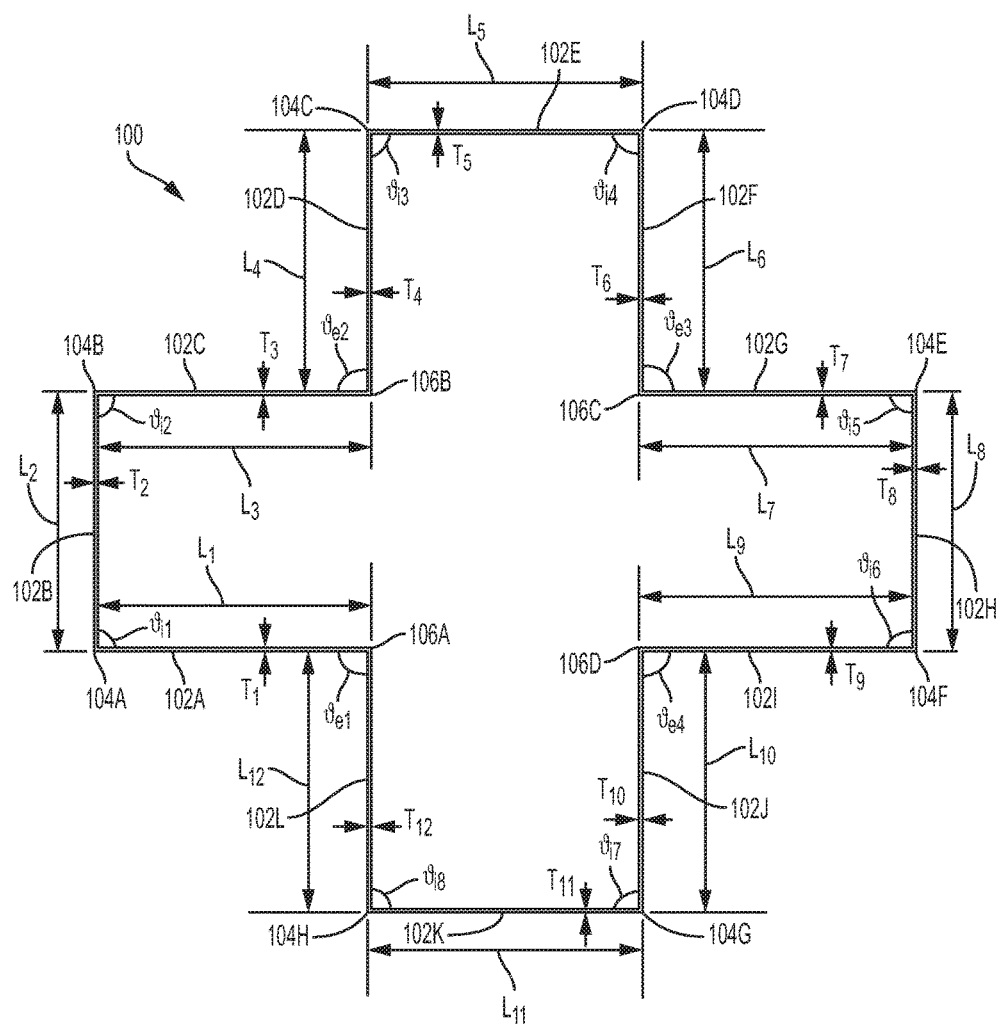
FIG. 1A-1B illustrates a detailed cross-sectional and perspective views, respectively, of an exemplary twelve-cornered cell of an exemplary cellular structure in accordance with the present disclosure.

Although the following detailed description makes reference to exemplary illustrative embodiments, many alternatives, modifications, and variations thereof will be apparent to those skilled in the art. Accordingly, it is intended that the claimed subject matter be viewed broadly.

DESCRIPTION OF EXEMPLARY EMBODIMENTS

Reference will now be made in detail to various exemplary embodiments, examples of which are illustrated in the accompanying drawings. The various exemplary embodiments are not intended to limit the disclosure. To the contrary, the disclosure is intended to cover alternatives, modifications, and equivalents of the exemplary embodiments. In the drawings and the description, similar elements are provided with similar reference numerals. It is to be noted that the features explained individually in the description can be mutually combined in any technically expedient manner and disclose additional embodiments of the present disclosure.

This description's terminology is not intended to limit the invention. For example, spatially relative terms—such as "beneath", "below", "lower", "above", "upper", "proximal", "distal", "front", "rear", "left", "right", "horizontal", "vertical", and the like—may be used to describe one element's or feature's relationship to another element or feature as illustrated in the figures. These spatially relative terms are intended to encompass different positions (i.e., locations) and orientations (i.e., rotational placements) of a device in use or operation in addition to the position and orientation shown in the figures. For example, if a device in the figures is turned over, elements described as "below" or "beneath" other elements or features would then be "above" or "over" the other elements or features. Thus, the exemplary term "below" can encompass both positions and orientations of above and below. A device may be otherwise oriented (rotated 90 degrees or at other orientations) and the spatially relative descriptors used herein interpreted accordingly. In the orientation of the figures in the application, relative x-axis, y-axis, and z-axis directions of the devices have been labeled.

The present disclosure contemplates cellular structures for a structural component, particularly, an interior of a structural component. The cellular structures of this disclosure are configured to achieve the same or similar strength increase as provided by a cellular structure made up of cells having a cross section with a basic polygonal shape (e.g., triangular, rectangular, pentagonal, hexagonal, heptagonal, or octagonal), while minimizing mass per unit length of the structural component. The present disclosure relates more specifically to a cellular structure having a plurality of cells, each cell having a cross section formed by twelve straight sides and twelve corners. The cross-sectional shapes of the cells of the cellular structures of the present disclosure are designed based in part on, for example, a variety of tunable parameters configured to achieve strength increases (i.e., load carrying and energy absorption) over basic polygonal designs (e.g., polygonal cellular cross sections having less or the same number of sides), while also allowing design flexibility to meet a range of applications specific to the structure that the structural component is a part of.

The twelve sides and twelve corners of a cross section of a cell may create eight internal angle and four external angles. A cellular structure in accordance with the present disclosure may include a plurality of such cells. The plurality of cells may or may not be interconnected. The cellular structure may include a plurality of full cells each having twelve sides and twelve corners, as described above. Alternatively, a cellular structure may include a combination of a plurality of full cells and a plurality of partial cells.

In accordance with the present teachings, the shape of the cells of the cellular structures of the structural components disclosed herein provides the cellular structures as well as the overall structural components with stabilized folding, reduced crush distance, and increased energy absorption in response to an applied compression force.

Additionally or alternatively, incorporation of the cellular structures of the present disclosure within a structural component can allow for use of a structural component having an outer periphery formed in a basic polygonal shape, such as a circular, oval, triangle, square, or rectangle, the structural component thus having a cross section, in a basic polygonal shape. Thus, rather than relying on a structural component having an outer periphery formed into a complex shape (e.g., a structural component having more than four sides) to provide increased strength and/or minimized mass per unit length of the structural component, a cellular structure according to the present disclosure may be incorporated into an interior of a structural component having a cross section with a basic polygonal shape such that the interior of the structural component is at least partially filled with the cellular structure, which provides increased strength and/or minimized mass per unit length of the structural component. Alternatively, it is also contemplated that a cellular structure according to the present disclosure may be incorporated into an interior of a structural component having an outer periphery in a complex shape, for example a complex polygonal shape.

In some exemplary embodiments, some or all of the cells of an exemplary cellular structure may be partially or wholly filled with various fillers. Further, more than one cellular structure may be provided, and with some or all of one or more of the cellular structures having some or all of the cells of the given structure being partially or wholly filled with one or more types of fillers. For example, where temperature control is desired, some or all of the cells may be partially or wholly filled with thermally insulating filler(s). Exemplary thermally insulating fillers include various foams (e.g., blown fiber glass foam, polyurethane foams), mineral wool, cellulose, polystyrene aerogels, cork, and combinations thereof. Additionally or alternatively, in other various exemplary embodiments, where sound control is required, some or all of the cells of the exemplary cellular structure(s) may be partially or wholly filled with noise insulating filler(s). Exemplary noise insulating fillers include sponge(s) melamine acoustic foams, mineral wool, open-cell rubber foams, and combinations thereof. In further various exemplary embodiments, where further structural reinforcement is desired, the cells may be partially or wholly filled with strengthening filler(s). Exemplary strengthening fillers include structural foam(s), such as thermoplastic structural foams, aluminum foams, glass or carbon fiber-reinforced structural foams, closed-cell polymer foams, and combinations thereof. In some exemplary embodiments, more than one type of filler may be incorporated in the cells. In some other exemplary embodiments, a filler may provide more than one, or even all, of the thermally insulating, noise insulating, and strengthening functions and may partially or wholly fill some or all of the cells of the exemplary cellular structure(s). Alternatively, some or all of the cells may be left unfilled (i.e., hollow or empty).

The cellular structures made up of cells having a twelve-cornered cross section as disclosed herein, and the structural components that contain one or more such cellular structures, in accordance with the present disclosure, can achieve increased energy absorption and a more stable axial collapse in comparison to cellular structures formed by cells having differing numbers of corners or sides and structural components without cellular structures or containing cellular structure(s) formed by cells having differing numbers of corners or sides, when forces such as front and side compression forces are exerted on the cellular structure and/or structural component. Furthermore, the twelve-cornered cross section of the cells of the cellular structures and structural components containing cellular structures formed of cells having the twelve-cornered cross section in accordance with the present disclosure can achieve a similar, if not greater, strength increase than cellular structures formed of cells having a hexagonal cross section (e.g., honeycomb cellular structures) and structural components containing honeycomb cellular structure(s), while minimizing mass per unit length of the cellular structures and structural components, and maintaining a high manufacturing feasibility because the structural component and/or the cellular structure with twelve-cornered cells thereof can be formed by stamping, bending, press forming, hydro-forming, molding, casting, extrusion, uniform or non-uniform roll forming, machining, forging, 3D printing, and/or other known manufacturing processes. Thus-formed components or sections of components can be joined via welding (e.g., spot welding, seam welding, laser welding, and friction stir welding), brazing, soldering, adhesive bonding, fastening, press fitting, riveting, screwing, bolting, and/or other known joining technologies.

For cellular structures that are relatively large and with only small number of cells, each cell may be manufactured by other processes separately and then joined together thereafter. Any of the aforementioned manufacturing and joining methods may be used to form such cellular structures which are relatively large and with only small number of cells. Furthermore, any of the aforementioned processes may be used for low volume production, for example, where a specifically tailored cellular structure is required. In addition, casting may be used to form magnesium and aluminum structural components with cellular structure(s) incorporated therein.

The cellular structure formed by cells having twelve corners, and structural components containing such cellular structures in accordance with the present teachings can be made of, for example, steel alloys, titanium alloys, aluminum alloys, magnesium alloys, nylons, plastics, polymers, composites, fiber-reinforced composites, silicone, semiconductor, papers, rubber, foams, gels, woods, corks, hybrid materials (i.e., multiple dissimilar materials), shape-memory materials, and/or any other suitable materials. Those of ordinary skill in the art would understand, for example, that the material used for a structural component and cellular structure thereof may be chosen based at least in part on intended application, strength/weight considerations, cost, packaging space, and/or other design factors.

Although discussed herein primarily with respect to automotive applications, the present disclosure contemplates that the various structural components and cellular structures disclosed herein may be suitable for many applications in many fields, including, for example, the fields of aeronautics (e.g., aircraft, spacecraft, etc.), watercrafts (e.g., paneling, body shell structures, interior furniture, etc. of a watercraft), railway vehicles, tram vehicles, high speed rail vehicles, magnetic levitation vehicles, and hyperloop capsules or vehicles, shipping and packaging (e.g., shipping box, pallet, cushioning member, etc.), structural vessel design (e.g., fuselage structures, water vessels, air vessels, locomotives, etc.), turbine design (e.g., rotor blade design of an engine turbine or wind turbine), solar energy (e.g., solar panel design), sporting equipment (e.g., skis, snowboards, surfboards, wakeboards, paddle boards, skateboards, water paddles, ping pong paddles, pickle ball paddles, baseball and softball bases, padding for contact sport pads, helmets, helmet padding, gloves, motor sport body armors, etc.), foot wear (e.g., shoes, athletic shoes, sandals, slippers, socks, etc. and inserts, inner soles, outer soles and upper exteriors thereof), bedding or other furniture cushioning (e.g., mattress layers, mattress pads, pillows, blankets, cushions, etc.), protective cases for mobile devices (e.g. cellular phones, tablets, media players, digital cameras, cameras, etc.), furniture (e.g., tables, stools, and chairs), shelving, storage (e.g. storage bins, tool boxes, travel cases, carrying cases, etc.), insulation (e.g, thermal insulation and sound absorption structures), construction materials (e.g., for wall structures, floor structures, roof structures, ceiling structures of buildings, as well as building surface coverings such as laminates or padding), and other strengthening applications not specifically listed here. This list of potential applications for the structures disclosed herein is intended to be exemplary only, and is not intended to limit or exclude other applications not listed herein.

Figure 1B:
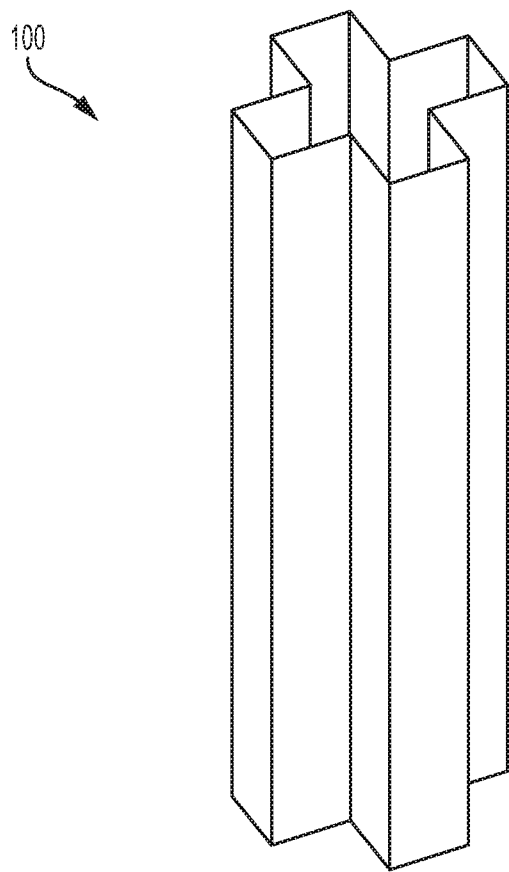

Turning now to the drawings, an exemplary embodiment of a single cell 100 of a cellular structure in accordance with the present disclosure is illustrated in FIGS. 1A and 1B, which show detailed cross-sectional and perspective views, respectively, of the single cell 100 of a cellular structure. The cell 100 has longitudinal walls that meet at longitudinal edges, which define twelve sides 102A-102L and twelve corners, of which eight are internal corners 104A-104H and four are external corners 106A-106D of the twelve-cornered cross section in accordance with the present disclosure. Each side 102A-102L has a cross-sectional length $L_1$-$L_{12}$ and cross-sectional thicknesses $T_1$-$T_{12}$, respectively. Each internal corner 104A-104H has an internal angle $\vartheta_{i1}$-$\vartheta_{i8}$, respectively. Each external corner 106A-106D has an external angles $\vartheta_{e1}$-$\vartheta_{e4}$, respectively. As shown in FIG. 1A, each side 102A-102L may be straight and each corner may be a sharp corner defined by a meeting point of two adjacent sides. Alternatively, although not shown, sides may be curved at their ends to provide rounded corners. Accordingly, it is contemplated that each corner may be a rounded corner having a bend radius.

Depending upon the particular application and/or the desired features of the structural component and/or the cellular structure thereof, the lengths of the sides and the thicknesses of the sides of the twelve-sided, twelve-cornered cross section of the cells of the cellular structure can be varied (i.e., can be tuned) to achieve improved strength and other performance features (e.g., stability of folding pattern) compared to basic polygonal cross sections of cells of a conventional cellular structure. Varying these features of the twelve-sided, twelve-cornered strengthening member may obviate the need for increased corner thickness. In accordance with various exemplary embodiments of the present teachings, the cross-sectional lengths $L_1$-$L_{12}$ of sides 102A-102L and the cross-sectional thicknesses $T_1$-$T_{12}$ of the sides 102A-102L can be varied to a certain degree, as would be understood by one skilled in the art, for example in accordance with available space within a structural component.

The perimeter of the twelve-cornered cell's cross section generally forms a polygon comprising a plurality of internal and external corners. As embodied herein and shown in FIG.

1A, the polygon may be formed of alternating internal and external corners/angles, and in particular, may be formed by alternating two consecutive internal corners/angles with a single external corner/angle. This repeating pattern, which alternates between two consecutive internal corners/angles and one external corner angle (i.e., an alternating two-in-one-out configuration), results in a cross section with more than two bisecting planes of symmetry (e.g., three bisecting planes of symmetry, or four-or-more bisecting planes of symmetry). For example, cell 100 of FIG. 1A has four bisecting planes of symmetry.

Cell 100 with the twelve-cornered cross section shown in FIG. 1A has eight are internal corners 104A-104H and four are external corners 106A-106D. More than two bisecting planes of symmetry, as described above, may be provided when each internal angle $\vartheta_{i1}$-$\vartheta_{i8}$ of each internal corner 104A-104H is substantially the same and each external angle $\vartheta_{e1}$-$\vartheta_{e4}$ of each external corner 106A-106D is substantially the same. In this case, the internal angles $\vartheta_{i1}$-$\vartheta_{i8}$ are collectively referred to as internal angle $\vartheta_i$ and the external angles $\vartheta_{e1}$-$\vartheta_{e4}$ are collectively referred to as external angle $\vartheta_e$. FIG. 1A illustrates an exemplary embodiment in which the internal angle $\vartheta_i$ is an approximate right angle (i.e., about 90 degrees) and the external angle $\vartheta_e$ is an approximate right angle (i.e., about 90 degrees). Thus, FIG. 1A illustrates an exemplary embodiment where both each of the eight internal angles $\vartheta_{i1}$-$\vartheta_{i8}$ and four external angles $\vartheta_{e1}$-$\vartheta_{e4}$ are substantially the same, and, more particularly, each of the internal angles and external angles are about a right angle (i.e., about 90 degrees).

In certain exemplary embodiments of the present disclosure, such as in an automobile, board sport, packaging, furniture, turbine, or solar application, for example, a cross-sectional length $L_1$-$L_{12}$ of each side 102A-102L of the each of the cells 100 can range from about 2 mm to about 50 mm. In other exemplary embodiments, such as in an aircraft, spacecraft, watercraft, wind turbine, or building application, for example, a length of each side $L_1$-$L_{12}$ of the strengthening member may be larger. In yet other exemplary embodiments, such as, for example, some ultra-light spacecraft applications, a length of each side $L_1$-$L_{12}$ of the strengthening member may be smaller, for example, nanoscopic in scale. In some exemplary embodiments the cross-sectional lengths $L_1$-$L_{12}$ of each side (e.g., each side 102A-102L (see FIG. 1)) is substantially the same. Furthermore, in some exemplary embodiments the cross-sectional lengths $L_1$-$L_{12}$ of each side can vary with respect to the cross-sectional length of one or more of each other side wall (e.g., cell 300 of FIGS. 3 and 4). Alternatively or additionally, in some exemplary embodiments, the cross-sectional length of a side can vary along a length of the longitudinal side of the cell (i.e., the longitudinal wall of the cell tapers along its length such that the cross-sectional lengths vary to form the taper).

In certain exemplary embodiments of the present disclosure, such as in a vehicle, board sport, packaging, furniture, turbine, or solar application, for example, a cross-sectional thickness $T_1$-$T_{12}$ of each side 102A-102L of the each of the cells 100 can range from about 0.5 mm to about 10.0 mm. In other exemplary embodiments of the cells of a cellular structure of a structural component, such as in an aircraft, spacecraft, watercraft, wind turbine, or building application, for example, a thickness $T_1$-$T_{12}$ of the sides of the strengthening member may be larger. In yet other exemplary embodiments, such as, for example, ultra-light spacecraft applications, a thickness $T_1$-$T_{12}$ of the sides of the strengthening member may be smaller, for example, nanoscopic in scale. In some exemplary embodiments the cross-sectional thickness $T_1$-$T_{12}$ of each side (e.g., each side 102A-102L (see FIG. 1)) is substantially the same. In some other exemplary embodiments the cross-sectional thickness $T_1$-$T_{12}$ of each side can vary with respect to the cross-sectional thickness of one or more of the other side walls. Alternatively or additionally, the thickness $T_1$-$T_{12}$ can vary within each cross-sectional length of each of side.

The cross-sectional length and thickness of each side of the cells of a cellular structure in accordance with the present disclosure may be sized in relation to one another. For example, a ratio of the cross-sectional thickness of a side to the length of the side may range from about 1:4 to about 1:10,000. In the exemplary embodiment of FIG. 1, where the each of the sides 102A-102L has the same cross-sectional length (i.e., $L_1$-$L_{12}$=L) and cross-sectional thickness (i.e., $T_1$-$T_{12}$=T), a ratio of the cross-sectional thickness T of the sides 102A-102L to the cross-sectional length L of the sides 102A-102L (i.e., T:L ratio) may range from about 1:4 to about 1:10,000.

Referring now to FIG. 30, a detailed perspective view of an exemplary embodiment of a cellular structure 3000 is shown. The cellular structure 3000 includes at least two cells 100, each cell 100 having a plurality of longitudinal walls that extend between a top and a bottom of the cell. The longitudinal walls intersect to create corners of each cell 100, and a transverse cross section of each cell 100 includes twelve corners. The at least two cells 100 may share one or more longitudinal walls. For example, the cells may be interconnected such that each cell shares at least one wall with an adjacent cell or some cells, surrounded by others of the plurality of cells, may share each wall with another adjacent cell. Additionally or alternatively, each cell may be formed completely independently of the other cells in the cellular structure. Furthermore, each cell may have a twelve-cornered transverse cross section in accordance with the exemplary embodiments shown in FIGS. 1A and 3, and/or the descriptions thereof, as set forth herein. Accordingly, the intersections of the longitudinal walls of the cellular structure 3000 create eight internal angles and four external angles of each cell 100. Specifically, each cell 100 of the cellular structure 3000 includes twelve longitudinal walls. In various embodiments, such as that shown in FIG. 30, for example, each side and/or surface of a cellular structure is exposed (i.e., free of a panel, wall, or other type of cover structure), such that the cellular structure itself is a stand-alone structural component.

Figure 2A:
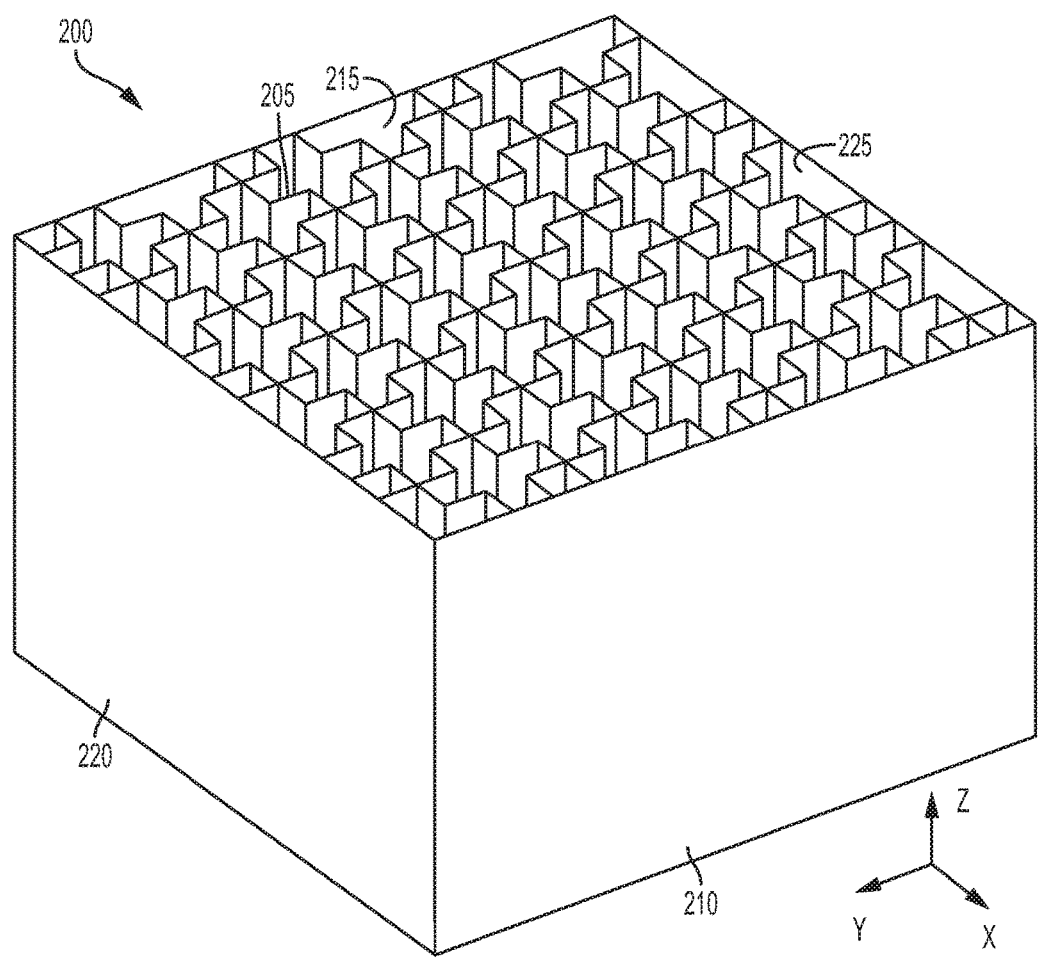
FIGS. 2A-2B illustrate detailed perspective and top views, respectively, of a first exemplary embodiment of a structural component having a cellular structure formed by a plurality of cells, each full cell having the exemplary twelve-cornered cross section, as shown in FIGS. 1A-1B.

In another exemplary embodiment, illustrated in FIG. 2A, a structural component 200 includes a cellular structure 201. A cross section of the interior of structural component 200 is entirely filled with a cellular structure 201 made up of a plurality of hollow interconnected cells 100 with a twelve-cornered cross section and fragments (partial cells) thereof. The cellular structure 100 may extend along a full length of the structural component 200 or may extend only along a portion of the length of the structural component. Additionally or alternatively, a plurality of cellular structures 201 may be provided in the structural component 200, for example, stacked one on top of another to fill a length of the structural component 200. Additionally or alternatively, as previously discussed, a portion of one or more of the cellular structures 201 may contain at least some type of filling to provide insulation against sound and/or heat and/or to add additional strength. Further, although not shown, it is contemplated that the interior of a structural component may be only partially filled with a cellular structure made up of interconnected cells 100 with a twelve-cornered cross section (e.g., at least a portion of one of a width, depth, or height (length) of the structural component may not contact a portion of one or more cellular structures contained within the structural component).

In various exemplary embodiments, the internal cross section of the structural component 200 is defined by at least one side or surface forming the outer periphery of the structural component. For example, the outer periphery of the structural component may include at least one panel, wall, or other type of cover structure. The panel, wall, or other type of cover structure may be opaque or, alternatively, wholly or partially translucent or transparent so as to make the cellular structure optically viewable from the exterior of the structural component. Alternatively, or in addition, to the at least one panel, wall, or other type of cover structure, the structural component may have at least side or surface that is open (i.e., free of a panel, wall, or other type of cover structure). For example, the structural component 200 of FIG. 2A has six sides, including an upper side that is open and defined by the upper lateral edges 205 of the cells 100 of the cellular structure, a lower side (hidden from view in FIG. 2A) that is open and defined by lower lateral edges (hidden from view in FIG. 2A) of the interconnected cells 100 of the cellular structure, a front side defined by a front wall 210 (the exterior surface thereof being exposed in FIG. 2A), a rear side defined by a rear wall 215 (a portion of the interior surface thereof being exposed in FIG. 2A), a left side defined by a left wall 220 (the exterior surface thereof being exposed in FIG. 2A), and a right side defined by a right wall 225 (a portion of the interior surface thereof being exposed in FIG. 2A). The open upper side defined by the upper lateral edges 205 of the cells 100 forms a flat top. Similarly, the open lower side defined by lower lateral edges (hidden from view in FIG. 2A) of the interconnected cells 100 forms a flat bottom. Although not shown, angled and/or curved sides are also contemplated.

Figure 2B:
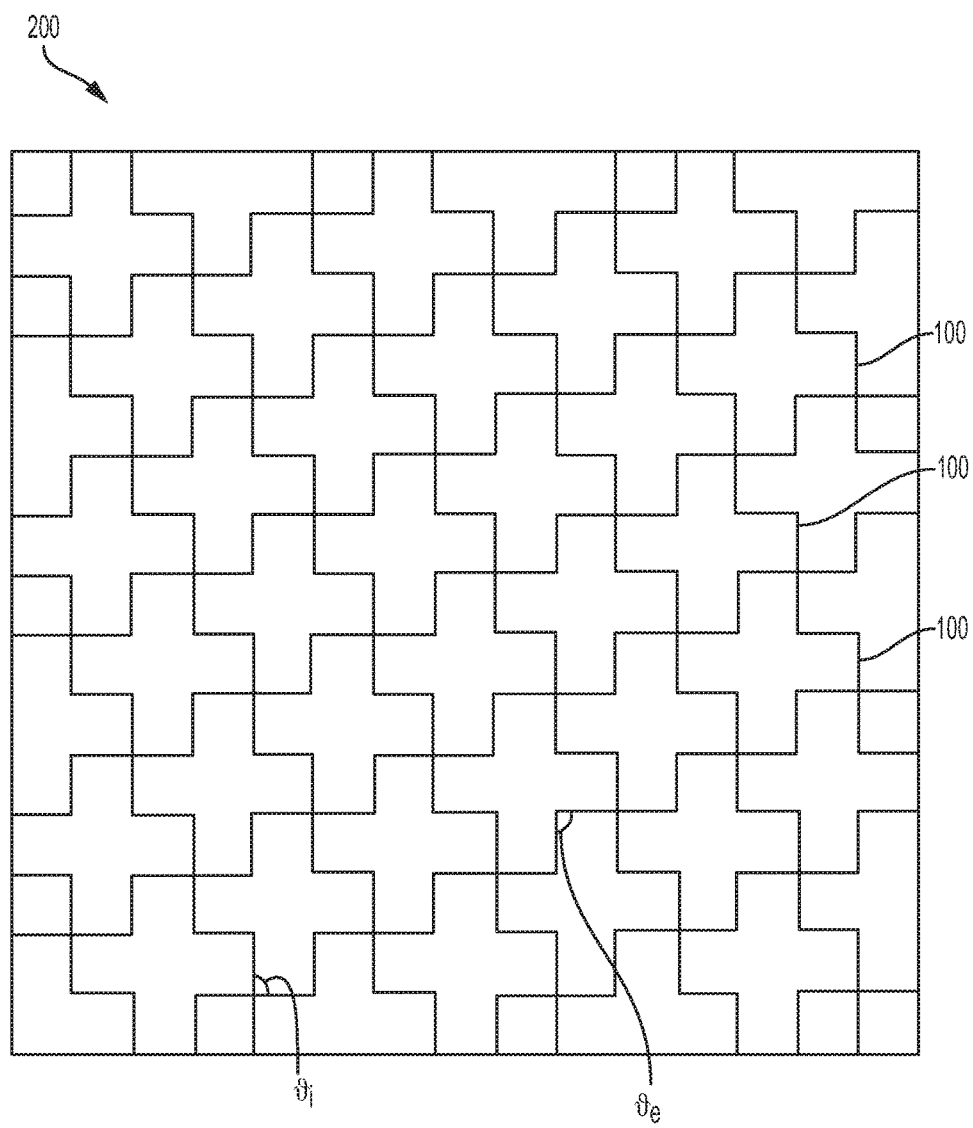

Referring now to FIG. 2B, a top view of the exemplary structural component 200 of FIG. 2A is shown. As described above, and shown in FIG. 2B, each cell 100 of the cellular structure of the structural component 200 has a twelve-cornered cross section with eight internal corners and four external corners. The internal angle $\vartheta_i$ of each internal corner is about a right angle (i.e., about 90 degrees). The external angle $\vartheta_e$ of each external corner is about a right angle (i.e., about 90 degrees). Additionally, each side of the cells 100 has the same cross-sectional length and the same cross-sectional thickness. Tuning parameters of the twelve-cornered cross section of each cell in this manner allows a plurality of the cells to be interconnected such that there is no void between any of the twelve cornered cells. In other words, all of the full-size cells (i.e., cells that are not cut off by a side or surface of the structural component) with a twelve-cornered cross section are interconnected together so that there are no gaps or alternative shaped cells therebetween. In this way, a cellular structure is provided that consists entirely of interconnected cells that each have a twelve-cornered cross section with eight internal corners having an internal angle of about 90 degrees and four external corners having an internal angle of about 90 degrees. Alternatively, in another exemplary embodiment, although not shown, partial cells (i.e., alternatively shaped cells with a cross section having a differing number of total corners or total internal and external corners) that are not cut off by a side or surface of a structural component may be interspersed with, and may be connected to, cells in a cellular structure that includes some cells that have a twelve-cornered cross section with eight internal corners and four external corners. Additionally or alternatively, a plurality of cellular structures of the above described varying types may be stacked one on top of another.

For example, an exemplary stacked structure may include a first cellular structure layer that consists entirely of connected cells that each have a twelve-cornered cross section, and a second cellular structure layer that includes some cells that have a twelve-cornered cross section and some alternatively shaped cells. Another exemplary stacked structure may include a first cellular structure layer that consists entirely of connected cells that each have a twelve-cornered cross section, and a second cellular structure layer that consists entirely of connected cells that each have a twelve-cornered cross section with varied dimensions compared to the cells of the first cellular structure layer. Yet another exemplary stacked structure may include a first cellular structure layer includes some cells that have a twelve-cornered cross section and some alternatively shaped cells, and a second cellular structure layer that includes some cells that have a twelve-cornered cross section and some alternatively shaped cells with varied dimensions compared to the cells of the first cellular structure layer.

As shown in FIG. 2B, the cells may share longitudinal walls. However, alternatively, each cell may have its own longitudinal walls such that two longitudinal walls of adjacent cells form sides that consist of a two wall barrier between each hollow cell cavity (not shown).

In other various alternative embodiments, for example, a structural component may have a cellular structure core with two planar structures on opposing sides of the cellular structure so as to form a sandwich structure. For example, as shown in FIGS. 29A-29B, a sandwich structure 2900 can have a cellular structure 2902 between top panel 2904 and bottom panel 2906. Top and bottom panels 2904 and 2906 may be in the form of any type of planar structure. The planar structures may be made of, for example, paper, wood, aluminum alloys, polymers, and carbon or glass fiber reinforced composites, and may be opaque, translucent, clear, etc. For example, in some applications in which it a sandwich structure formed from a cellular structure in accordance with the present teachings and at least one planar structure, one of the planar structures may be clear or translucent to allow an observer of the product containing the cellular structure to see a portion of the cellular structure, such that the cellular structure forms a part of the aesthetic design of the product. Such a type of product is shown, for example, in U.S. Patent Application Pub. No. US20080014809, which is incorporated herein by reference. The structure disclosed in US Patent Application Pub. No. US20080014809 is intended to be exemplary only, and many other structures can be used as will be understood by to those of skill in the art.

A cellular structure of the various sandwich structures contemplated herein includes at least two cells, each cell having a plurality of longitudinal walls that extend between a top and a bottom of the cell. The longitudinal walls intersect to create corners of the cell, and a transverse cross section of the cell comprises twelve corners. Furthermore, each cell may have a twelve-cornered transverse cross section in accordance with the exemplary embodiments shown in FIGS. 1A and 3, and/or the descriptions thereof, as set forth herein.

Cover structures may be formed integrally with a cellular structure via conventional means such as molding and/or casting. Alternatively, cover structures may be bonded, coupled, or otherwise affixed to the cellular structure via any conventional means, such as adhesion, lamination, mechanical fastening and/or welding.

Figure 3:
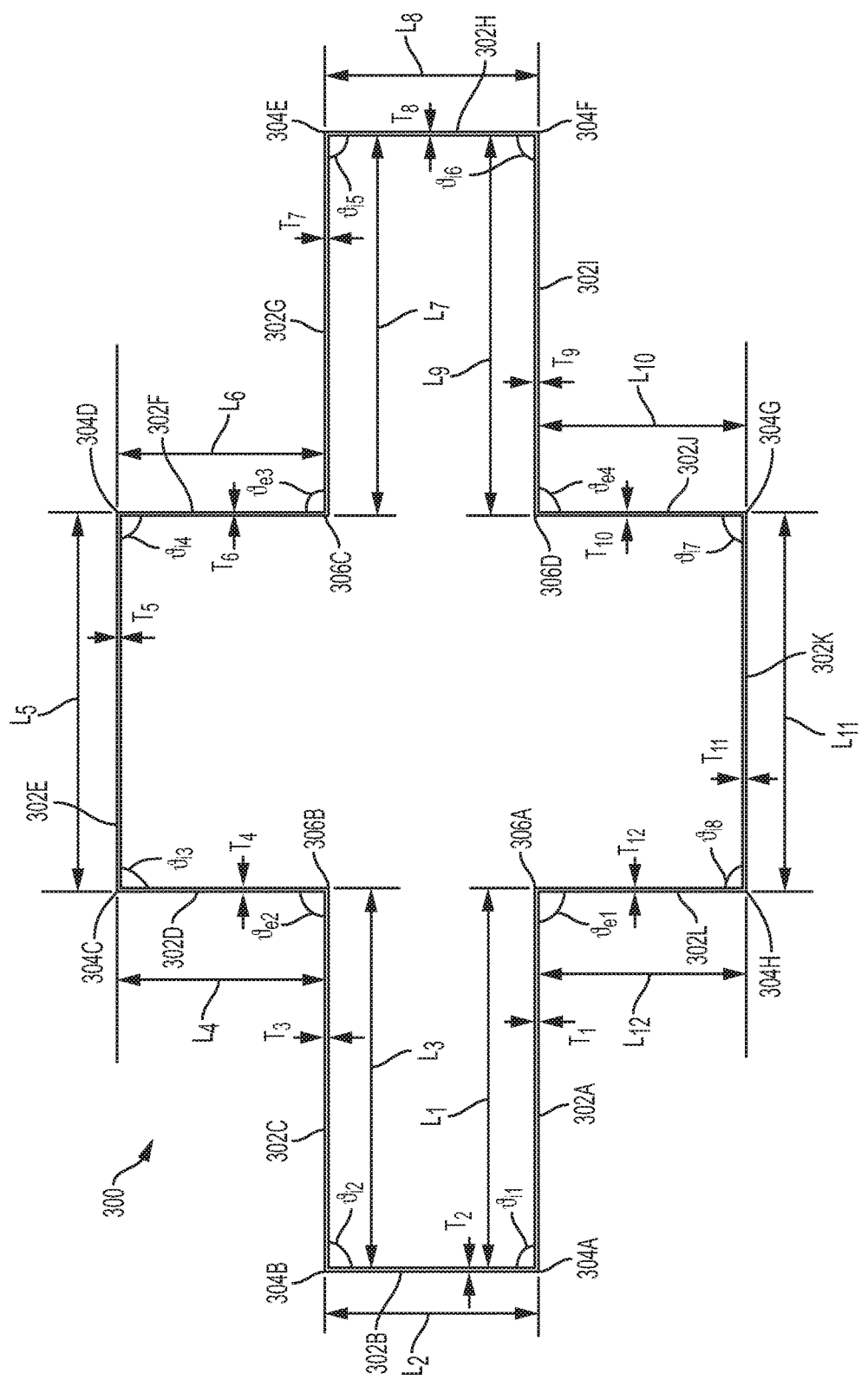
FIG. 3 illustrates a detailed cross section of another exemplary twelve-cornered cell of another exemplary cellular structure in accordance with the present disclosure.

Referring now to FIG. 3 another exemplary embodiment of a single cell 300 of a cellular structure in accordance with the present disclosure is illustrated, which shows a detailed cross-sectional view of the single cell 300 of a cellular structure. Similar to cell 100, the cell 300 has longitudinal walls that meet at longitudinal edges, which define twelve sides 302A-302L and twelve corners, of which eight are internal corners 304A-304H and four are external corners 306A-306D, of the twelve-cornered cross section in accordance with the present disclosure. Each side 302A-302L has a cross-sectional length $L_1$-$L_{12}$ and cross-sectional thicknesses $T_1$-$T_{12}$, respectively. Each internal corner 304A-304H has an internal angle $\vartheta_{i1}$-$\vartheta_{i8}$, respectively. Each external corner 306A-306D has an external angle $\vartheta_{e1}$-$\vartheta_{e4}$ respectively. As shown in FIG. 3, each side may be straight and each corner may be a sharp corner defined by a meeting point of two adjacent sides. Alternatively, although not shown, it is contemplated that each corner may be a rounded corner having a bend radius and each adjacent straight side may extend from opposing ends of the rounded corner.

Each internal angle $\vartheta_{i1}$-$\vartheta_{i8}$ of each internal corner 304A-304H is substantially the same and each external angle $\vartheta_{e1}$-$\vartheta_{e4}$ of each external corner 306A-306D is substantially the same. In this case, the internal angles $\vartheta_{i1}$-$\vartheta_{i8}$ are collectively referred to as internal angle $\vartheta_i$ and the external angles $\vartheta_{e1}$-$\vartheta_{e4}$ collectively referred to as external angle $\vartheta_e$. Similar to FIG. 1, FIG. 3 illustrates an exemplary embodiment in which the internal angle $\vartheta_i$ is about a right angle (i.e., about 90 degrees) and the external angle $\vartheta_e$ is about a right angle (i.e., about 90 degrees). Thus, FIG. 3 illustrates an exemplary embodiment where both each of the eight internal angles $\vartheta_{i1}$-$\vartheta_{i8}$ and four external angles $\vartheta_{e1}$-$\vartheta_{e4}$ are substantially the same, and, more particularly, each of the internal angles and external angles are about a right angle (i.e., about 90 degrees).

Rather than keeping all of the cross-sectional lengths $L_1$-$L_{12}$ substantially the same, the cross-sectional lengths $L_1$-$L_{12}$ of each side of the cells of a cellular structure in accordance with the present disclosure may be sized differently in relation to one another. For example, as demonstrated in exemplary embodiment of FIG. 3, each of the sides 302A, 302C, 302G, and 302I has the same cross-sectional length $L_a$ (i.e., $L_1=L_3=L_7=L_9=L_a$), and each of the sides 302B and 302H has the same cross-sectional length $L_b$ (i.e., $L_2=L_8=L_b$), but cross-sectional length $L_a$ and cross-sectional length $L_b$ are substantially different, such that a ratio of the cross-sectional length $L_a$ of sides 302A, 302C, 302G, and 302I to the cross-sectional length $L_b$ of sides 302B and 302H (i.e., $L_a$:$L_b$ ratio) is about 20:11. The $L_a$:$L_b$ ratio of a cross section of a cell of a cellular structure in accordance to the present disclosure may range from about 1:5 to about 5:1. In a further example, as also demonstrated in exemplary embodiment of FIG. 3, each of the sides 302D, 302F, 302J, and 302L has the same cross-sectional length $L_c$ (i.e., $L_4=L_6=L_{10}=L_{12}=L_c$), and each of the sides 302E and 302K has the same cross-sectional length $L_d$ (i.e., $L_5=L_{11}=L_d$), but cross-sectional length $L_c$ and cross-sectional length $L_d$ are substantially different, such that a ratio of the cross-sectional length $L_c$ of sides 302D, 302F, 302J, and 302L to the cross-sectional length $L_d$ of sides 302E and 302K (i.e., $L_c$:$L_d$ ratio) is about 11:20. The $L_c$:$L_a$ ratio of a cross section of a cell of a cellular structure in accordance to the present disclosure may range from about 1:5 to about 5:1. It is further contemplated that each of the cross-sectional lengths $L_a$, $L_b$, $L_c$, and $L_d$, as they are defined above, may be tuned to be a different size and still a plurality of the cells tuned in this manner is capable of being interconnected such that there is no void between any of the twelve cornered cells.

Figure 4:
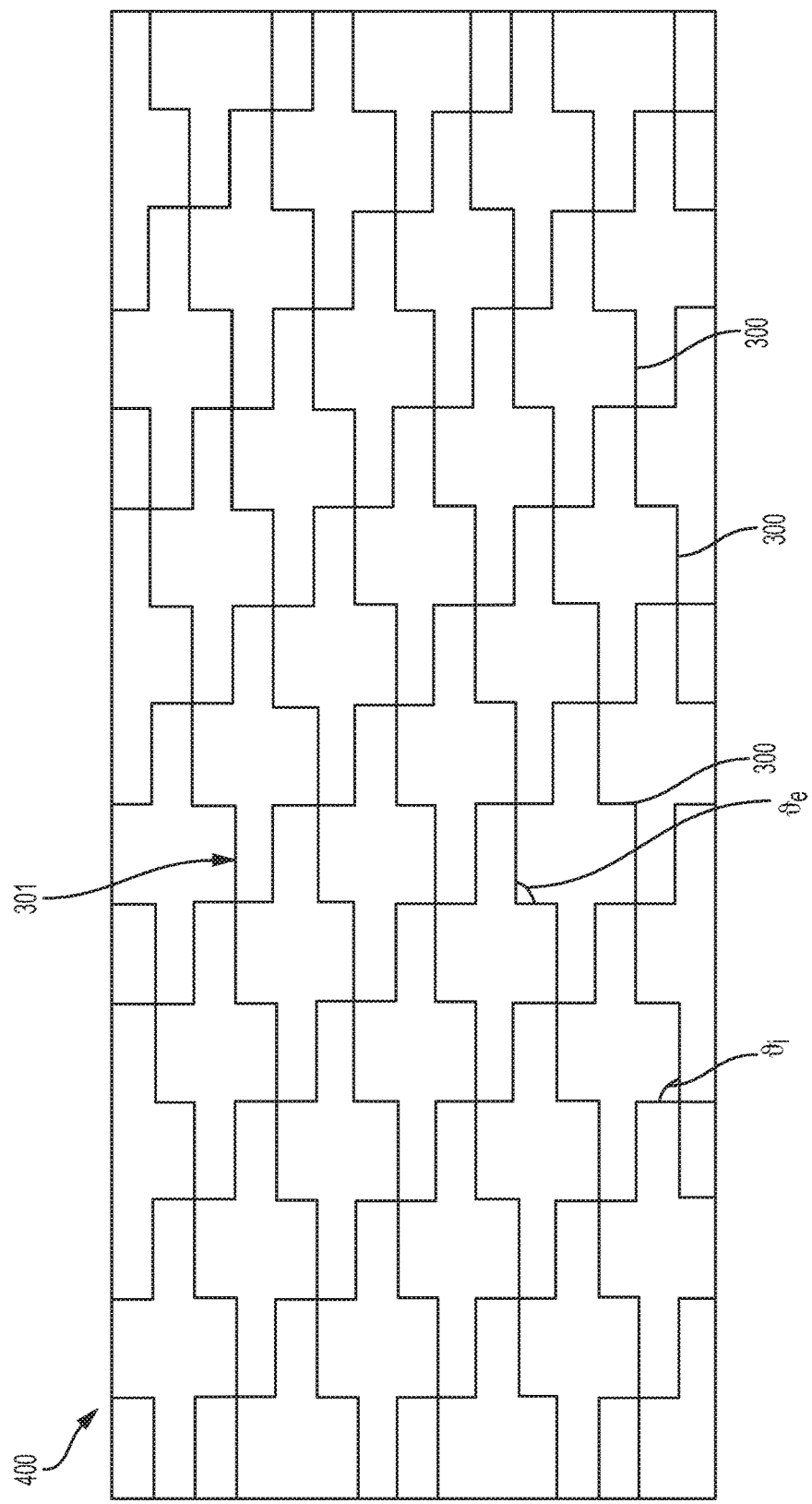
FIG. 4 illustrates a top view of a second exemplary embodiment of a structural component having a cellular structure with a plurality of cells, each full cell having the exemplary twelve-cornered cross section, as shown in FIG. 3.

Turning to FIG. 4, an alternative exemplary embodiment of a structural component 400 is illustrated, which shows a detailed top view of structural component 400. The interior of structural component 400 is entirely filled with a cellular structure 301 made up of interconnected cells 300 with a twelve-cornered cross section or fragments thereof. Alternatively, although not shown, it is contemplated that the interior of a structural component may be partially filled with a cellular structure made up of interconnected cells 300 with a twelve-cornered cross section. The cellular structure 300 may extend along a full length of the structural component 400 or may extend only along a portion of the length of the structural component. Additionally or alternatively, a plurality of cellular structures 301 may be provided in the structural component 400, for example, stacked one on top of another to fill a length of the structural component 400. Additionally or alternatively, as previously discussed, a portion of one or more of the cellular structures 301 may contain at least some type of filling to provide insulation against sound and/or heat and/or to add additional strength. Further, although not shown, it is contemplated that the interior of a structural component may be only partially filled with a cellular structure made up of interconnected cells 300 with a twelve-cornered cross section (e.g., at least a portion of one of a width, depth, or height (length) of the structural component may not contact a portion of one or more cellular structures contained within the structural component).

Each cell 300 of the cellular structure of the structural component 400 has a twelve-cornered cross section with eight internal corners and four external corners. The internal angle $\vartheta_i$ of each internal corner is about a right angle (i.e., about 90 degrees). The external angle $\vartheta_e$ of each external corner is about a right angle (i.e., about 90 degrees). Additionally, each side of the cells 300 has the same cross-sectional thickness and the lengths are tuned with respect to one another as described above. Tuning parameters of the twelve-cornered cross section of each cell in this manner allows a plurality of the cells to be interconnected such that there is no void between any of the twelve cornered cells. In other words, all of the full-size cells (i.e., cells that are not cut off by a side or surface of the structural component) with a twelve-cornered cross section are interconnected together so that there are no gaps or alternative shaped cells therebetween. In this way, a cellular structure is provided that consists entirely of interconnected cells that each have a twelve-cornered cross section with eight internal corners having an internal angle of about 90 degrees and four external corners having an internal angle of about 90 degrees.

More generally, the various exemplary embodiments of the present teachings contemplate, for example, structural components with interior cellular structure having cells with cross-sectional sides having variable cross-sectional thicknesses, and/or having variable tapered longitudinal walls and edges. Various additional exemplary embodiments contemplate structural components with at least one side or surface that is open or defined by at least one panel, wall, or other type of cover structure, and that the one or more side or surface is bent and/or curved. Moreover, to further adjust a structural components folding pattern and/or peak load capacity, various additional exemplary embodiments also contemplate structural components and/or the cells of the cellular structure thereof having trigger holes, flanges, and/or convolutions as would be understood by those of ordinary skill in the art.

Additionally, structural components may incorporate multiple cellular structures, with each cellular structure having cells with different sized parameters and/or different materials in accordance with the present disclosure. Combinations of one or more of the above described variations are also contemplated. For example, a plurality of cellular structure layers may be overlaid onto one another other, such that a first cellular structure layer has differently sized cells, longitudinal length, and/or materials than that of a second cellular structure layer. Overlaid first and second cellular structure layers may optionally have one or more plate layers disposed between them to facilitate bonding the cellular structure layers together, and/or to provide additional strength and stiffness.

As discussed and embodied herein, multiple tunable parameters—including but not limited to the lengths $L_1$-$L_{12}$ and thicknesses $T_1$-$T_{12}$ of the sides of the cells, the internal angles $\vartheta_{i1}$-$\vartheta_{i8}$ and external angles $\vartheta_{e1}$-$\vartheta_{e4}$ of the corners, may all be tuned within the same cellular structure. These parameters all may be tuned within the same cellular structure to provide desired characteristics in the structural component.

In the illustrated embodiments of FIGS. 1-4, the cellular structure and/or the entire structural component may have a one-piece construction. As stated above, the one-piece constructions shown in FIGS. 1 through 4 are exemplary only and the present teachings contemplate structural component and cellular structures thereof that have other constructions such as two-piece construction or having three or more pieces. For example, the cellular structure may be a separate construction from the one or more panel, wall, or other type of cover structure that defines the one or more one side or surface of a structural component, thereby providing a structural component with an interior cellular structure that is of at least a two-piece construction.

To demonstrate the improved strength and performance features of a cellular structure consisting of cells having a twelve-cornered cross section with eight internal angles and four external angles in accordance with the present disclosure, the inventors compared various existing and conventional cellular cross section designs to twelve-cornered cellular cross sections based on the designs disclosed herein. Exemplary structural components with interior cellular structures were modeled and compression simulation runs were conducted, as shown and described below with reference to FIGS. 5A-26.

Figure 5C:
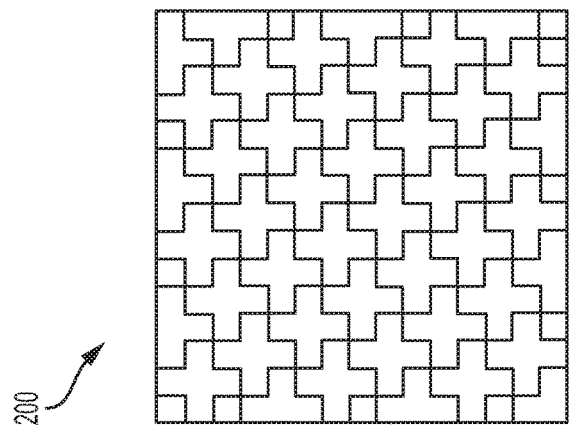
FIG. 5C illustrates another detailed top view of the exemplary structural component of FIGS. 2A-2B.
Figure 5B:
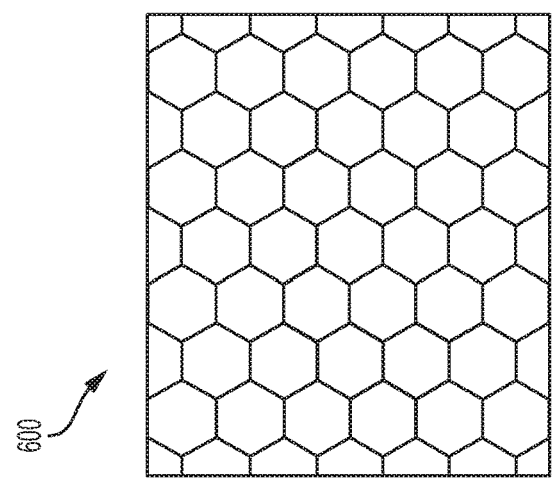
FIG. 5B illustrates a detailed top view of a structural component having a cellular structure with a plurality of cells, each full cell having a basic, six-cornered cross section.
Figure 5A:
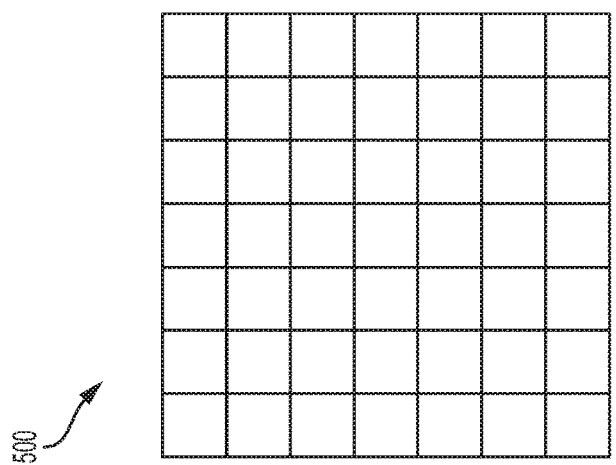
FIG. 5A illustrates a detailed top view of a structural component having a cellular structure with a plurality of cells, each full cell having a basic, four-cornered cross section.
Figure 6C:
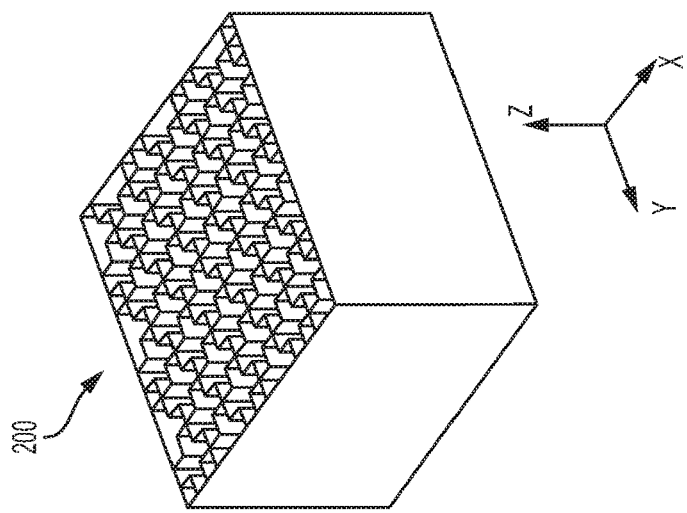
FIG. 6C illustrates a detailed perspective view of the structural component of FIG. 5C.
Figure 6B:
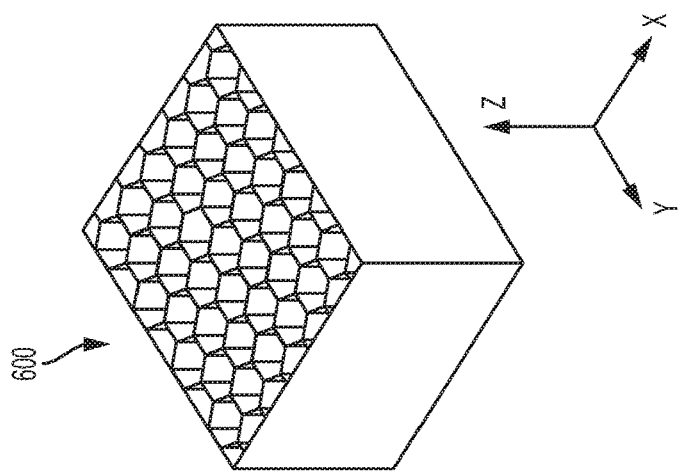
FIG. 6B illustrates a detailed perspective view of the structural component of FIG. 5B.
Figure 6A:
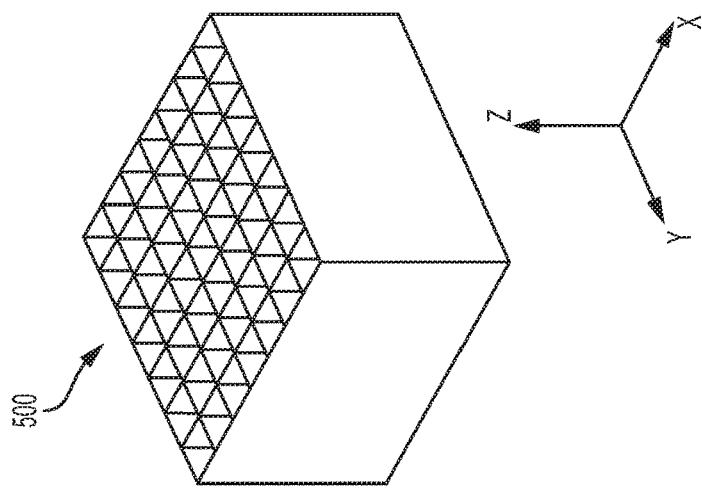
FIG. 6A illustrates a detailed perspective view of the structural component of FIG. 5A.

Finite element models of structural components with interior cellular structures having interconnected cells with varying shapes (i.e., cross sections) having the same thickness and longitudinal length were developed as illustrated in FIGS. 5A-5C and 6A-6C. FIGS. 5A and 6A show top and perspective views, respectively, of a structural component 500 with an interior cellular structures having interconnected cells with each full cell having a basic, four-cornered cross section (i.e., square shape). FIGS. 5B and 6B show top and perspective views, respectively, of a structural component 600 with an interior cellular structures having interconnected cells with each full cell having a basic, six-cornered cross section (i.e., regular hexagon shape). FIGS. 5C and 6C show top and perspective views, respectively, of a structural component 200 with an interior cellular structures having interconnected cells with each full cell having a twelve-cornered cross section, like that of FIGS. 2A-2B as described above.

The structural components 200, 500, 600 were modeled to have as close to the same total number of cells as possible. The cellular structure of structural component 500 has 49 square cells, the cellular structure of structural component 600 has 48 regular hexagon cells, and the cellular structure of structural component 200 has 45 twelve-cornered cells.

The structural components 200, 500, 600 have the approximately the same total mass, mass per cell, side thicknesses, and longitudinal length (i.e., length along the z-axis). By virtue of maintaining the total mass, per cell mass, side thicknesses, and total number of cells approximately the same, structural components 200, 500, 600 each have varied lateral dimensions (i.e., lengths along the x- and y-axes). In particular, structural component 500 was modeled to have lateral dimensions of 195 mm×195 mm; structural component 600 was modeled to have lateral dimensions of 202 mm×176 mm; and structural component 200 was modeled to have lateral dimensions of 150 mm×150 mm. The longitudinal length of each structural component 200, 500, and 700 is 100 mm.

To compare the structural components 200, 500, 600 with interior cellular structures having interconnected cells with varying shapes, exemplary structural components 200, 500, 600 with interior cellular structure were modeled twice as structurally described above. In the first modeling, the cellular structure of the structural components 200, 500, 600 were made of aluminum. In the second modeling, the cellular structure of the structural components 200, 500, 600 were made of polymer. Multiple finite element experimental test runs were conducted for both the aluminum and polymer versions of structural components 200, 500, and 600, as shown and described below with reference to FIGS. 7-14. FIGS. 7-10 relate to the experimental test runs that were conducted for the aluminum versions. FIGS. 11-14 relate to the experimental test runs that were conducted for the polymer versions.

The test runs for each structural component simulated an impact with the same boundary condition, rigid mass (e.g. an impactor), impact speed, and initial kinetic energy.

Figure 7C:
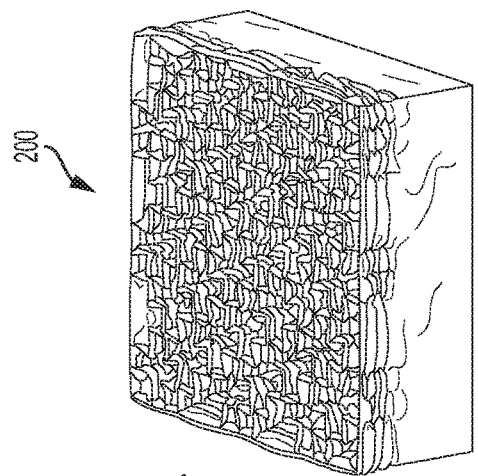
FIG. 7A-7C illustrate modeled aluminum versions of the structural components shown in FIGS. 6A-6C, respectively, at a time interval of 8 milliseconds during an exemplary dynamic crush.
Figure 7B:
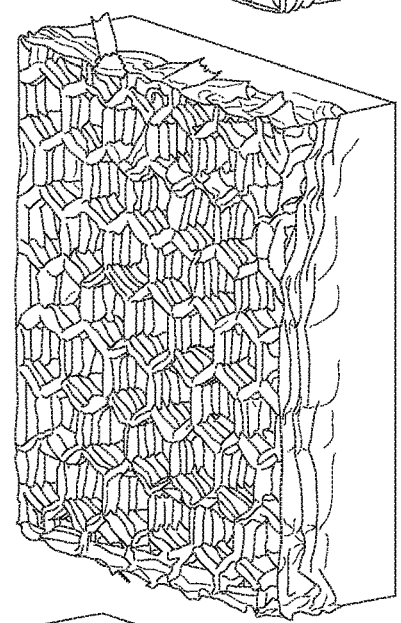
Figure 7A:
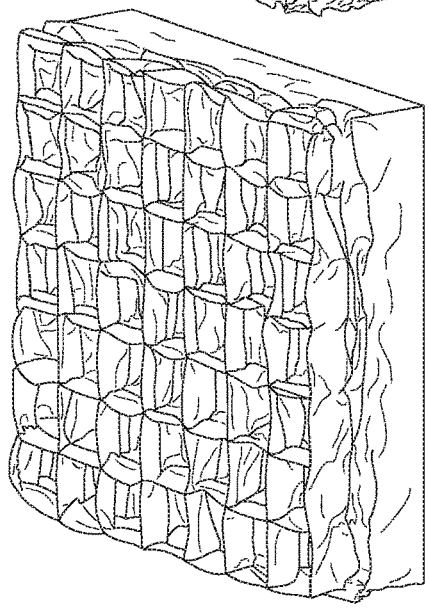

FIG. 7 shows aluminum versions of modeled structural components 500, 600, and 200 at a time interval of 8 milliseconds during a simulated dynamic crush. During each dynamic crush, the impactor is propelled by a gas gun with a designated mass and initial impact velocity which creates a designated initial kinetic energy. The initial kinetic energy crushes the structural components and the initial kinetic energy is transferred into the internal energy of the structural components and cellular structures thereof. Performance of each structural component and cellular structure thereof can be compared by measuring the crush displacement, crush force, and specific energy absorption of each structural component. As shown in FIG. 7, during the simulated dynamic crush, the structural component 200 having an aluminum cellular structure with twelve-cornered cells in accordance with the present disclosure demonstrated shorter crush displacement and smaller folding lengths than the structural components 500 and 600 having an aluminum cellular structure with square and regular hexagon cells, respectively. Additionally, as shown in FIG. 7, aluminum versions of structural components 500 and 600 undesirably exhibited more irregular crushing patterns, as evidenced, in particular, by the undesirable buckling and/or more severe plastic deformation in lower portions of structural components 500 and 600, as well as the breaking top edges of structural component 600.

Figure 8:
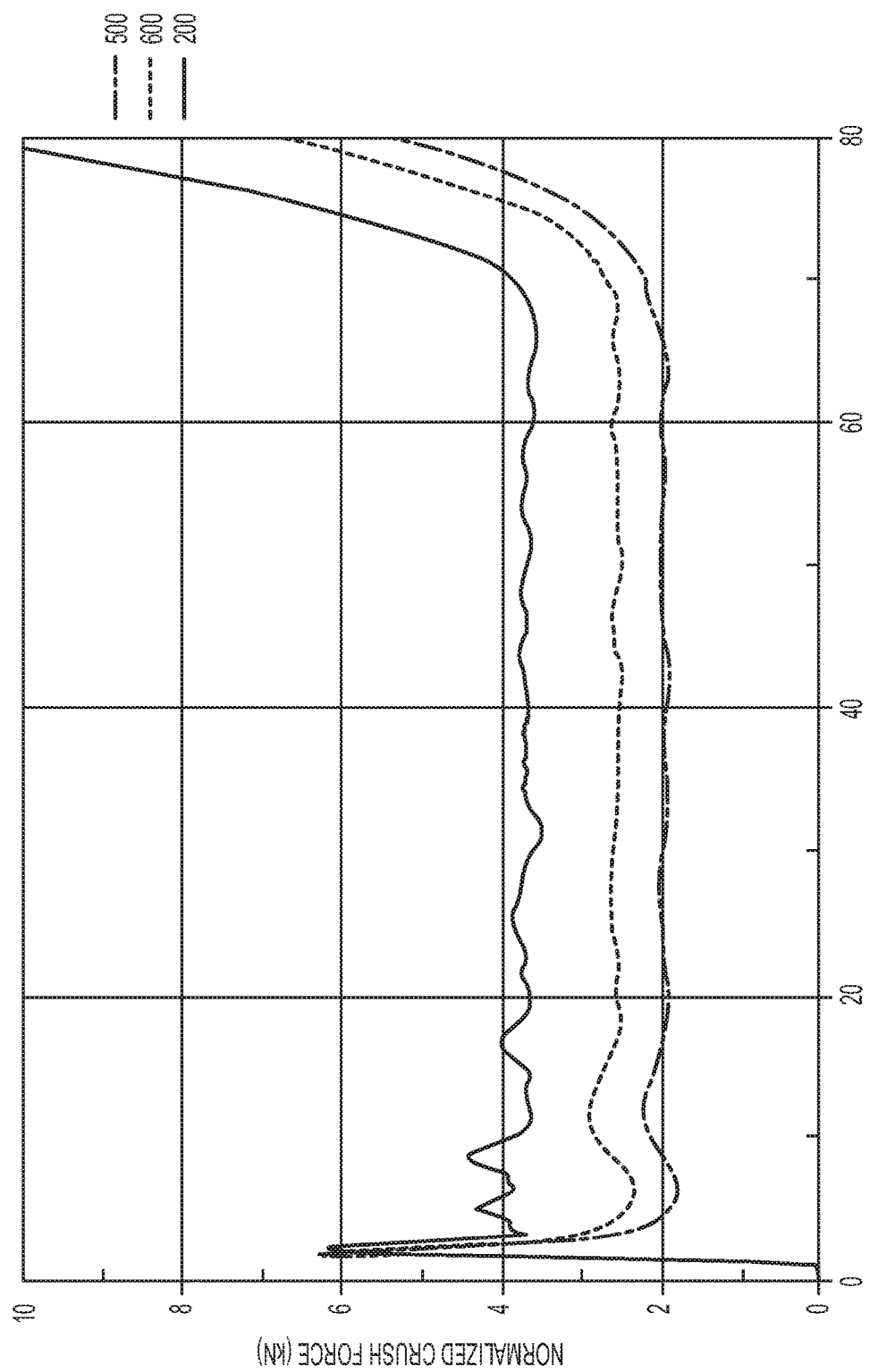
FIG. 8 is a graph of normalized dynamic crush force and associated crush displacement for modeled aluminum versions of the structural components shown in FIGS. 6A-6C.

FIG. 8 graphically portrays the dynamic crush force (in kN) absorbed axially on the modeled aluminum version of exemplary structural components 200, 500 and 600, and the associated axial crush displacement (in mm) for the simulated dynamic crush illustrated in FIG. 7. The crush force (in kN) values of the graph have been normalized to account for the slightly different number of cells and mass of each of the structural components 200, 500 and 600, such that a normalized comparison can be made on a per cell and per unit mass basis. As shown in FIG. 8, the aluminum twelve-cornered cells of the cellular structure of the structural component 200 in accordance with the present disclosure could sustain a much higher crushing force for a given resulting crushing distance as compared with the aluminum square and regular hexagon cells of the cellular structures of the structural components 500 and 600, respectively. Specifically, when averaged over the range of 0 to 60 mm of displacement, the aluminum twelve-cornered cells of the cellular structure of the structural component 200 accordance with the present disclosure achieved about a 29.95% increase in normalized average crush force as compared with the aluminum regular hexagon cells of the cellular structure of the structural component 600. The aluminum twelve-cornered cells of the cellular structure of the structural component 200 also achieved about a 58.65% increase in normalized average crush force (over the range of 0 to 60 mm displacement) as compared with the aluminum square cells of the cellular structure of the structural component 500.

Figure 9:
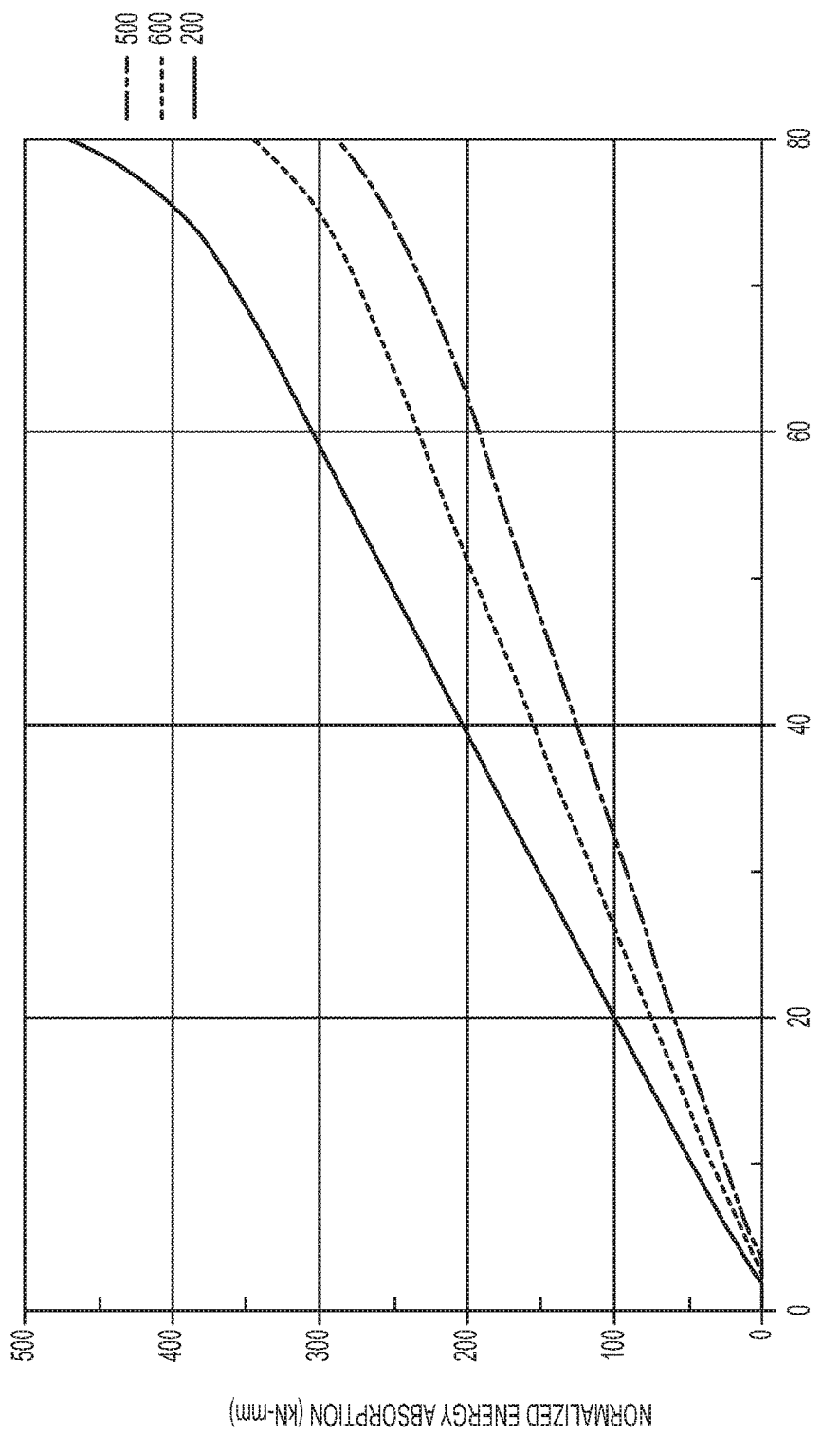
FIG. 9 is a graph of normalized dynamic axial crush energy absorbed and associated axial crush displacement for the exemplary modeled aluminum versions of the structural components shown in FIGS. 6A-6C.

FIG. 9 graphically portrays the dynamic axial crush energy (in kN-mm) absorbed axially by the modeled aluminum version of exemplary structural components 200, 500 and 600, and the associated axial crush displacement (in mm) for the simulated dynamic crush illustrated in FIG. 7. The crush energy (in kN-mm) values of the graph have been normalized to account for the slightly different number of cells and mass of each structural components 200, 500 and 600, such that a comparison can be made on a per cell and per unit mass basis. As shown in FIG. 9 the aluminum twelve-cornered cells of the cellular structure of the structural component 200 in accordance with the present disclosure could absorb the same total kinetic energy of the impact over a much shorter distance as compared the aluminum square and regular hexagon cells of the cellular structures of the structural components 500 and 600, respectively. Specifically, for example, at 60 mm displacement the aluminum twelve-cornered cells of the cellular structure of the structural component 200 accordance with the present disclosure had absorbed about 29.95% more energy as compared to the amount of energy absorbed by the aluminum regular hexagon cells of the cellular structure of the structural component 600 at a displacement of 60 mm. The aluminum twelve-cornered cells of the cellular structure of the structural component 200 accordance with the present disclosure also had absorbed about 58.65% more energy at 60 mm displacement as compared to the amount of energy absorbed by the aluminum square cells of the cellular structure of the structural component 500 at a displacement of 60 mm.

A quasi-static crush of aluminum versions of modeled structural components 500, 600, and 200, respectively, was also simulated. The results of the simulated quasi-static crush for each aluminum model are graphically portrayed in FIG. 10. During each quasi-static crush the impact speed is slow (e.g., 1 in/min). An impactor compresses the structural components with a controlled displacement. Therefore, all structural components reach the same crush distance with the same crush time. Thus, subjecting structural components with various cellular structures to a quasi-static crush provides a comparison of the resistance to deformation (including the deformation severity in elastic range and plastic range) and the peak force of the structural components. As used herein, the term "peak force" is defined as the maximum load of compressive force that a structure can withstand before exhibiting plastic deformation (as opposed to elastic deformation). A person of ordinary skill in the art will understand that plastic deformation is permanent, non-reversible deformation that will remain after removal of the compression load, and that elastic deformation is temporary, reversible deformation that will diminish upon removal of the compression load. The quasi-static loading condition informs how a structure will respond in situations such as, for example, loading of cargo and/or passengers.

In the simulated quasi-static crush of the aluminum versions of modeled structural components 500, 600, and 200, the aluminum structural component 200 was observed to exhibit less deformation at each level of controlled displacement, including in both the elastic and plastic deformation ranges, as compared with the aluminum structural components 500 and 600, respectively. Additionally, the observed deformation spread to the lower portions of the cellular walls faster in structural components 500 and 600 than in structural component 200. Accordingly, the plastic deformation that occurred in the structural component 200 was more localized, in that it was concentrated in regions close to the impactor, while the plastic deformation of the structural components 500 and 600 was more extensive, in that it spread to the entire structure. The results indicate that the structural component 200 has higher resistance to elastic and plastic deformation compared to the structural components 500 and 600. If plastic deformation does occur under a very severe loading condition, a structural component 200 will exhibit less severe and more locally concentrated plastic deformation, and is therefore expected to be easier and less costly to repair.

Figure 10:
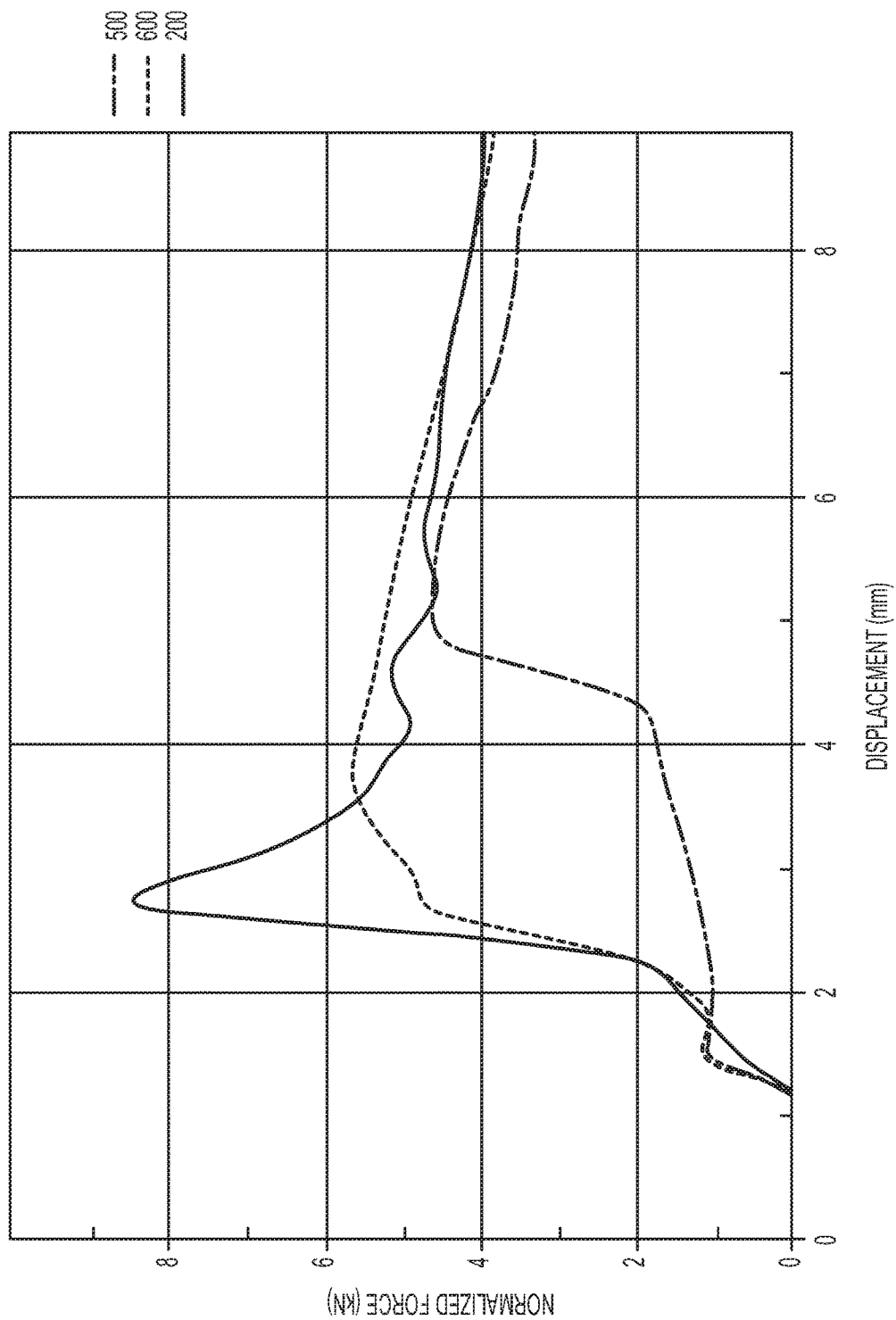
FIG. 10 is a graph of normalized quasi-static crush force and associated crush displacement for modeled aluminum versions of the structural components shown in FIGS. 5A-5C.

FIG. 10 graphically portrays the normalized crush force (in kN) absorbed axially on the modeled aluminum version of exemplary structural components 200, 500 and 600, and the associated axial crush displacement (in mm) for the simulated quasi-static crush described above. The crush force (in kN) values of the graph have been normalized to account for the slightly different number of cells and mass of each structural components 200, 500 and 600, such that a comparison can be made on a per cell and per unit mass basis. As shown in FIG. 10, aluminum twelve-cornered cells of the cellular structure of the structural component 200 accordance with the present disclosure demonstrated the higher normalized peak force as compared with the aluminum square and regular hexagon cells of the cellular structures of the structural components 500 and 600, respectively. Specifically, the aluminum twelve-cornered cells of the cellular structure of the structural component 200 accordance with the present disclosure achieved a normalized peak force of about 8.46 kN, the aluminum regular hexagon cells of the cellular structure of the structural component 600 had a normalized peak force of about 5.65 kN, and the aluminum square cells of the cellular structure of the structural component 500 had a normalized peak force of about 4.63 kN. Thus, the aluminum twelve-cornered cells of the cellular structure of the structural component 200 accordance with the present disclosure achieved about a 49.7% increase in normalized peak force as compared with the aluminum regular hexagon cells of the cellular structure of the structural component 600 and about a 82.7% increase in normalized peak force as compared with the aluminum square cells of the cellular structure of the structural component 500. The above results confirm that the structural component 200 can sustain much higher load before exhibiting plastic deformation than the structural components 500 and 600.

Figure 11C:
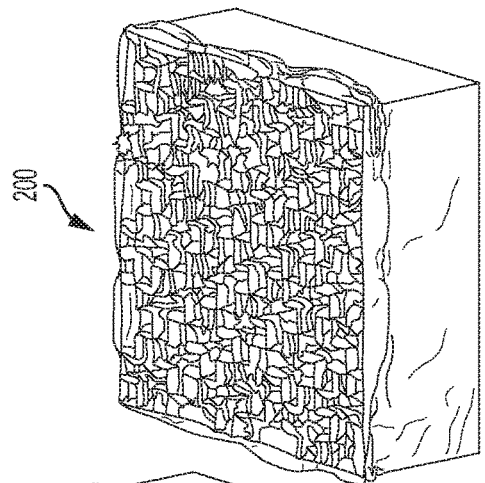
FIG. 11A-11C illustrate modeled polymer versions of the structural components shown in FIGS. 6A-6C, respectively, at a time intervals of 8 milliseconds during an exemplary dynamic crush.
Figure 11B:
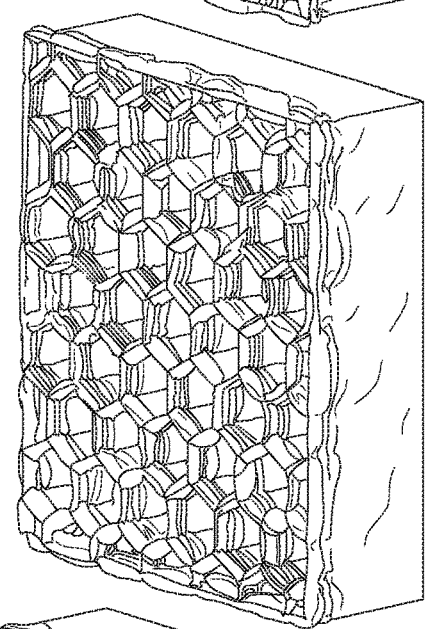
Figure 11A:
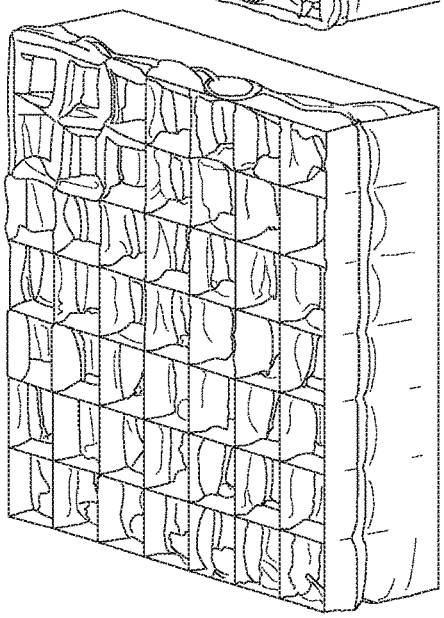

Turning now to the polymer versions, FIG. 11C shows polymer versions of modeled structural components 500, 600, and 200 at a time interval of 8 milliseconds of a simulated dynamic crush, respectively. During each dynamic crush, the impactor is propelled by a gas gun with a designated mass and initial impact velocity which creates a designated initial kinetic energy. The initial kinetic energy crushes the structural components and the initial kinetic energy is transferred into the internal energy of the structural components and cellular structures thereof. Performance of each structural component and cellular structure thereof can be compared by measuring the crush displacement, crush force, and specific energy absorption of each structural component. As shown in FIG. 11, during the simulated dynamic crush, the structural component 200 having a polymer cellular structure with twelve-cornered cells in accordance with the present disclosure demonstrated shorter crush displacement than the structural components 500 and 600 having a polymer cellular structure with square and regular hexagon cells, respectively. Also, the twelve-cornered cells in the structural component 200 exhibited a smaller folding length than the square and regular hexagon cells in the structural components 500 and 600, respectively. Additionally, as shown in FIG. 11, polymer versions of structural components 500 and 600 undesirably exhibited more irregular crushing patterns, as evidenced, in particular, by the undesirable buckling and/or more severe plastic deformation in lower portions of structural components 500 and 600.

Figure 12:
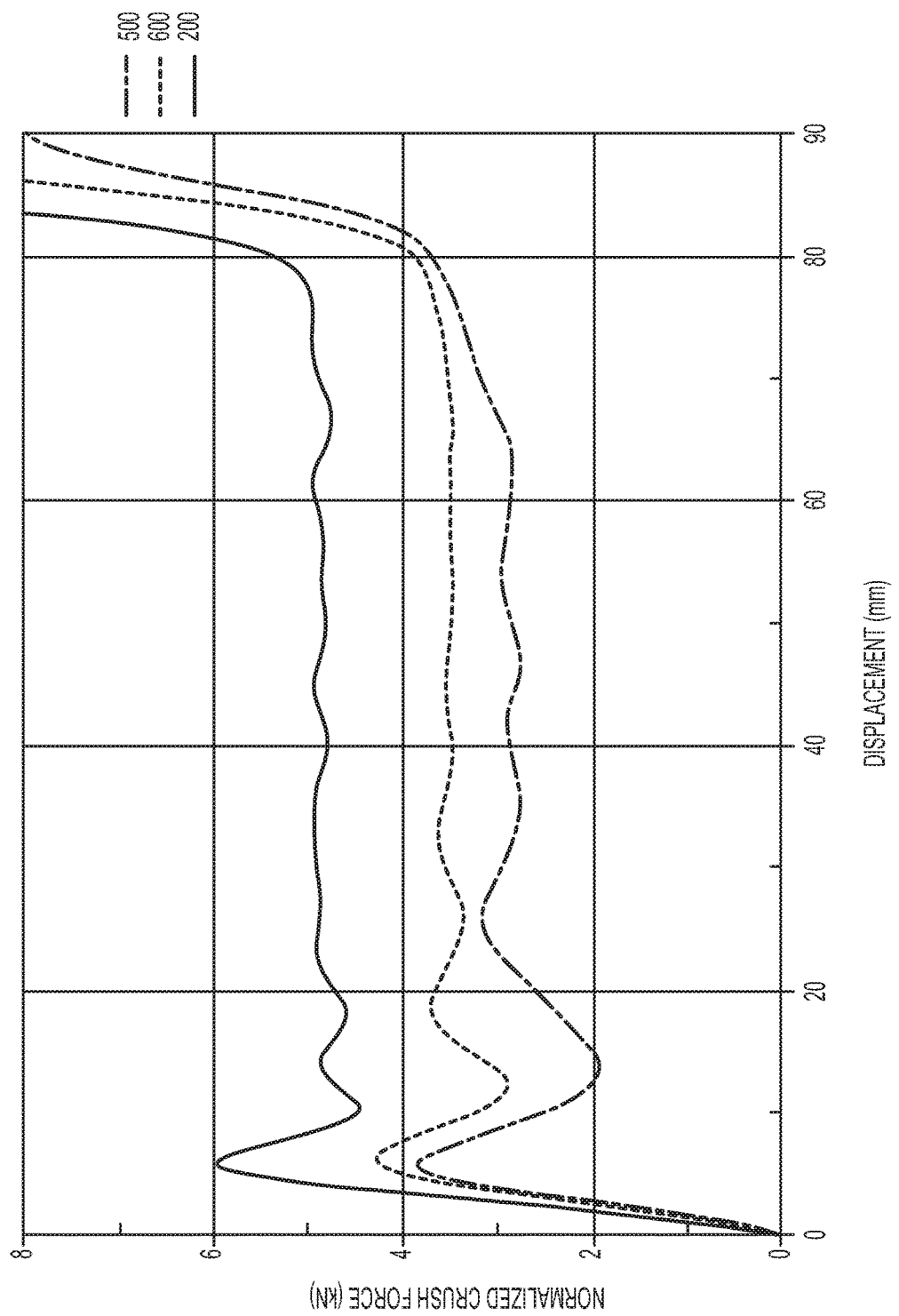
FIG. 12 is a graph of normalized dynamic crush force and associated crush displacement for modeled polymer versions of the structural components shown in FIGS. 6A-6C.

FIG. 12 graphically portrays the dynamic crush force (in kN) absorbed axially on the modeled polymer version of exemplary structural components 200, 500 and 600, and the associated axial crush displacement (in mm) for the simulated dynamic crush illustrated in FIG. 11. The crush force (in kN) values of the graph have been normalized to account for the slightly different number of cells and mass of each structural components 200, 500 and 600, such that a comparison can be made on a per cell and per unit mass basis. As shown in FIG. 12, the polymer twelve-cornered cells of the cellular structure of the structural component 200 in accordance with the present disclosure could sustain a much higher crushing force for a given resulting crushing distance as compared with the polymer square and regular hexagon cells of the cellular structures of the structural components 500 and 600, respectively. Specifically, when averaged over the range of 0 to 60 mm of displacement, the polymer twelve-cornered cells of the cellular structure of the structural component 200 accordance with the present disclosure achieved about a 37.80% increase in normalized average crush force as compared with the polymer regular hexagon cells of the cellular structure of the structural component 600. The polymer twelve-cornered cells of the cellular structure of the structural component 200 also achieved about a 73.00% increase in normalized average crush force (over the range of 0 to 60 mm displacement) as compared with the polymer square cells of the cellular structure of the structural component 500.

Figure 13:
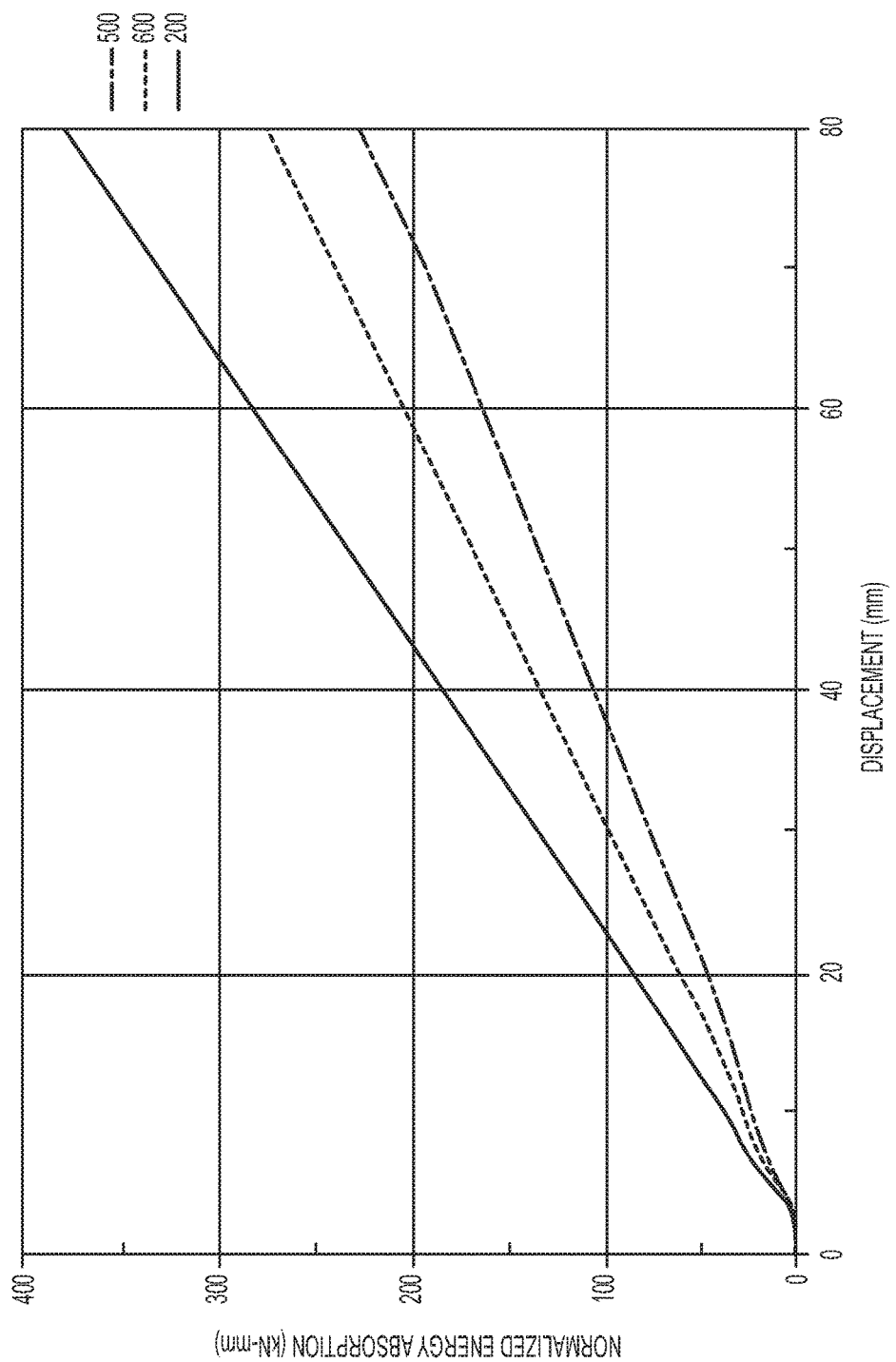
FIG. 13 is a graph of normalized dynamic axial crush energy absorbed and associated axial crush displacement for the exemplary modeled polymer versions of the structural components shown in FIGS. 6A-6C.

FIG. 13 graphically portrays the dynamic axial crush energy (in kN-mm) absorbed axially by the modeled polymer version of exemplary structural components 200, 500 and 600, and the associated axial crush displacement (in mm) for the simulated dynamic crush illustrated in FIG. 11 The crush energy (in kN-mm) values of the graph have been normalized to account for the slightly different number of cells and mass of each structural components 200, 500 and 600, such that a comparison can be made on a per cell and per unit mass basis. As shown in FIG. 13 the polymer twelve-cornered cells of the cellular structure of the structural component 200 in accordance with the present disclosure could absorb the same total kinetic energy of the impact over a much shorter distance as compared the polymer square and regular hexagon cells of the cellular structures of the structural components 500 and 600, respectively. Specifically, for example, at 60 mm displacement the polymer twelve-cornered cells of the cellular structure of the structural component 200 accordance with the present disclosure had absorbed about 37.8% more energy as compared to the amount of energy absorbed by the polymer regular hexagon cells of the cellular structure of the structural component 600 at a displacement of 60 mm. The polymer twelve-cornered cells of the cellular structure of the structural component 200 accordance with the present disclosure also had absorbed about 73.0% more energy at 60 mm displacement as compared to the amount of energy absorbed by the polymer square cells of the cellular structure of the structural component 500 at a displacement of 60 mm.

A quasi-static crush of polymer versions of modeled structural components 500, 600, and 200, respectively, was also simulated. The results of the simulated quasi-static crush for each polymer model are graphically portrayed in FIG. 14. During each quasi-static crush the impact speed is slow (e.g., 1 in/min). An impactor compresses the structural components with a controlled displacement. Therefore, all structural components reach the same crush distance with the same crush time. Thus, subjecting structural components with various cellular structures to a quasi-static crush provides a comparison of the resistance to plastic deformation including, the deformation severity in elastic and plastic ranges, and the peak force of the structural components.

In the simulated quasi-static crush of the polymer versions of modeled structural components 500, 600, and 200, the polymer structural component 200 was observed to exhibit less deformation at each level of controlled displacement, including in both the elastic and plastic deformation ranges, as compared with the polymer structural components 500 and 600, respectively. Additionally, the observed deformation spread to the lower portions of the cellular walls faster in structural components 500 and 600 than in structural component 200. Accordingly, the plastic deformation that occurred in the structural component 200 was more localized, in that it was concentrated in regions close to the impactor, while the plastic deformation of the structural components 500 and 600 was more extensive, in that it spread to the entire structure. The results indicate that the structural component 200 has higher resistance to elastic and plastic deformation compared to the structural components 500 and 600. If plastic deformation does occur under a very severe loading condition, a structural component 200 will exhibit less severe and more locally concentrated plastic deformation, and is therefore expected to be easier and less costly to repair.

FIG. 14 graphically portrays the normalized crush force (in kN) absorbed axially on the modeled polymer version of exemplary structural components 200, 500 and 600, and the associated axial crush displacement (in mm) for the simulated quasi-static crush described above. The crush force (in kN) values of the graph have been normalized to account for the slightly different number of cells and mass of each structural components 200, 500 and 600, such that a comparison can be made on a per cell and per unit mass basis. As shown in FIG. 14, polymer twelve-cornered cells of the cellular structure of the structural component 200 accordance with the present disclosure demonstrated the higher normalized peak force as compared with the polymer square and regular hexagon cells of the cellular structures of the structural components 500 and 600, respectively. Specifically, the polymer twelve-cornered cells of the cellular structure of the structural component 200 accordance with the present disclosure achieved a normalized peak force of about 6.65 kN, the polymer regular hexagon cells of the cellular structure of the structural component 600 had a normalized peak force of about 5.16 kN, and the polymer square cells of the cellular structure of the structural component 500 had a normalized peak force of about 4.78 kN. Thus, the polymer twelve-cornered cells of the cellular structure of the structural component 200 accordance with the present disclosure achieved about a 28.9% increase in normalized peak force as compared with the polymer regular hexagon cells of the cellular structure of the structural component 600 and about a 39.1% increase in normalized peak force as compared with the polymer square cells of the cellular structure of the structural component 500. The above results confirm that the structural component 200 can sustain much higher load before exhibiting plastic deformation than the structural components 500 and 600.

Figure 15A:
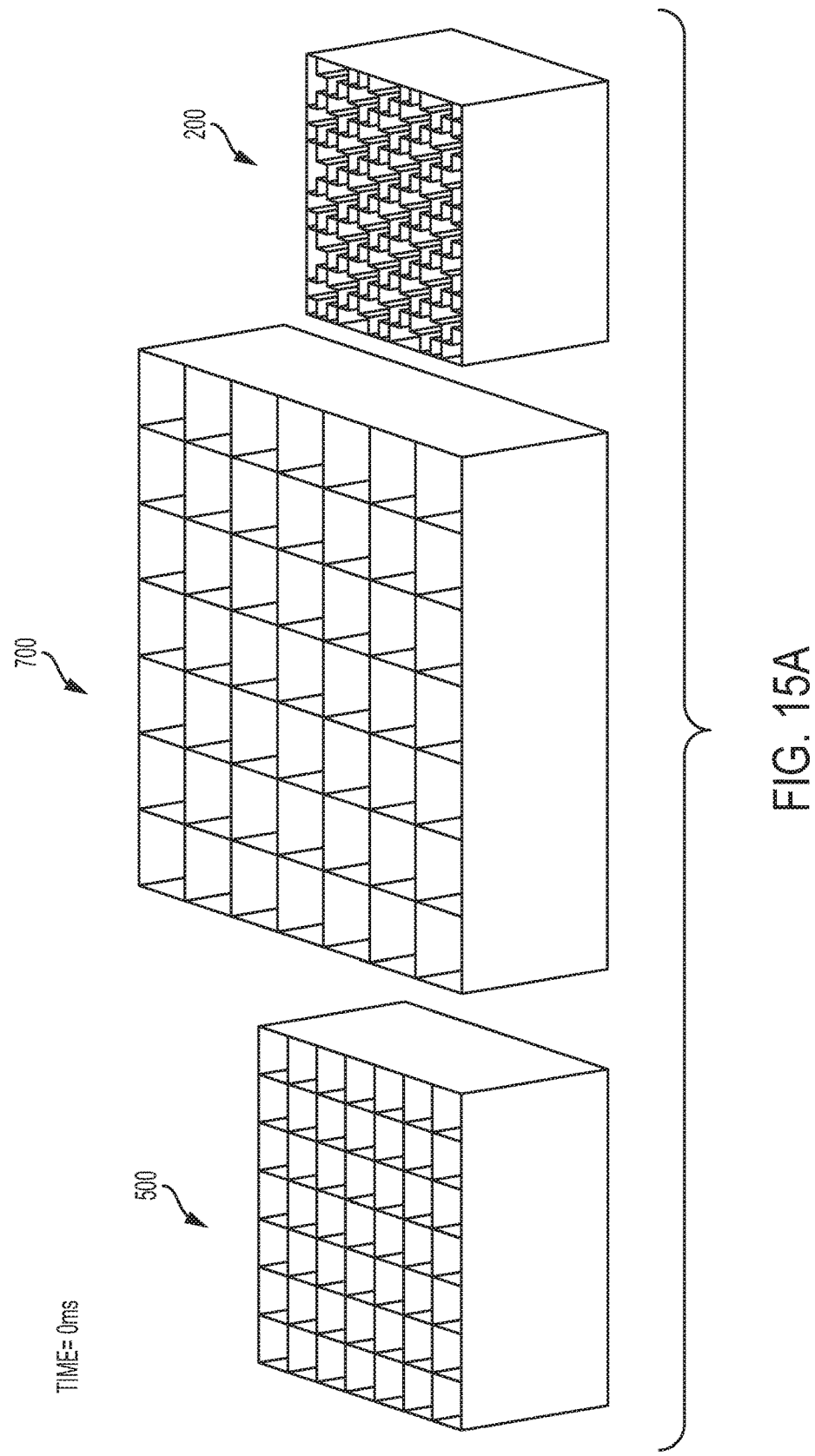
FIGS. 15A and 15B illustrate modeled aluminum versions of various structural components with either a square-celled or twelve-corner-celled cellular structure, at time intervals of 0 milliseconds and 8 milliseconds during an exemplary dynamic crush, respectively.

For further comparison, finite element models of structural components with interior cellular structures having interconnected cells with varying shapes (i.e., cross sections) having the same thickness were developed as illustrated in FIG. 15A. FIG. 15A shows perspective views of a structural component 500 with an interior cellular structures having interconnected cells with each full cell having a basic, four-cornered cross section (i.e., square shape) (like that of FIGS. 5A and 6A as described above), another structural component 700 with an interior cellular structures having interconnected cells with each full cell having a basic, four-cornered cross section (i.e., square shape), and a structural component 200 with an interior cellular structures having interconnected cells with each full cell having a twelve-cornered cross section (like that of FIGS. 2A-2B as described above).

The structural components 200, 500, 700 were modeled to have as close to the same total number of cells as possible. The cellular structure of structural component 500 has 49 square cells, the cellular structure of structural component 700 has 49 square cells, and the cellular structure of structural component 200 has 45 twelve-cornered cells.

The structural components 200 and 500 have the approximately the same total mass, mass per cell, side thicknesses, and longitudinal length (i.e., length along the z-axis). By virtue of maintaining the total mass, per cell mass, side thicknesses, and total number of cells approximately the same, structural components 200 and 500 each have varied lateral dimensions (i.e., lengths along the x- and y-axes). In particular, structural component 500 was modeled to have lateral dimensions of 195 mm×195 mm; and structural component 200 was modeled to have lateral dimensions of 150 mm×150 mm. To provide further comparison, structural component 700 was modeled to have approximately the same side thickness and longitudinal length, but an increased total mass, and mass per cell. Accordingly, structural component 700 has varied lateral dimensions. In particular, structural component 700 as modeled to have lateral dimensions of 308 mm×308 mm. The longitudinal length of each structural component 200, 500, and 700 is 100 mm.

To compare the structural components 200, 500, 700 with interior cellular structures having interconnected cells with varying shapes, exemplary structural components 200, 500, 700 with interior cellular structure were modeled twice as structurally described above. In the first modeling, the cellular structure of the structural components 200, 500, 700 were made of aluminum. In the second modeling, the cellular structure of the structural components 200, 500, 700 were made of polymer. Multiple finite element experimental test runs were conducted for both the aluminum and polymer versions of structural components 200, 500, and 700, as shown and described below with reference to FIGS. 15A-20. FIGS. 15A-17 relate to the experimental test runs that were conducted for the aluminum versions. Notably, the aluminum version of cellular structure 700 shown in FIG. 15A was modeled to have about 58% more mass than the aluminum versions of cellular structures 500 and 200. FIGS. 18A-20 relate to the experimental test runs that were conducted for the polymer versions. Notably, the polymer version of cellular structure 700 shown in FIG. 15A was modeled to have about 73% more mass than the polymer versions of cellular structures 500 and 200.

The test runs for each structural component simulated an impact with the same boundary condition, rigid mass (e.g. an impactor), impact speed, and initial kinetic energy.

Figure 15B:
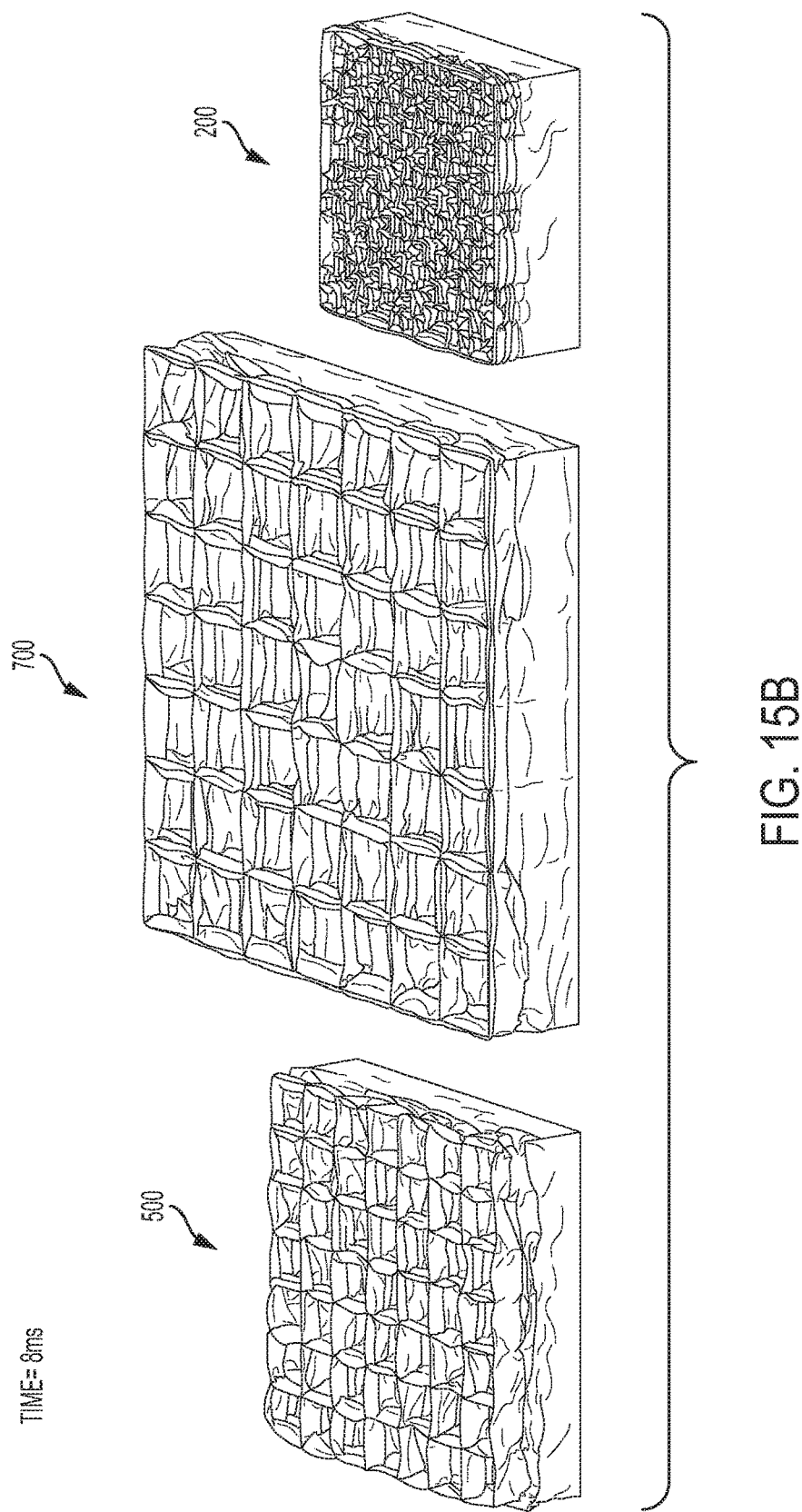

FIG. 15B shows aluminum versions of modeled structural components 500, 700, and 200 at a time interval of 8 milliseconds of a simulated dynamic crush. During each dynamic crush, the impactor is propelled by a gas gun with a designated mass and initial impact velocity which creates a designated initial kinetic energy. The initial kinetic energy crushes the structural components and the initial kinetic energy is transferred into the internal energy of the structural components and cellular structures thereof. Performance of each structural component and cellular structure thereof can be compared by measuring the crush displacement, crush force, and specific energy absorption of each structural component. As shown in FIG. 15B, throughout the simulated dynamic crush, the structural component 200 having an aluminum cellular structure with twelve-cornered cells in accordance with the present disclosure demonstrated shorter crush displacement than the structural components 500 and 700 having an aluminum cellular structure with square cells. Also, the twelve-cornered cells in the structural component 200 exhibited smaller folding lengths than the square and regular hexagon cells in the structural components 500 and 700, respectively. Additionally, as shown in FIG. 15B, aluminum versions of structural components 500 and 700 undesirably exhibited more irregular crushing patterns, as evidenced, in particular, by the undesirable buckling and/or more severe plastic deformation in lower portions of structural components 500 and 700.

Figure 16:
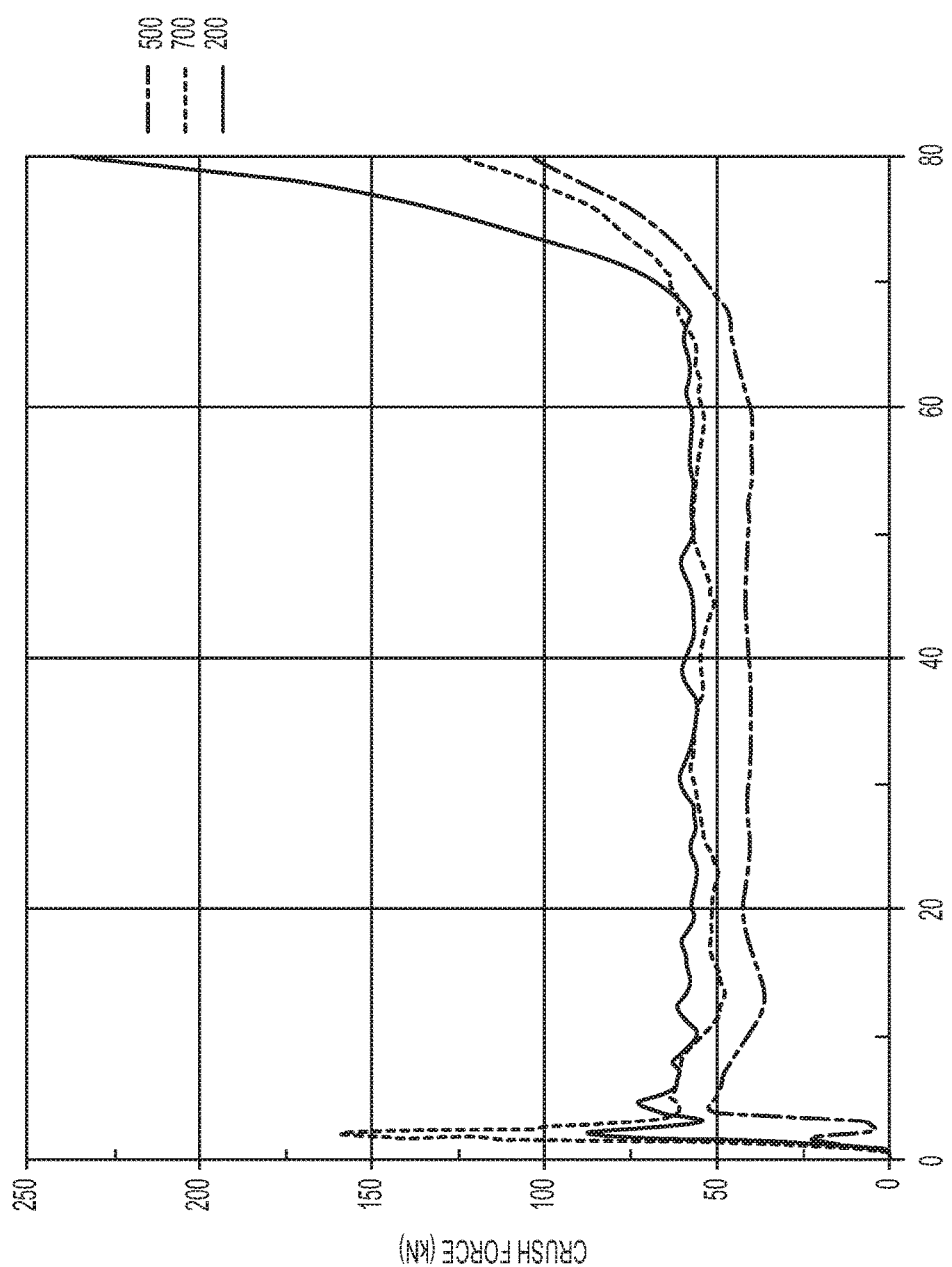
FIG. 16 is a graph of dynamic crush force and associated crush displacement for modeled aluminum versions of the structural components shown in FIG. 15A.

FIG. 16 graphically portrays the dynamic crush force (in kN) absorbed axially on the modeled aluminum version of exemplary structural components 200, 500 and 700, and the associated axial crush displacement (in mm) for the simulated dynamic crush illustrated in FIG. 15B. As shown in FIG. 16, the aluminum twelve-cornered cells of the cellular structure of the structural component 200 in accordance with the present disclosure could sustain a higher crushing force for a given resulting crushing distance as compared with the aluminum square cells of the cellular structures of the structural components 500 and 700. Specifically, when averaged over the range of 0 to 60 mm of displacement, the twelve-corner-celled aluminum cellular structure of the structural component 200 accordance with the present disclosure achieved about a 45.7% increase in average crush force as compared with the square-celled aluminum cellular structure of the structural component 500. The twelve-corner-celled aluminum cellular structure of the structural component 200 also achieved about a 4.0% increase in average crush force (over the range of 0 to 60 mm displacement) as compared with the square-celled aluminum cellular structure of the structural component 700 despite the fact that structural component 700 has a much larger total mass as well as larger lateral dimensions than structural component 200.

Figure 17:
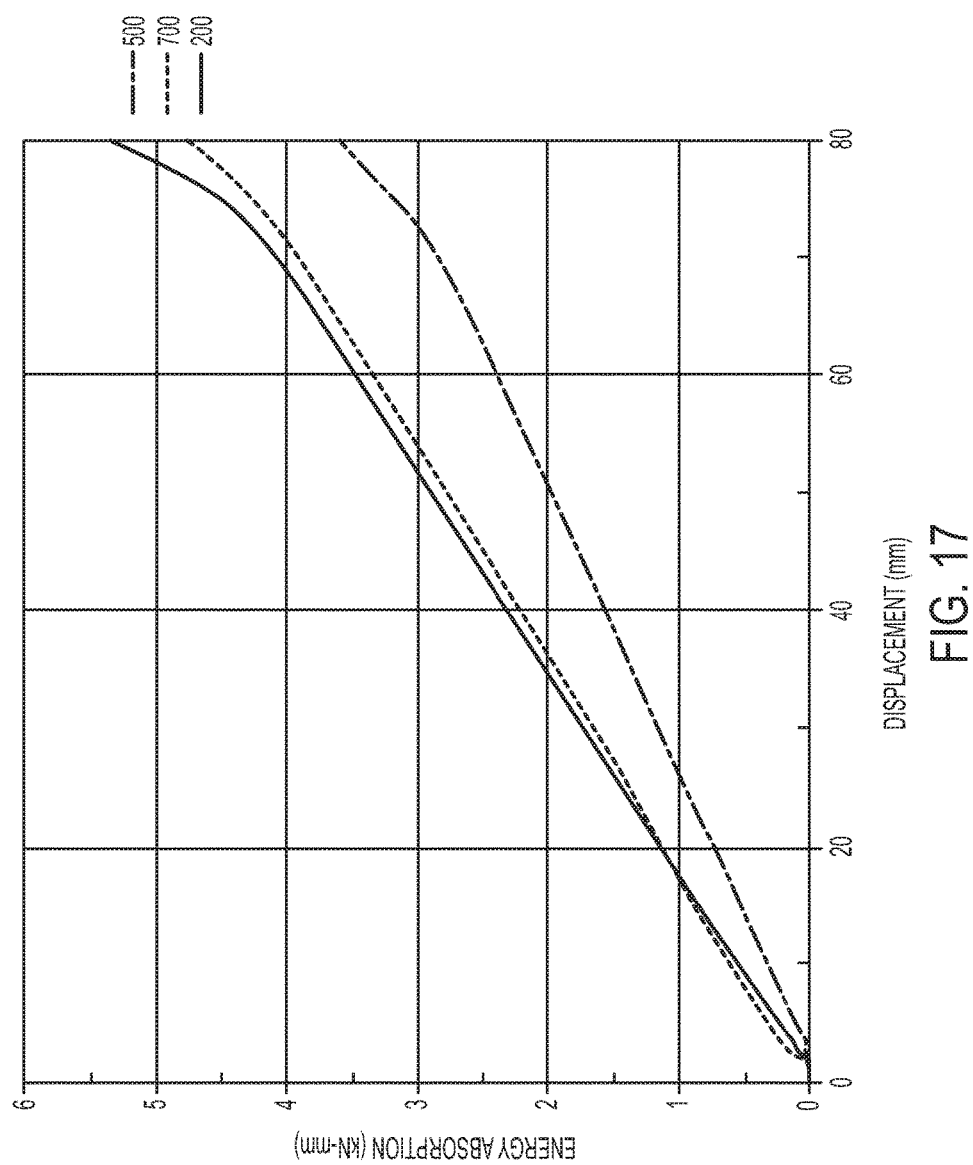
FIG. 17 is a graph of dynamic axial crush energy absorbed and associated axial crush displacement for the exemplary modeled aluminum versions of the structural components shown in FIG. 15A.

FIG. 17 graphically portrays the dynamic axial crush energy (in kN-mm) absorbed axially by the modeled aluminum version of exemplary structural components 200, 500 and 700, and the associated axial crush displacement (in mm) for the simulated dynamic crush illustrated in FIG. 15B. As shown in FIG. 17, the aluminum twelve-cornered cells of the cellular structure of the structural component 200 in accordance with the present disclosure could absorb the same total kinetic energy of the impact over a shorter distance as compared the aluminum square cells of the cellular structures of the structural components 500 and 700. Specifically, for example, at 60 mm displacement the twelve-corner-celled aluminum cellular structure of the structural component 200 accordance with the present disclosure had absorbed about 45.7% more energy as compared to the amount of energy absorbed by the square-celled aluminum cellular structure of the structural component 500 at a displacement of 60 mm. The twelve-corner-celled aluminum cellular structure of the structural component 200 accordance with the present disclosure also had absorbed about 4.0% more energy at 60 mm displacement as compared to the amount of energy absorbed by square-celled aluminum cellular structure of the structural component 700 at a displacement of 60 mm despite the fact that structural component 700 has a much larger total mass as well as larger lateral dimensions than structural component 200.

Figure 18B:
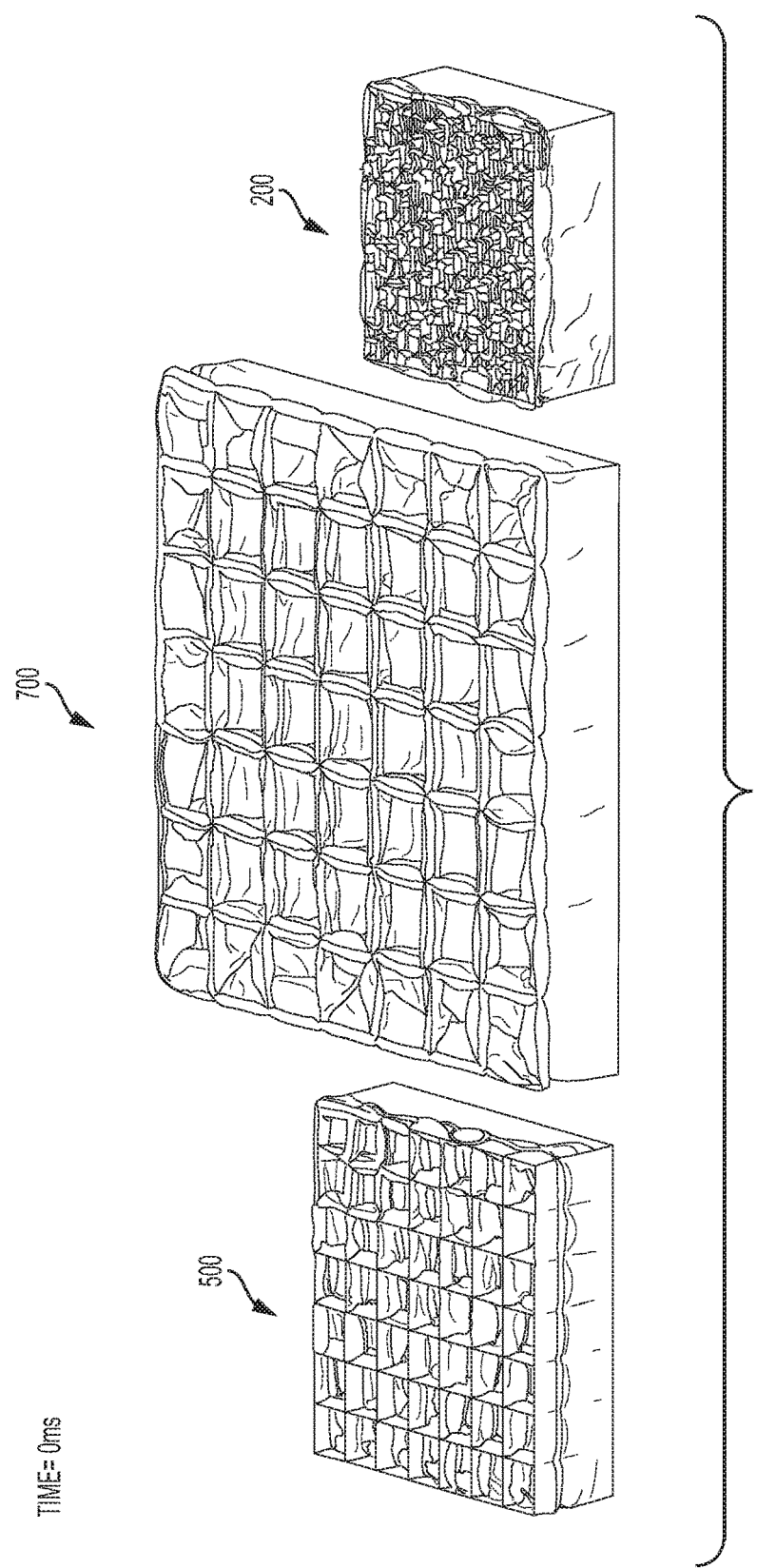

Turning now to the polymer versions, FIGS. 18A and 18B show polymer versions of modeled structural components 500, 700, and 200 at time intervals of 0 milliseconds and 8 milliseconds of a simulated dynamic crush, respectively. During each dynamic crush, the impactor is propelled by a gas gun with a designated mass and initial impact velocity which creates a designated initial kinetic energy. The initial kinetic energy crushes the structural components and the initial kinetic energy is transferred into the internal energy of the structural components and cellular structures thereof. Performance of each structural component and cellular structure thereof can be compared by measuring the crush displacement, crush force, and specific energy absorption of each structural component. As shown in FIG. 18B, during the simulated dynamic crush, the structural component 200 having a polymer cellular structure with twelve-cornered cells in accordance with the present disclosure demonstrated shorter crush displacement than the structural components 500 and 700 having a polymer cellular structure with square cells, respectively. Also, the twelve-cornered cells in the structural component 200 also exhibited smaller folding lengths than the square and regular hexagon cells in the structural components 500 and 700, respectively. Additionally, as shown in FIG. 18B, polymer versions of structural components 500 and 700 undesirably exhibited more irregular crushing patterns, as evidenced, in particular, by the undesirable buckling and/or more severe plastic deformation in lower portions of structural components 500 and 700.

Figure 19:
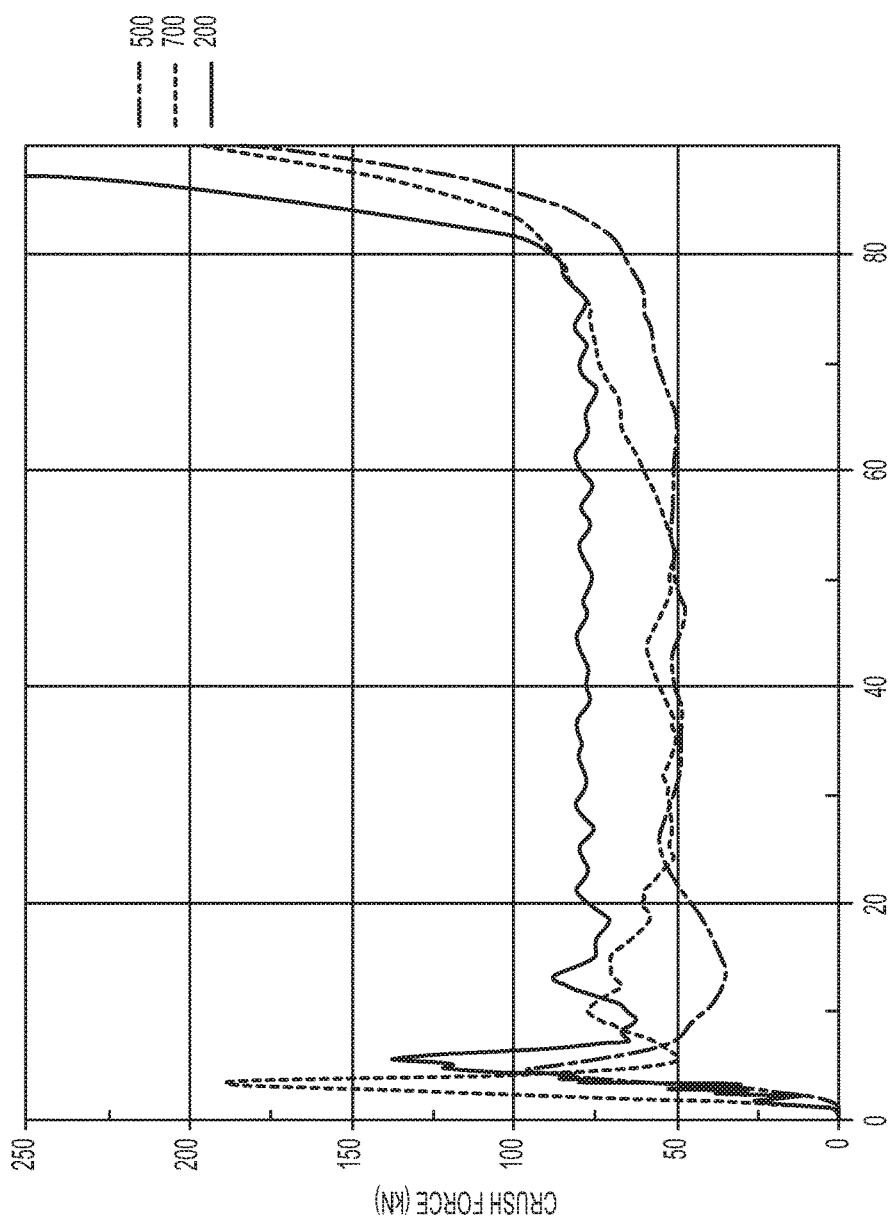
FIG. 19 is a graph of dynamic crush force and associated crush displacement for modeled polymer versions of the structural components shown in FIG. 18A.

FIG. 19 graphically portrays the dynamic crush force (in kN) absorbed axially on the modeled polymer version of exemplary structural components 200, 500 and 700, and the associated axial crush displacement (in mm) for the simulated dynamic crush illustrated in FIG. 18B. As shown in FIG. 19, the polymer twelve-cornered cells of the cellular structure of the structural component 200 in accordance with the present disclosure could sustain a higher crushing force for a given resulting crushing distance as compared with the polymer square cells of the cellular structures of the structural components 500 and 700. Specifically, when averaged over the range of 0 to 60 mm of displacement, the twelve-corner-celled polymer cellular structure of the structural component 200 accordance with the present disclosure achieved about a 58.8% increase in average crush force as compared with the square-celled polymer cellular structure of the structural component 500. The twelve-corner-celled polymer cellular structure of the structural component 200 also achieved about a 27.6% increase in average crush force (over the range of 0 to 60 mm displacement) as compared with the square-celled polymer cellular structure of the structural component 700 despite the fact that structural component 700 has a much larger total mass as well as larger lateral dimensions than structural component 200.

FIG. 20 graphically portrays the dynamic axial crush energy (in kN-mm) absorbed axially by the modeled polymer version of exemplary structural components 200, 500 and 700, and the associated axial crush displacement (in mm) for the simulated dynamic crush illustrated in FIG. 18B. As shown in FIG. 20, the polymer twelve-cornered cells of the cellular structure of the structural component 200 in accordance with the present disclosure could absorb the same total kinetic energy of the impact over a shorter distance as compared the polymer square cells of the cellular structures of the structural components 500 and 700. Specifically, for example, at 60 mm displacement the twelve-corner-celled polymer cellular structure of the structural component 200 accordance with the present disclosure had absorbed about 58.8% more energy as compared to the amount of energy absorbed by the square-celled polymer cellular structure of the structural component 500 at a displacement of 60 mm. The twelve-corner-celled polymer cellular structure of the structural component 200 accordance with the present disclosure also had absorbed about 27.6% more energy at 60 mm displacement as compared to the amount of energy absorbed by square-celled polymer cellular structure of the structural component 700 at a displacement of 60 mm despite the fact that structural component 700 has a much larger total mass as well as larger lateral dimensions than structural component 200.

Figure 21A:
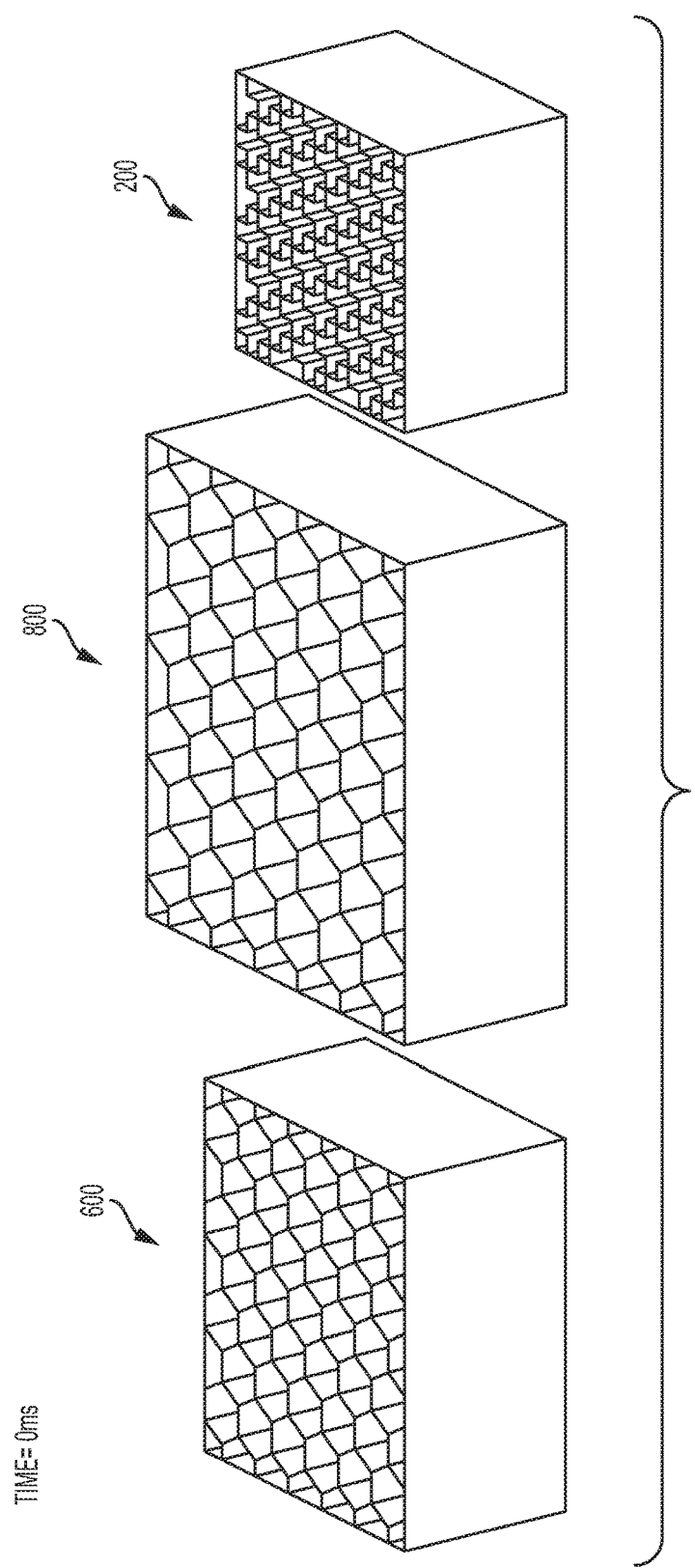
FIGS. 21A and 21B illustrate modeled aluminum versions of various structural components with either a hexagon-celled or twelve-corner-celled cellular structure, at time intervals of 0 milliseconds and 8 milliseconds during an exemplary dynamic crush, respectively.

Additionally, for further comparison, finite element models of structural components with interior cellular structures having interconnected cells with varying shapes (i.e., cross sections) having the same thickness were developed as illustrated in FIG. 21A. FIG. 21A shows perspective views of a structural component 600 with an interior cellular structures having interconnected cells with each full cell having a basic, six-cornered cross section (i.e., regular hexagon shape) (like that of FIGS. 5B and 6B as described above), another structural component 800 with an interior cellular structures having interconnected cells with each full cell having a basic, six-cornered cross section (i.e., regular hexagon shape), and a structural component 200 with an interior cellular structures having interconnected cells with each full cell having a twelve-cornered cross section (like that of FIGS. 2A-2B as described above).

The structural components 200, 600, 800 were modeled to have as close to the same total number of cells as possible. The cellular structure of structural component 600 has 48 hexagon cells, the cellular structure of structural component 800 has 48 regular hexagon cells, and the cellular structure of structural component 200 has 45 twelve-cornered cells.

The structural components 200 and 600 have the approximately the same total mass, mass per cell, side thicknesses, and longitudinal length (i.e., length along the z-axis). By virtue of maintaining the total mass, per cell mass, side thicknesses, and total number of cells approximately the same, structural components 200 and 600 each have varied lateral dimensions (i.e., lengths along the x- and y-axes). In particular, structural component 600 was modeled to have lateral dimensions of 202 mm×176 mm; and structural component 200 was modeled to have lateral dimensions of 150 mm×150 mm. To provide further comparison, structural component 800 was modeled to have approximately the same side thickness and longitudinal length, but an increased total mass and mass per cell. Accordingly, structural component 800 has varied lateral dimensions. In particular, structural component 800 as modeled to have lateral dimensions of 260 mm×227 mm. a longitudinal length of 100 mm.

To compare the structural components 200, 600, 800 with interior cellular structures having interconnected cells with varying shapes, exemplary structural components 200, 600, 800 with interior cellular structure were modeled twice as structurally described above. In the first modeling, the cellular structure of the structural components 200, 600, 800 were made of aluminum. In the second modeling, the cellular structure of the structural components 200, 600, 800 were made of polymer. Multiple finite element experimental test runs were conducted for both the aluminum and polymer versions of structural components 200, 600, and 800, as shown and described below with reference to FIGS. 21A-26. FIGS. 21A-23 relate to the experimental test runs that were conducted for the aluminum versions. Notably, the aluminum version of cellular structure 800 shown in FIG. 21A was modeled to have about 29% more mass than the aluminum versions of cellular structures 600 and 200. FIGS. 24A-26 relate to the experimental test runs that were conducted for the polymer versions. Notably, the polymer version of cellular structure 800 shown in FIG. 24A was modeled to have about 37% more mass than the polymer versions of cellular structures 600 and 200.

The test runs for each structural component simulated an impact with the same boundary condition, rigid mass (e.g. an impactor), impact speed, and initial kinetic energy.

Figure 21B:
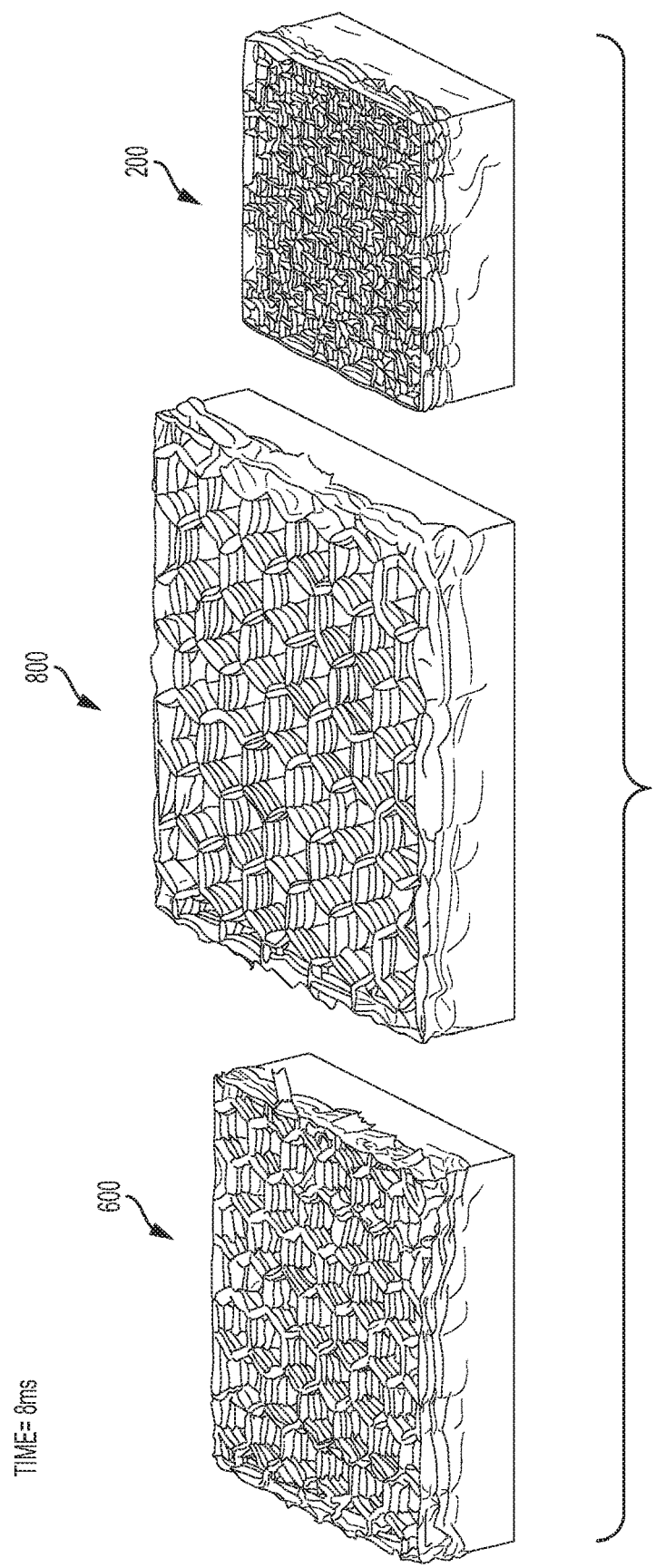

FIGS. 21A and 21B show aluminum versions of modeled structural components 600, 800, and 200 at time intervals of 0 and 8 milliseconds of a simulated dynamic crush, respectively. During each dynamic crush, the impactor is propelled by a gas gun with a designated mass and initial impact velocity which creates a designated initial kinetic energy. The initial kinetic energy crushes the structural components and the initial kinetic energy is transferred into the internal energy of the structural components and cellular structures thereof. Performance of each structural component and cellular structure thereof can be compared by measuring the crush displacement, crush force, and specific energy absorption of each structural component. As shown in FIG. 21B, throughout the simulated dynamic crush, the structural component 200 having an aluminum cellular structure with twelve-cornered cells in accordance with the present disclosure demonstrated shorter crush displacement than the structural components 600 and 800 having an aluminum cellular structure with hexagonal cells. Also, the twelve-cornered cells in the structural component 200 exhibited smaller folding lengths than the square and regular hexagon cells in the structural components 600 and 800 respectively. Additionally, as shown in FIG. 21B, aluminum versions of structural components 600 and 800 undesirably exhibited more irregular crushing patterns, as evidenced, in particular, by the undesirable ruptures of cell walls in the upper portions of structural components 600 and 800.

FIG. 22 graphically portrays the dynamic crush force (in kN) absorbed axially on the modeled aluminum version of exemplary structural components 200, 600 and 800, and the associated axial crush displacement (in mm) for the simulated dynamic crush illustrated in FIG. 21B. As shown in FIG. 22, the aluminum twelve-cornered cells of the cellular structure of the structural component 200 in accordance with the present disclosure could sustain a higher crushing force for a given resulting crushing distance as compared with the aluminum regular hexagon cells of the cellular structures of the structural components 600 and 800. Specifically, when averaged over the range of 0 to 60 mm of displacement, the twelve-corner-celled aluminum cellular structure of the structural component 200 accordance with the present disclosure achieved about a 22.2% increase in average crush force as compared with the hexagon-celled aluminum cellular structure of the structural component 600. The twelve-corner-celled aluminum cellular structure of the structural component 200 also achieved about a 6.5% increase in average crush force (over the range of 0 to 60 mm displacement) as compared with the hexagon-celled aluminum cellular structure of the structural component 800 despite the fact that structural component 800 has a much larger total mass as well as larger lateral dimensions than structural component 200.

Figure 23:
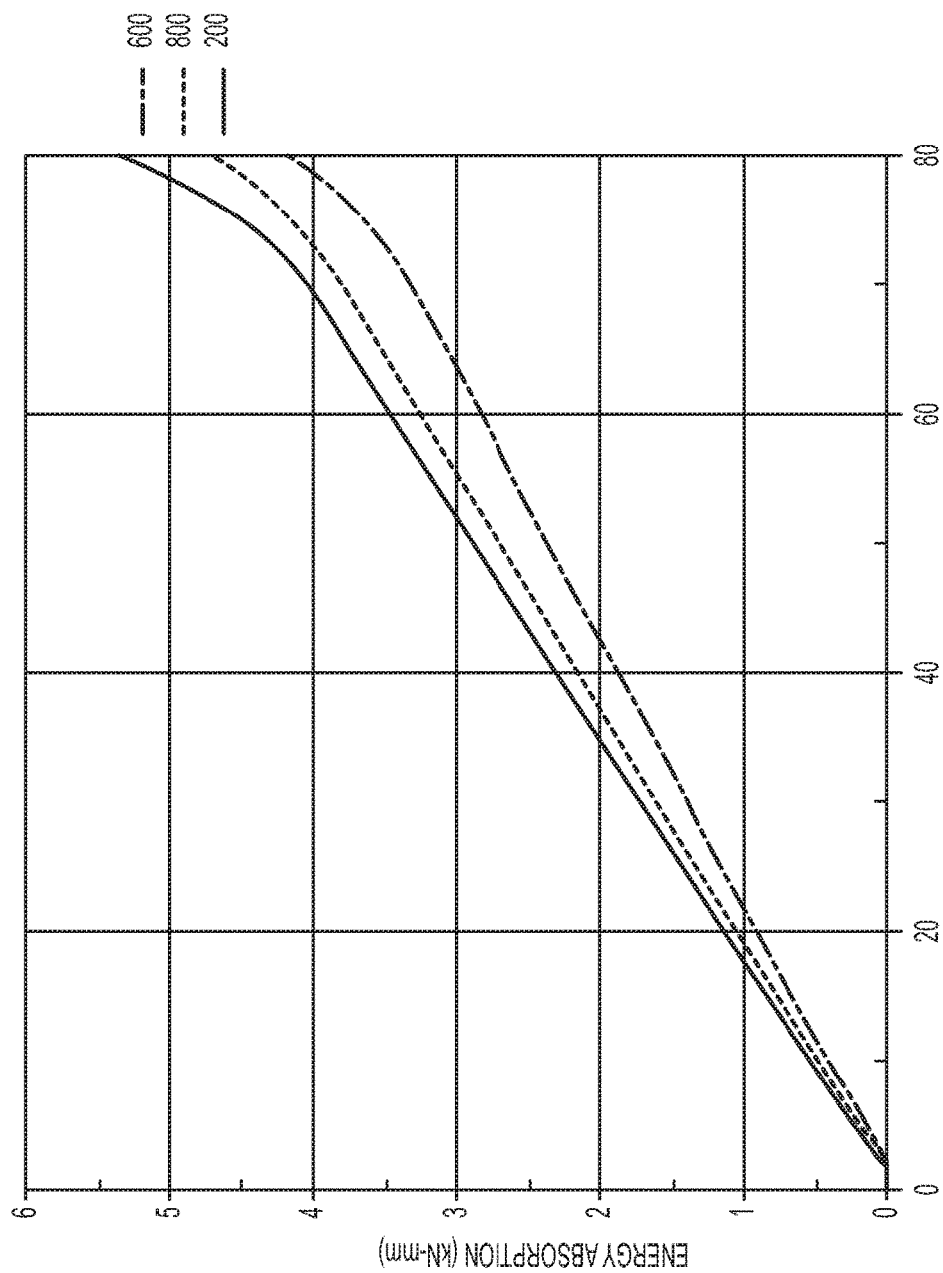
FIG. 23 is a graph of dynamic axial crush energy absorbed and associated axial crush displacement for the exemplary modeled aluminum versions of the structural components shown in FIG. 21A.

FIG. 23 graphically portrays the dynamic axial crush energy (in kN-mm) absorbed axially by the modeled aluminum version of exemplary structural components 200, 600 and 800, and the associated axial crush displacement (in mm) for the simulated dynamic crush illustrated in FIG. 21B. As shown in FIG. 23, the aluminum twelve-cornered cells of the cellular structure of the structural component 200 in accordance with the present disclosure could absorb the same total kinetic energy of the impact over a shorter distance as compared the aluminum regular hexagon cells of the cellular structures of the structural components 600 and 800. Specifically, for example, at 60 mm displacement the twelve-corner-celled aluminum cellular structure of the structural component 200 accordance with the present disclosure had absorbed about 22.2% more energy as compared to the amount of energy absorbed by the hexagon-celled aluminum cellular structure of the structural component 600 at a displacement of 60 mm. The twelve-corner-celled aluminum cellular structure of the structural component 200 accordance with the present disclosure also had absorbed about 6.5% more energy at 60 mm displacement as compared to the amount of energy absorbed by hexagon-celled aluminum cellular structure of the structural component 800 at a displacement of 60 mm despite the fact that structural component 800 has a much larger total mass as well as larger lateral dimensions than structural component 200.

Figure 24A:
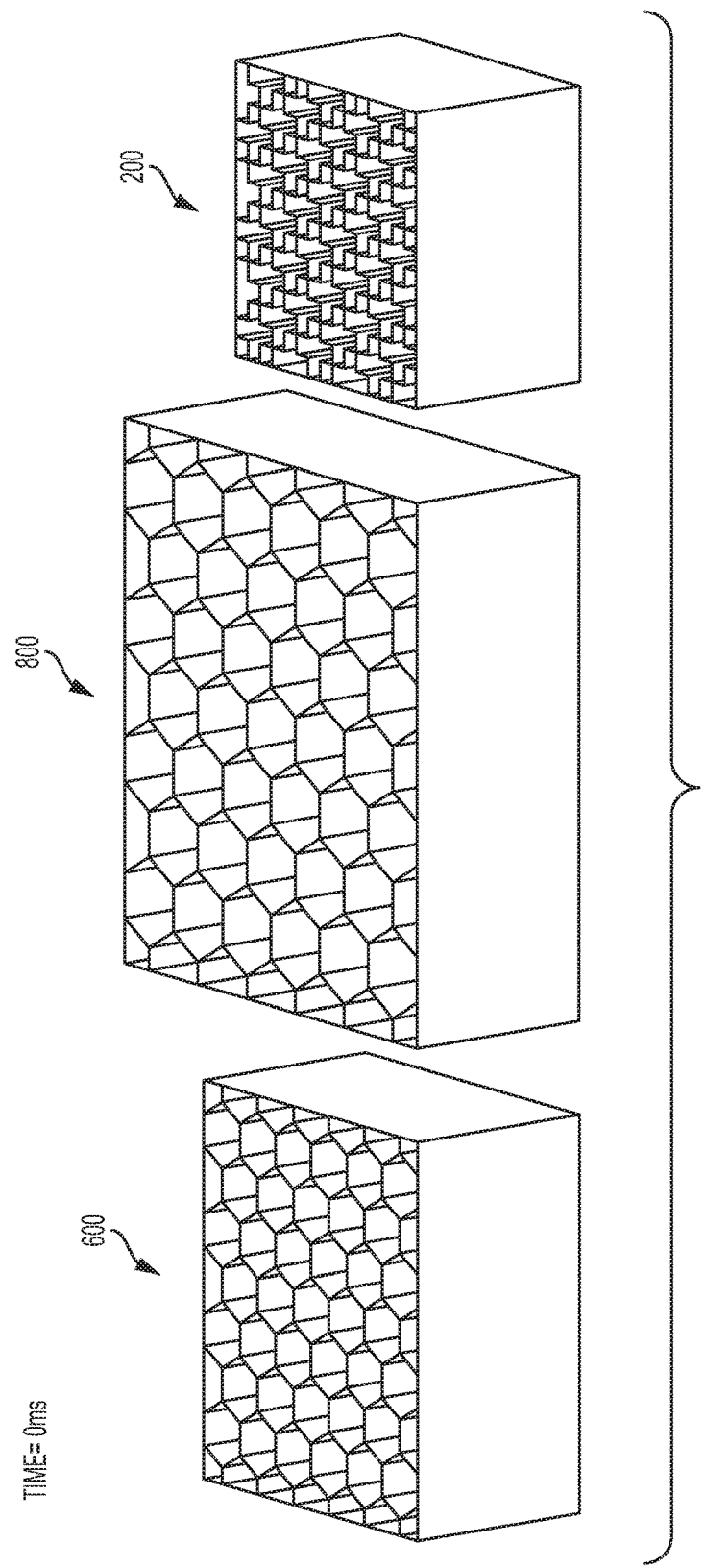

Turning now to the polymer versions, FIGS. 24A and 24B show polymer versions of modeled structural components 600, 800, and 200 at time intervals of 0 and 8 milliseconds of a simulated dynamic crush, respectively. During each dynamic crush, the impactor is propelled by a gas gun with a designated mass and initial impact velocity which creates a designated initial kinetic energy. The initial kinetic energy crushes the structural components and the initial kinetic energy is transferred into the internal energy of the structural components and cellular structures thereof. Performance of each structural component and cellular structure thereof can be compared by measuring the crush displacement, crush force, and specific energy absorption of each structural component. As shown in FIG. 24B, during the simulated dynamic crush, the structural component 200 having a polymer cellular structure with twelve-cornered cells in accordance with the present disclosure demonstrated shorter crush displacement than the structural components 600 and 800 having a polymer cellular structure with regular hexagon cells. Also, the twelve-cornered cells in the structural component 200 exhibited smaller folding lengths than the square and regular hexagon cells in the structural components 600 and 800, respectively. Additionally, as shown in FIG. 24B polymer versions of structural components 600 and 800 undesirably exhibited more irregular crushing patterns, as evidenced, in particular, by the more wide-spread deformation in lower portions of structural components 600 and 800.

Figure 25:
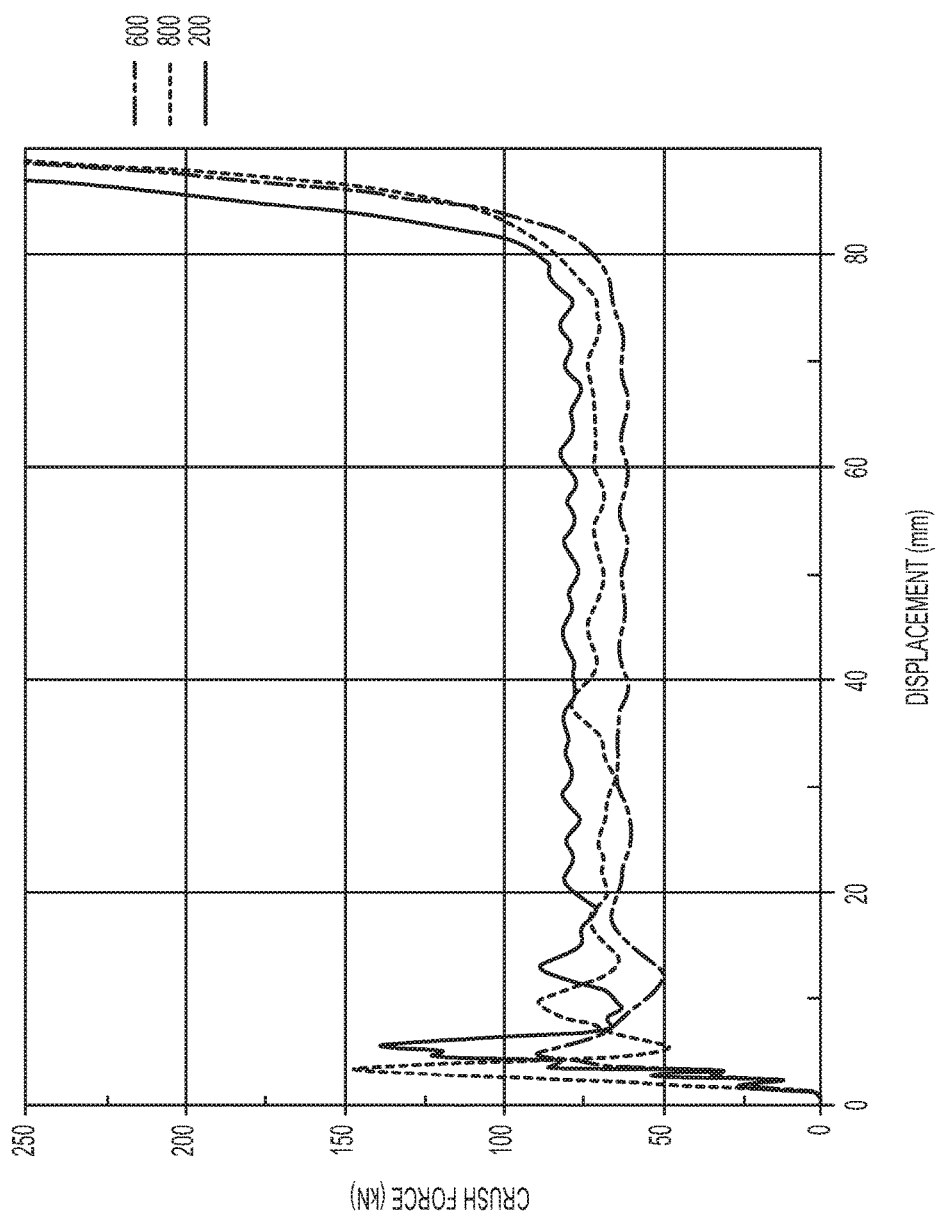
FIG. 25 is a graph of dynamic crush force and associated crush displacement for modeled polymer versions of the structural components shown in FIG. 24A.

FIG. 25 graphically portrays the dynamic crush force (in kN) absorbed axially on the modeled polymer version of exemplary structural components 200, 600 and 800, and the associated axial crush displacement (in mm) for the simulated dynamic crush illustrated in FIG. 24B. As shown in FIG. 25, the polymer twelve-cornered cells of the cellular structure of the structural component 200 in accordance with the present disclosure could sustain a higher crushing force for a given resulting crushing distance as compared with the polymer hexagon cells of the cellular structures of the structural components 600 and 800. Specifically, when averaged over the range of 0 to 60 mm of displacement, the twelve-corner-celled polymer cellular structure of the structural component 200 accordance with the present disclosure achieved about a 27.6% increase in average crush force as compared with the hexagon-celled polymer cellular structure of the structural component 600. The twelve-corner-celled polymer cellular structure of the structural component 200 also achieved about a 9.4% increase in average crush force (over the range of 0 to 60 mm displacement) as compared with the hexagon-celled polymer cellular structure of the structural component 800 despite the fact that structural component 800 has a much larger total mass as well as larger lateral dimensions than structural component 200.

Figure 26:
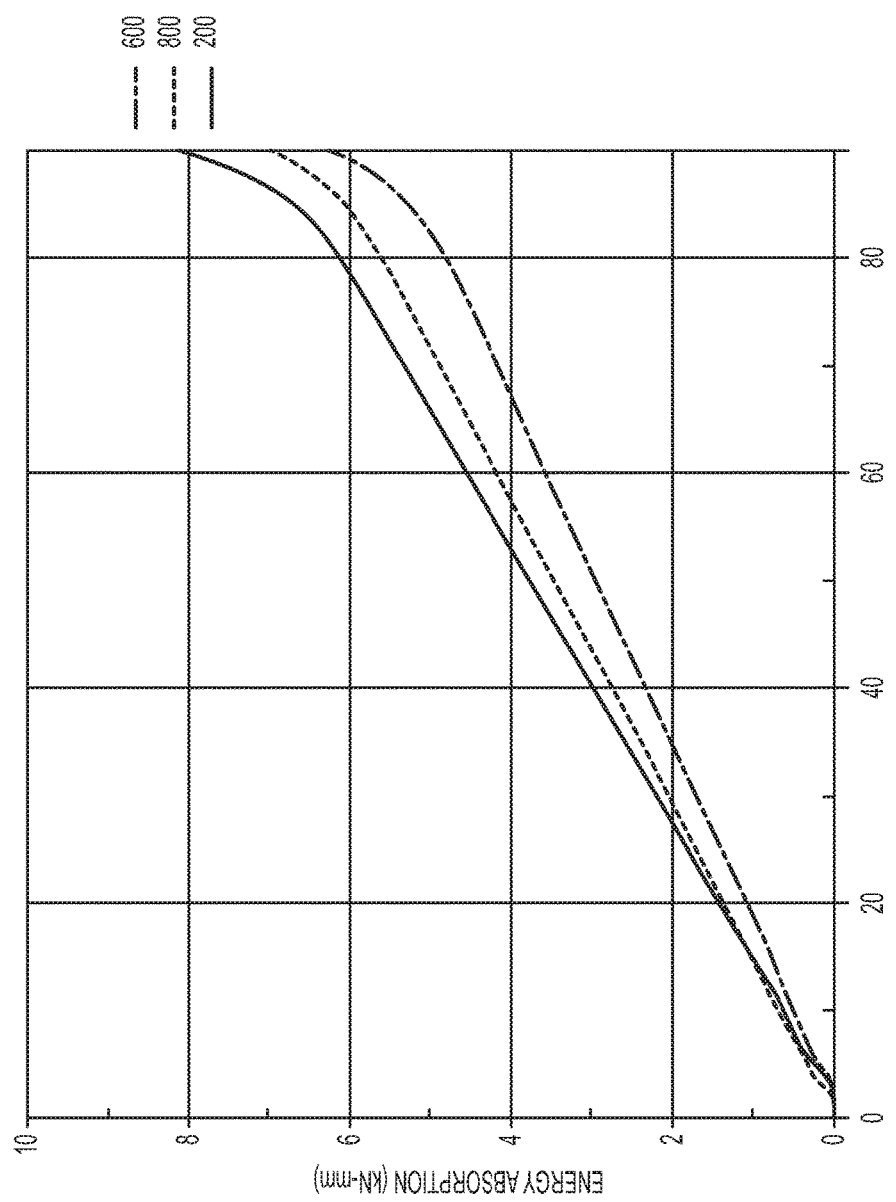
FIG. 26 is a graph of dynamic axial crush energy absorbed and associated axial crush displacement for the exemplary modeled polymer versions of the structural components shown in FIG. 24A.

FIG. 26 graphically portrays the dynamic axial crush energy (in kN-mm) absorbed axially by the modeled polymer version of exemplary structural components 200, 600 and 800, and the associated axial crush displacement (in mm) for the simulated dynamic crush illustrated in FIG. 24B. As shown in FIG. 26, the polymer twelve-cornered cells of the cellular structure of the structural component 200 in accordance with the present disclosure could absorb the same total kinetic energy of the impact over a shorter distance as compared the polymer hexagon cells of the cellular structures of the structural components 600 and 800. Specifically, for example, at 60 mm displacement the twelve-corner-celled polymer cellular structure of the structural component 200 accordance with the present disclosure had absorbed about 27.6% more energy as compared to the amount of energy absorbed by the hexagon-celled polymer cellular structure of the structural component 500 at a displacement of 60 mm. The twelve-corner-celled polymer cellular structure of the structural component 200 accordance with the present disclosure also had absorbed about 9.4% more energy at 60 mm displacement as compared to the amount of energy absorbed by hexagon-celled polymer cellular structure of the structural component 800 at a displacement of 60 mm despite the fact that structural component 800 has a much larger total mass as well as larger lateral dimensions than structural component 200.

Cellular structures having interconnect cells with a twelve-cornered cross section in accordance with the present teachings may, therefore, allow improved impact and compression energy management over, for example, cellular structures with basic polygonal cellular cross sections, including basic four-cornered and six-cornered polygonal cellular cross sections, while minimizing mass per unit length, provides mass saving solutions that reduce vehicle weight and meet new Corporate Average Fuel Economy (CAFE) and emission standards.

Beyond the increased load carrying and energy absorption capabilities, structural components and cellular structures thereof in accordance with the present teachings may provide additional advantages or benefits such as increased bending energy absorption capacity, improved manufacturing feasibility, reduced elastic and plastic deformation, higher plastic deformation threshold, more locally concentrated plastic deformation, and better fitting of the shape amongst the other components of the complete structure (e.g., vehicle, as noted above).

In addition, a structural component having a cellular structure with interconnected cells having a twelve-cornered cross section in accordance with the present disclosure also may be tuned to accommodate unique packaging requirements for use in various structures. Incorporation of the cellular structures of the present disclosure within a structural component can also allow for use of a structural component having a peripheral cross section with a basic polygonal shape, such as a circular, oval, triangle, square, or rectangle. By virtue of the particular shape of the peripheral cross section of at least some of the structural components, it may be easier to couple, bond, attach, or otherwise affix other device components to a structural component having a basic polygonal peripheral cross section and an interior cellular structure having cells with a twelve-cornered cross section in accordance with the present disclosure. Where the structure is a vehicle, other structural components can include, but are not limited to, strengthening ribs for casting or molding components, engine and gear box oil pans, transmission cases, intake manifolds, cylinder blocks, strut mounts, engine mounts or transmission mounts.

Structural components and/or cellular structures thereof in accordance with the present teachings are contemplated for use as structural members in a number of environments. For example, in a motor vehicle, (e.g., car, truck, van, ATV, RV, motorcycle, etc.), a structural component and/or cellular structure as disclosed herein is, or is at least a part of, structural member that is a crush can, a bumper, a front horn, a front rail, a front side rail, a rear side rail, a rear rail, a frame cross member, a shotgun, a hinge-pillar, an A-pillar, a B-pillar, a C-pillar, a door beam, a cross car beam, a front header, a rear header, a cow top, a roof rail, a lateral roof bow, a longitudinal roof bow, a body cross member, a back panel cross member, a rocker, an underbody cross member, an engine compartment cross member, a roof panel, a door, a floor, a deck lid, a lift gate, a hood, a rocker, a trim backing stiffener, a battery protective housing, a furniture item, and a body shell. In addition, the present disclosures can be applied to both body-on-frame and unitized vehicles, or other types of structures.

Figure 27:
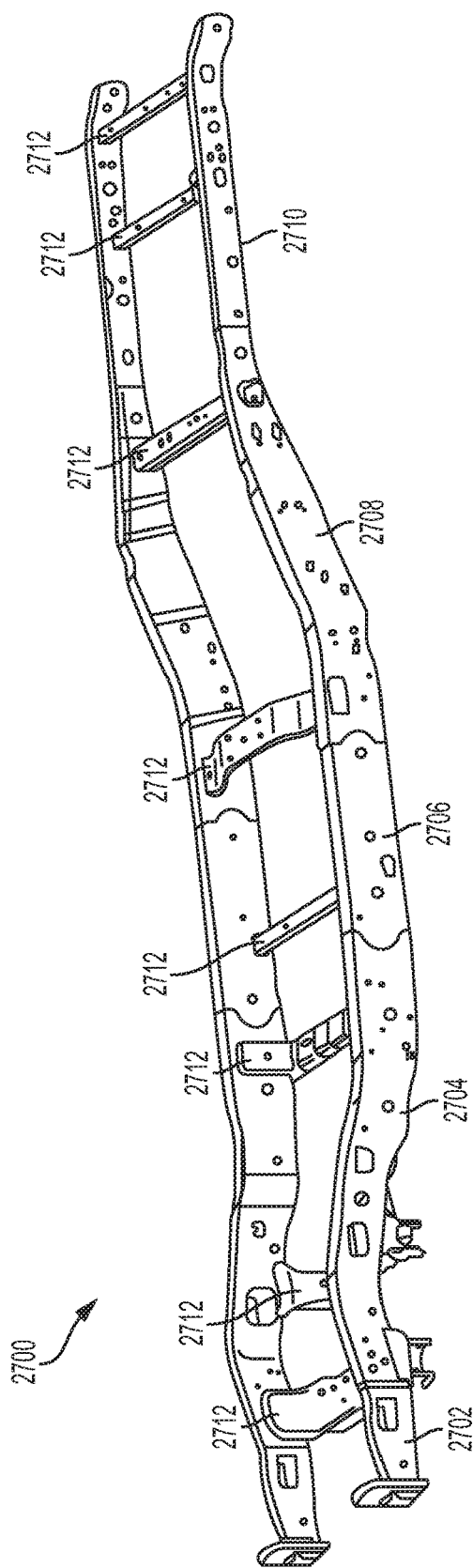
FIG. 27 illustrates an exemplary embodiment of a vehicle frame with several components for which a cellular structure in accordance with the present teachings can be used.
Figure 28:
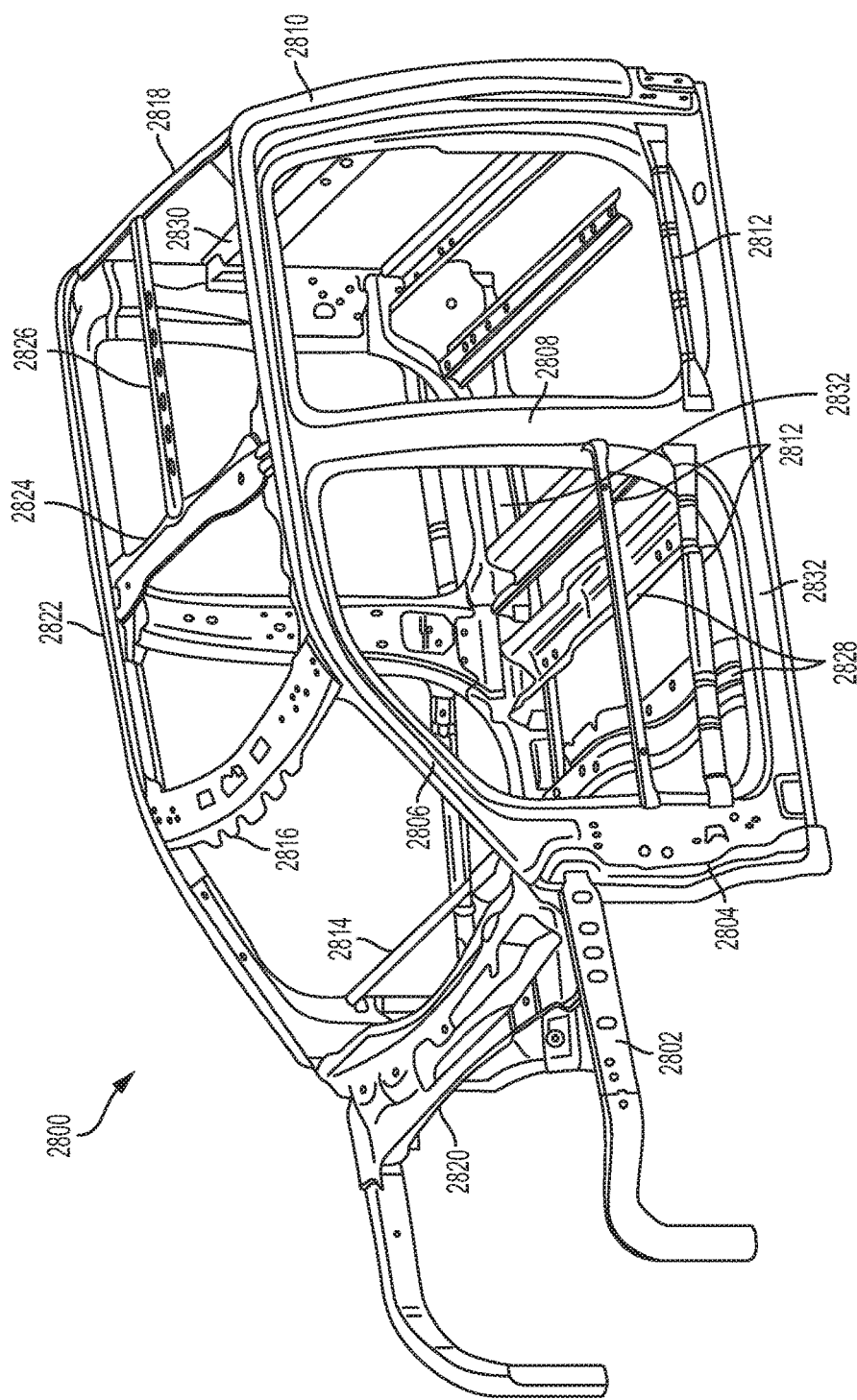
FIG. 28 illustrates an exemplary embodiment of a vehicle upper body with several components for which a cellular structure in accordance with the present teachings can be used.

FIGS. 27 and 28 show an exemplary vehicle frame and an exemplary vehicle upper body, respectively, which have structural members for which structural components having interior cellular structures, or a cellular structure alone, with cells having a twelve-cornered cross section in accordance with the present disclosure, can be used. FIG. 27 illustrates an exemplary embodiment of a vehicle frame 2700 with several components for which or in which the cellular structures can be used. For example, the cellular structures in accordance with the present disclosure may form or be used as a part of a front horn 2702, a front rail 2704, a front side rail 2706, a rear side rail 2708, a rear rail 2710, and/or as one or more cross members 2712. Likewise, FIG. 28 illustrates an exemplary embodiment of a vehicle upper body 2800 with several components for which or in which the cellular structures can be used. For example, the cellular structures in accordance with the present disclosure may be formed or be used as a part of a shotgun 2802, a hinge-pillar 2804, an A-pillar 2806, a B-pillar 2808, a C-pillar 2810, one or more door beams 2812, a cross car beam 2814, a front header 2816, a rear header 2818, a cow top 2820, a roof rail 2822, a lateral roof bow 2824, longitudinal roof bow 2826, one or more body cross members 2828, a body cross member 2830, and/or rocker 2832.

Moreover, the structural components and/or cellular structures thereof in accordance with the present disclosure may be used as or form a part of vehicle underbody components, for example, as a rocker and/or one or more underbody cross members. Also, the strengthening members in accordance with the present disclosure may be used as or form a part of vehicle engine compartment components, for example, as one or more engine compartment cross members.

Further, cellular structures as disclosed herein may be incorporated into a vehicle structure as a supplement to the frame, a crash can, pillar, door, roof rail, hood, and/or rocker components of a vehicle in the form of an impact energy absorber that is fitted inside, on or around a frame, a crash can, pillar, door, roof rail, hood, and/or a rocker component. For example in a Small Overlap Rigid Barrier (SORB) impact, a cellular structure may be fitted to the outside and/or inside of a front rocker and/or a hinge-pillar to absorb impact energy and to reduce the intrusions to the hinge pillar, rocker, front door, and passenger compartment. In an oblique or perpendicular side pole impact, the cellular structure may be also fitted to the inside, on or around a middle rocker, a middle frame, a side door, a B-pillar, or a roof rail, to absorb side impact energy and protect occupants by mitigating the intrusions to the side door and passenger compartment. In a pedestrian impact, the cellular structure may be part of the hood outer or fitted under the hood as a hood inner to absorb the impact energy and protect the pedestrian. In a frontal impact, the cellular structure may be part of a front rail (a crash can for unitized vehicle) or fitted inside of the front rail (or crash can) to absorb the impact energy, minimize side bending, improve deceleration pulse as well as to reduce the intrusion to the passenger compartment.

Additionally, cellular structures as disclosed herein may be incorporated in interior components of a vehicle. For example, cellular structures may serve as a strengthening backing for a center console, HVAC system and air duct components, bumper trims, bumper energy absorbers, hood inners, grill opening reinforcements, a utility box, arm rests, door trims, pillar trims, lift-gate trims, interior panel trims, instrument panel trims, and head liners.

Depending on the application, cells of embodiments of the present disclosure will have varied shapes (i.e. various cross sections) to accommodate specific cellular structure and structural component space constraints. When used as a vehicle front rail, for example, to achieve optimized axial crush performance, the lengths and/or thicknesses of the sides can be tuned to provide optimal strength, size and shape to meet engine compartment constraints.

Further modifications and alternative embodiments of various aspects of the present teachings will be apparent to those skilled in the art in view of this description.

It is to be understood that the particular examples and embodiments set forth herein are non-limiting, and modifications to structure, dimensions, materials, and methodologies may be made without departing from the scope of the present teachings.

In particular, those skilled in the art will appreciate that a cellular structure may include more than one section or portion, with each section or portion having one or more of the variations of the cellular structures taught in accordance with the present disclosure. Said variation(s) can be made continuously or intermittently along the length of each longitudinal section. In other words, cellular structures that embody combinations of one or more of the above variations to the disclosed tunable parameters, which have not been illustrated or explicitly described, are also contemplated. Additionally, a structural component may include more than one of the cellular structures in accordance with the present disclosure disposed adjacent or spaced apart from one another therein.

It will be apparent to those skilled in the art that various modifications and variations can be made to the devices and methods of the present disclosure without departing from the scope of its teachings. Other embodiments of the disclosure will be apparent to those skilled in the art from consideration of the specification and practice of the teachings disclosed herein. It is intended that the specification and embodiments described herein be considered as exemplary only.

For the purposes of this specification and appended claims, unless otherwise indicated, all numbers expressing quantities, percentages, or proportions, and other numerical values used in the specification and claims, are to be understood as being modified in all instances by the term "about," to the extent they are not already so modified. Accordingly, unless indicated to the contrary, the numerical parameters set forth in the following specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

What is claimed is:

1. A cellular structure comprising a plurality of cells, each cell having a twelve-cornered cross section consisting essentially of twelve sides and twelve corners creating eight internal angles and four external angles.

2. The cellular structure of claim 1, wherein:
each of the eight internal angles is substantially the same; and
each of the four external angles is substantially the same.

3. The cellular structure of claim 1, wherein:
each of the eight internal angles is an approximate right angle; and
each of the four external angles is an approximate right angle.

4. The cellular structure of claim 1, wherein each of the sides of the twelve-cornered cross section has substantially the same cross-sectional length and substantially the same cross-sectional thickness.

5. The cellular structure of claim 1, wherein:
four of the sides have a first cross-sectional length;
two of the sides have a second cross-sectional length; and
a ratio of the first cross-sectional length to the second cross-sectional length ranges from about 1:5 to about 5:1.

6. The cellular structure of claim 5, wherein:
four of the sides have a third cross-sectional length;
two of the sides have a fourth cross-sectional length;
a ratio of the third cross-sectional length to the fourth cross-sectional length ranges from about 1:5 to about 5:1; and
at least one of the third and fourth cross-sectional lengths is different than both the first and second cross-sectional lengths.

7. The cellular structure of claim 1, wherein each cell of the plurality of cells further comprises a plurality of walls, each wall of the plurality of walls having a length that extends between longitudinal edges of the respective wall, wherein intersections of the longitudinal edges of the plurality of walls define the twelve corners of the twelve-cornered cross section.

8. The cellular structure of claim 4, wherein a ratio of a cross-sectional thickness of the sides to a cross-sectional length of the sides of the cross section ranges from about 1:4 to about 1:10,000.

9. The cellular structure of claim 1, wherein the cellular structure is made from a material selected from the group consisting of steel alloys, titanium alloys, aluminum alloys, magnesium alloys, nylons, polymers, plastics, composites, fiber-reinforced composites, silicone, semiconductor, papers, rubber, foams, gels, woods, corks, shape-memory materials, and combinations thereof.

10. The cellular structure of claim 1, wherein the cellular structure is formed by stamping, bending, press forming, hydro-forming, molding, casting, extrusion, roll forming, machining, forging, 3D printing, or a combination thereof.

11. The cellular structure of claim 1, wherein one or more cells of the plurality of cells are at least partially filled with at least one of a sound insulating material, a heat insulating material, and a strengthening material.

12. The cellular structure of claim 1, wherein the cellular structure is configured to be placed within a structural component to enhance at least one of strength, energy absorption, stability of axial crush, and an axial crush distance of the structural component.

13. The cellular structure of claim 1, wherein the plurality of cells shares at least one wall.

14. The cellular structure of claim 13, wherein the plurality of cells are interconnected.

15. The cellular structure of claim 1, wherein the cellular structure is, or forms at least a part of, a vehicle structural member selected from the group consisting of: a crush can, a bumper, a front horn, a front rail, a front side rail, a rear side rail, a rear rail, a frame cross member, a shotgun, a hinge-pillar, an A-pillar, a B-pillar, a C-pillar, a door beam, a cross car beam, a front header, a rear header, a cow top, a roof rail, a lateral roof bow, a roof panel, a hood, a hood inner, a longitudinal roof bow, a body cross member, a back panel cross member, a rocker, an underbody cross member, an engine compartment cross member, a roof panel, a door, a floor, a deck lid, a lift gate, a trim backing, a battery protective housing, an oil pan, a transmission case, an intake manifold, a cylinder block, a strut mount, an engine mount, a transmission mount, a body shell, and a strengthening rib of a casted or molded component.

16. The cellular structure of claim 1, wherein the cellular structure is, or forms at least a part of, a shipping or packaging component selected from the group consisting of a shipping box, a pallet, and a cushioning member.

17. The cellular structure of claim 1, wherein the cellular structure is, or forms at least a part of, a rotor blade for a turbine.

18. The cellular structure of claim 1, wherein the cellular structure is, or forms at least a part of, a solar energy panel.

19. The cellular structure of claim 1, wherein the cellular structure is, or forms at least a part of, an elongated board sport platform.

20. A structural component comprising:
at least one wall surrounding a component interior space; and
a first cellular structure positioned within the component interior space, wherein the first cellular structure comprises a plurality of cells, each cell having a twelve-cornered cross section consisting essentially of twelve sides and twelve corners creating eight internal angles and four external angles.

21. The structural component of claim 20, wherein:
each of the eight internal angles is substantially the same; and
each of the four external angles is substantially the same.

22. The structural component of claim 20, wherein:
each of the eight internal angles is an approximate right angle; and
each of the four external angles is an approximate right angle.

23. The structural component of claim 20, wherein each of the sides of the twelve-cornered cross section has substantially the same length and substantially the same thickness.

24. The structural component of claim 23, wherein a ratio of a thickness of the sides to a length of the sides of the cross section ranges from about 1:4 to about 1:10,000.

25. The structural component of claim 20 further comprising a second cellular structure at least partially overlying or underlying the first cellular structure.

26. The structural component of claim 25, wherein a cross section of each of the cells of the plurality of cells of the first cellular structure have a first shape and a cross section of each of a plurality of cells of the second cellular structure have a second shape.

27. The structural component of claim 26, wherein the first shape and the second shape are different shapes.

28. The structural component of claim 26, wherein each of the first shape and the second shape have twelve corners and twelve sides.

29. The structural component of claim 25 further comprising at least one plate between the first cellular structure and the second cellular structure.

30. The structural component of claim 20, wherein the structural component is, or forms at least a part of, a vehicle structural member selected from the group consisting of:
a crush can, a bumper, a front horn, a front rail, a front side rail, a rear side rail, a rear rail, a frame cross member, a shotgun, a hinge-pillar, an A-pillar, a B-pillar, a C-pillar, a door beam, a cross car beam, a front header, a rear header, a cow top, a roof rail, a lateral roof bow, a roof panel, a hood, a hood inner, a longitudinal roof bow, a body cross member, a back panel cross member, a rocker, an underbody cross member, an engine compartment cross member, a roof panel, a door, a floor, a deck lid, a lift gate, a trim backing, a battery protective housing, an oil pan, a transmission case, an intake manifold, a cylinder block, a strut mount, an engine mount, a transmission mount, a body shell, and a strengthening rib of a casted or molded component.

31. The structural component of claim 20, wherein the structural component is, or forms at least a part of, a shipping or packaging component selected from the group consisting of a shipping box, a pallet, and a cushioning member.

32. The structural component of claim 20, wherein the structural component is, or forms at least a part of, a rotor blade for a turbine.

33. The structural component of claim 20, wherein the structural component is, or forms at least a part of, a solar energy panel.

34. The structural component of claim 20, wherein the structural component is, or forms at least a part of, an elongated board sport platform.

35. A cellular structure comprising a plurality of cells, each cell having a twelve-cornered cross section consisting essentially of twelve sides and twelve corners creating eight internal angles and four external angles, wherein a shape of the twelve-cornered cross section includes a central portion and four lobes extending outward from the central portion.

36. A structural component comprising:
at least one wall surrounding a component interior space; and a first cellular structure positioned within the component interior space,
wherein the first cellular structure comprises a plurality of cells, each cell having a twelve-cornered cross section consisting essentially of twelve sides and twelve corners creating eight internal angles and four external angles, and
wherein a shape of the twelve-cornered cross section includes a central portion and four lobes extending outward from the central portion.

* * * * *